US010360647B2

(12) United States Patent
Pallas et al.

(10) Patent No.: US 10,360,647 B2
(45) Date of Patent: Jul. 23, 2019

(54) SYSTEM AND METHOD FOR WIRELESSLY ACTIVATING AN ELECTROMECHANICALLY CONTROLLED FUEL DISPENSER

(71) Applicant: Meijer, Inc., Grand Rapids, MI (US)

(72) Inventors: David Scott Pallas, Hudsonville, MI (US); Brian Pugh, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 667 days.

(21) Appl. No.: 14/632,810

(22) Filed: Feb. 26, 2015

(65) Prior Publication Data

US 2015/0242969 A1 Aug. 27, 2015

Related U.S. Application Data

(60) Provisional application No. 61/945,390, filed on Feb. 27, 2014, provisional application No. 62/090,226, filed on Dec. 10, 2014.

(51) Int. Cl.

| | |
|---|---|
| ***G06Q 20/04*** | (2012.01) |
| ***G06Q 20/10*** | (2012.01) |
| ***B67D 7/34*** | (2010.01) |
| ***G06Q 50/06*** | (2012.01) |
| ***B67D 7/14*** | (2010.01) |

(52) U.S. Cl.
CPC ............ *G06Q 50/06* (2013.01); *B67D 7/145* (2013.01); *B67D 7/34* (2013.01)

(58) Field of Classification Search
CPC ............................... G06Q 20/04; G06Q 20/10
USPC ........................................................ 705/39
See application file for complete search history.

(56) References Cited

U.S. PATENT DOCUMENTS

| | | | |
|---|---|---|---|
| 6,321,984 | B1 | 11/2001 | McCall et al. |
| 6,332,128 | B1 | 12/2001 | Nicholson |
| 6,813,609 | B2 | 11/2004 | Wilson |
| 6,991,160 | B2 | 1/2006 | Demere |
| 7,444,230 | B2 | 10/2008 | Cheiky |
| 7,469,826 | B2 | 12/2008 | Ciancio et al. |
| 7,478,747 | B2 | 1/2009 | Call et al. |
| 8,123,125 | B2 | 2/2012 | Ciancio et al. |
| 2001/0001203 | A1 | 5/2001 | McCall et al. |
| 2005/0149402 | A1 | 7/2005 | Nicholson |

(Continued)

*Primary Examiner* — Hai Tran
(74) *Attorney, Agent, or Firm* — Barnes & Thornburg LLP

(57) ABSTRACT

A system and method are provided for remotely activating electromechanically controlled fuel dispensers. Each fuel dispenser is associated in a database with a unique identification code, and a first code is associated with an electronic payment system pre-identified by a fuel purchasing customer for automatic payment processing during fuel purchase transactions. In response to a wirelessly received identification code, the fuel dispenser associated in the database with the identification code that matches the wirelessly received identification code is identified, the identified fuel dispenser is activated to an active state in which the identified fuel dispenser is enabled to dispense fuel if the first code in the database matches a wirelessly received second code, and payment for the purchase of fuel dispensed from the identified fuel dispenser is automatically processed following activation thereof using the pre-identified electronic payment system associated with the first code in the database.

20 Claims, 19 Drawing Sheets

(56) References Cited

U.S. PATENT DOCUMENTS

| | | | | |
|---|---|---|---|---|
| 2005/0261916 | A1* | 11/2005 | McCall | B67D 7/14<br>705/17 |
| 2006/0293952 | A1 | 12/2006 | Nicholson et al. | |
| 2007/0158416 | A1 | 7/2007 | Dodson | |
| 2008/0126208 | A1 | 5/2008 | Nicholson et al. | |
| 2013/0030900 | A1 | 1/2013 | Nicholson | |
| 2013/0246171 | A1* | 9/2013 | Carapelli | G06Q 20/3278<br>705/14.51 |
| 2014/0006188 | A1 | 1/2014 | Grigg et al. | |
| 2014/0100692 | A1 | 4/2014 | Chittenden, Jr. et al. | |

* cited by examiner

SYSTEM AND METHOD FOR WIRELESSLY ACTIVATING AN ELECTROMECHANICALLY CONTROLLED FUEL DISPENSER

CROSS-REFERENCE TO RELATED APPLICATIONS

This patent application claims the benefit of, and priority to, U.S. Provisional Patent Application Ser. No. 61/945,390, filed Feb. 27, 2014, and U.S. Provisional Patent Application Ser. No. 62/090,226, filed Dec. 10, 2014, the disclosures of which are incorporated herein by reference in their entireties.

FIELD OF THE INVENTION

The present invention relates generally to apparatuses and techniques for dispensing fuel into motor vehicles and/or fuel storage containers, and more specifically to systems and methods for wirelessly activating electromechanically controlled fuel dispensers for subsequent dispensation of fuel into motor vehicles and/or fuel storage containers.

BACKGROUND

Fuel dispensers implemented at so-called "fueling stations" or "filling stations" provide for the purchase and dispensation of fuel into motor vehicles and/or fuel storage containers from one of typically multiple sources of fuel stored on-site. Conventional electromechanical fuel dispensers typically include a control section, which can be manipulated to control the fuel dispenser from an inactive state in which the fuel dispenser is inhibited from dispensing fuel to an active state in which the fuel dispenser is enabled for subsequent dispensation of fuel, and a dispensing section which, after the fuel dispenser is activated, can be manipulated to dispense the fuel from one of the sources of fuel.

Manipulations of the control and dispensing sections of known electromechanical fuel dispensers are generally manual operations. For example, a conventional technique for manipulating the control section may typically involve manually presenting a method of payment, e.g., credit/debit card or cash, at the fuel dispenser or to an attendant at the fueling station and, following approval of the method of payment, manually selecting a fuel type and/or grade. The action of manually selecting the fuel type and/or grade typically controls the fuel dispenser from the inactive state to the active state to enable the dispensing section of the fuel dispenser to be manually manipulated to dispense the selected fuel type and/or grade. Manipulation of the dispensing section then typically involves manually disengaging a fuel nozzle from the fuel dispenser, manually inserting the fuel nozzle into a fuel inlet orifice of a fuel tank of a motor vehicle or other fuel storage container, and then manually actuating a control lever carried by the nozzle to cause a fuel pump to dispense fuel from the selected source of fuel through a fuel hose and into the fuel inlet orifice via the nozzle.

SUMMARY

The present invention may comprise one or more of the features recited in the attached claims, and/or one or more of the following features and combinations thereof. In a first aspect, a method of remotely activating any of a plurality of electromechanically controlled fuel dispensers may comprise associating, with a first processor in a first database, each of the plurality of fuel dispensers with a different identification code, associating, with the first processor in the first or a second database, a first code and an electronic payment system pre-identified by a fuel purchasing customer for automatic payment processing during subsequent transactions for the purchase of fuel by the customer with any of the plurality of fuel dispensers, wirelessly receiving an identification code, in response to the wirelessly received identification code, identifying with the first processor the one of the plurality of fuel dispensers associated in the first database with the identification code that matches the wirelessly received identification code, wirelessly receiving a second code, in response to the wirelessly received second code, automatically activating with the first processor the identified one of the plurality of fuel dispensers from an inactive state in which the identified one of the plurality of fuel dispensers is disabled from dispensing fuel to an active state in which the identified one of the plurality of fuel dispensers is enabled to dispense fuel if the first code in the first or the second database matches the wirelessly received second code, and automatically processing with the first processor payment for the purchase of fuel dispensed from the identified one of the plurality of fuel dispensers following activation thereof using the pre-identified electronic payment system associated with the first code in the first or the second database.

In the first aspect, each of the plurality of electromechanically controlled fuel dispensers may be part of a retail enterprise, and the first code may comprise one of a plurality of enterprise membership service identification codes stored in the first or the second database that uniquely identifies a customer as one of a plurality of customer members of an enterprise membership service program associated with the retail enterprise. Automatically activating the identified one of the plurality of fuel dispensers may illustratively comprise comparing with the first processor the wirelessly received second code with the plurality of membership service identification codes, if the wirelessly received second code matches the one of the plurality of membership identification codes, accessing with the first processor the pre-identified electronic payment system associated in the first or the second database with the one of the plurality of membership identification codes, processing the accessed pre-identified electronic payment system for payment authorization, and automatically activating with the first processor the identified one of the plurality of fuel dispensers upon authorization of the accessed pre-identified payment system for payment for the purchase of fuel to be subsequently dispensed from the identified one of the plurality of fuel dispensers. Alternatively or additionally, the first or the second database may have stored therein a purchase history containing a record of purchases previously made from the retail enterprise by the identified one of the plurality of customer members of the enterprise membership service program, and the method may further comprise associating, with the first processor in the first or the second database, the first code with a mobile communication device carried by the identified one of the plurality of customer members of the enterprise membership service program, one of generating and retrieving from the first or the second database by the first processor at least one discount coupon for a product or service from the retail enterprise based on the purchase history of the identified one of the plurality of customer members of the enterprise membership service program, and wirelessly transmitting with the first processor to the mobile communication device associated with the first code in the first or the second database the at least one discount coupon or notification of the at least one discount coupon.

In the first aspect, the first code in the first or the second database may further comprises a security code, the method may further comprise wirelessly receiving a third code, and wherein automatically activating with the first processor the identified one of the plurality of fuel dispensers from the inactive state to the active state thereof may be further conditioned upon the security code in the first or the second database matching the wirelessly received third code.

In the first aspect, the identified one of the plurality of fuel dispensers may be configured to selectively dispense any of a plurality of different grades or types of fuel, and the method may further comprise associating with the first processor in the first or the second database the first code and a default grade or type of fuel pre-identified by the fuel purchasing customer for dispensation by any of the plurality of fuel dispensers during subsequent transactions for the purchase of fuel by the customer, and automatically enabling with the first processor the automatically activated one of the plurality of fuel dispensers to dispense the default grade or type of fuel associated in the first or the second database with the first code.

In the first aspect, the identified one of the plurality of fuel dispensers may be configured to selectively dispense any of a plurality of different grades or types of fuel, and the method may further comprise wirelessly receiving a third code, and automatically enabling with the first processor the automatically activated one of the plurality of fuel dispensers to dispense the one of the plurality of different grades or types of fuel identified by the wirelessly received third code.

In the first aspect, the method may further comprise wirelessly transmitting the first and second codes with a mobile electronic device under control of a second processor separate and remote from the first processor and from each of the plurality of fuel dispensers. The method may further still comprise wirelessly transmitting, under control of the second processor, the first code in response to detection at or proximate to the identified one of the plurality of fuel dispensers of a broadcast identification signal, and the broadcast identification signal may carry the corresponding identification code that matches the identification code associated in the first database with the identified one of the plurality of fuel dispensers. The method may further still comprise decoding with the second processor the corresponding identification code from the broadcast identification signal, and wirelessly transmitting, under control of the second processor, the first code as the decoded corresponding identification code. The method may further still comprise wirelessly transmitting, under control of the second processor, the first code as raw signal content of the broadcast identification signal, and decoding with the first processor the corresponding identification code from the raw signal content of the broadcast identification signal wirelessly transmitted as the first code. Any of the methods described in this paragraph may further still comprise wirelessly broadcasting a different broadcast identification signal with each of a plurality of wireless signal broadcasting devices located at or proximate to a different one of the plurality of fuel dispensers, and detecting, with wireless communication circuitry carried by the mobile communication device, the broadcast identification signal broadcast by the wireless signal broadcasting device located at or proximate to the identified one of the plurality of fuel dispensers, and/or further comprise wirelessly transmitting, under control of the second processor, the second code in response to one of detection at or proximate to the identified one of the plurality of fuel dispensers of a broadcast identification signal and a wirelessly received request to transmit the second wirelessly transmitted signal, wherein the broadcast identification signal carries the corresponding identification code that matches the identification code associated in the first database with the identified one of the plurality of fuel dispensers, and/or further comprise wirelessly transmitting, under control of the second processor, the first code and the identification code that matches the identification code associated in the first database with the identified one of the plurality of fuel dispensers in response to manual input into the mobile electronic device of the identification code, and/or further comprise determining geographic coordinates corresponding to a geographic location of the mobile electronic device, and wirelessly transmitting, under control of the second processor, the determined geographic coordinates as the wirelessly transmitted first code, wherein the identification code that matches the wirelessly received identification code corresponds to a geographic location of the identified one of the fuel dispensers.

In a second aspect, a system for remotely enabling fuel dispensation, the system may comprise a plurality of fuel dispensers, a plurality of wireless signal broadcasting devices each located at or near a different one of the plurality of fuel dispensers, at least one database having stored therein a plurality of identification codes each associated with a different one of the plurality of wireless signal broadcasting devices and also with a corresponding one of the plurality of fuel dispensers at or near which each different wireless signal broadcasting device is located, and a plurality of customer codes each associated with a different one of a plurality of customer members of a membership service program and each also associated with a different electronic payment system pre-identified by a corresponding one of the plurality of customer members for automatic payment processing during transactions for the purchase of fuel carried out by the customer member at any of the plurality of fuel dispensers, a processor, and a memory having instructions stored therein which, when executed by the processor, cause the processor to identify, in response to a wirelessly received identification code, the one of the plurality of fuel dispensers associated in the at least one database with the identification code that matches the wirelessly received identification code, to automatically activate, in response to a wirelessly received customer code, the identified one of the plurality of fuel dispensers from an inactive state in which the identified one of the plurality of fuel dispensers is disabled from dispensing fuel to an active state in which the identified one of the plurality of fuel dispensers is enabled to dispense fuel if one of the plurality of customer codes in the at least one database matches the wirelessly received customer code, and to automatically process payment for the purchase of fuel dispensed from the identified one of the plurality of fuel dispensers following activation thereof using the one of the plurality of pre-identified electronic payment systems associated in the at least one database with the matching one of the plurality of customer codes.

In the second aspect, the memory may further have instructions stored therein which, when executed by the processor, cause the processor to automatically activate the identified one of the plurality of fuel dispensers by accessing the one of the plurality of pre-identified electronic payment systems associated in the at least one database with the matching one of the plurality of customer codes, processing the accessed one of the plurality of pre-identified electronic payment systems for payment authorization, and automatically activating the identified one of the plurality of fuel dispensers upon authorization of the accessed one of the plurality of pre-identified electronic payment systems for payment for the purchase of fuel to be subsequently dispensed from the identified one of the plurality of fuel dispensers.

In the second aspect, each of the plurality of customer codes stored in the at least one database may further include a security code, and the memory may further have instructions stored therein which, when executed by the processor, cause the processor to automatically activate the identified one of the plurality of fuel dispensers from the inactive state to the active state thereof further in response to a wirelessly received security code if the security code included in the matching one of the plurality of customer codes matches the wirelessly received security code.

In the second aspect, each of the plurality of fuel dispensers may be configured to selectively dispense any of a plurality of different grades or types of fuel, and each of the plurality of customer codes may be further associated in the at least one database with a default grade or type of fuel corresponding to one of the plurality of different grades or types of fuel pre-selected for dispensation by any of the plurality of fuel dispensers during transactions for the purchase of fuel by the associated one of the plurality of customer members, and the instructions stored in the memory may further include instructions which, when executed by the processor, cause the processor to automatically activate the identified one of the plurality of fuel dispensers from the inactive state thereof to an active state in which the identified one of the plurality of fuel dispensers is enabled to dispense the default grade or type of fuel associated in the at least one database with the one of the plurality of customer codes in the at least one database that matches the wirelessly received customer code.

In the second aspect, each of the plurality of fuel dispensers may be configured to selectively dispense any of a plurality of different grades or types of fuel, and the instructions stored in the memory may further include instructions which, when executed by the processor, cause the processor to automatically enable, in response to a wirelessly received fuel code, the automatically activated one of the plurality of fuel dispensers to dispense one of the plurality of different grades or types of fuel identified by the wirelessly received fuel code.

In the second aspect, each of the plurality of fuel dispensers may be part of a retail enterprise, and the at least one database may have stored therein a plurality of purchase histories each containing a record of purchases previously made from the retail enterprise by a different one of the plurality of customers members of the membership service program, and a plurality of mobile communication device codes each identifying a different mobile communication device carried by different one of the plurality of customer members, and each of the plurality of customer codes may be associated in the at least one database with a different corresponding one of the plurality of purchase histories and also with a different corresponding one of the mobile communication device codes, and the instructions stored in the memory may further include instructions which, when executed by the processor, cause the processor to one of generate and retrieve from the at least one database at least one discount coupon for a product or service from the retail enterprise based on the one of the plurality of purchase histories associated in the at least one database with the one of the plurality of customer codes that matches the wirelessly received customer code, and to wirelessly transmit the at least one discount coupon or notification of the at least one discount coupon to the mobile communication device identified by the one of the plurality of mobile communication device codes associated in the at least one database with the one of the plurality of customer codes that matches the wirelessly received customer code.

In a third aspect, a non-transitory machine-readable medium may comprise a plurality of instructions which, when executed by at least one processor, result in the at least one processor associating in a first database each of the plurality of fuel dispensers with a different identification code, associating in the first or a second database, a first code and an electronic payment system pre-identified by a fuel purchasing customer for automatic payment processing during subsequent transactions for the purchase of fuel by the customer with any of the plurality of fuel dispensers, in response to a wirelessly received identification code, identifying the one of the plurality of fuel dispensers associated in the first database with the identification code that matches the wirelessly received identification code, in response to a wirelessly received second code, automatically activating the identified one of the plurality of fuel dispensers from an inactive state in which the identified one of the plurality of fuel dispensers is disabled from dispensing fuel to an active state in which the identified one of the plurality of fuel dispensers is enabled to dispense fuel if the first code in the first or the second database matches the wirelessly received second code, and automatically processing payment for the purchase of fuel dispensed from the identified one of the plurality of fuel dispensers following activation thereof using the pre-identified electronic payment system associated with the first code in the first or the second database.

In the third aspect, each of the plurality of electromechanically controlled fuel dispensers may be part of a retail enterprise, and the first code may comprise one of a plurality of enterprise membership service identification codes stored in the first or the second database that uniquely identifies a customer as one of a plurality of customer members of an enterprise membership service program associated with the retail enterprise. The plurality of instructions, may further include instructions which, when executed by the at least one processor, result in the at least one processor automatically activating the identified one of the plurality of fuel dispensers by comparing with the wirelessly received second code with the plurality of membership service identification codes, if the wirelessly received second code matches the one of the plurality of membership identification codes, accessing the pre-identified electronic payment system associated in the first or the second database with the one of the plurality of membership identification codes, processing the accessed pre-identified electronic payment system for payment authorization, and automatically activating the identified one of the plurality of fuel dispensers upon authorization of the accessed pre-identified payment system for payment for the purchase of fuel to be subsequently dispensed from the identified one of the plurality of fuel dispensers. Alternatively or additionally, the first or the second database may have stored therein a purchase history containing a record of purchases previously made from the retail enterprise by the identified one of the plurality of customer members of the enterprise membership service program, and the plurality of instructions may further include instructions which, when executed by the at the least one processor, result in the at least one processor associating in the first or the second database the first code with a mobile communication device carried by the identified one of the plurality of customer members of the enterprise membership service program, one of generating and retrieving from the first or the second database at least one discount coupon for a product or service from the retail enterprise based on the purchase history of the identified one of the plurality of customer members of the enterprise membership service program, and wirelessly transmitting to the mobile communication device associated with the first code in the first or the second database the at least one discount coupon or notification of the at least one discount coupon In the third aspect, the first code in the first or the second database may further comprise a security code, and the plurality of instructions may further include instructions which, when executed by the at least one processor, result in the at least one processor automatically activating the identified one of the plurality of fuel dispensers from the inactive state to the active state thereof is further conditioned upon the security code in the first or the second database matching a wirelessly received third code.

In the third aspect, the identified one of the plurality of fuel dispensers may be configured to selectively dispense any of a plurality of different grades or types of fuel, and the plurality of instructions may further include instructions which, when executed by the at the least one processor, result in the at least one processor associating in the first or the second database the first code and a default grade or type of fuel pre-identified by the fuel purchasing customer for dispensation by any of the plurality of fuel dispensers during subsequent transactions for the purchase of fuel by the customer, and automatically enabling the automatically activated one of the plurality of fuel dispensers to dispense the default grade or type of fuel associated in the first or the second database with the first code.

In the third aspect, the identified one of the plurality of fuel dispensers may be configured to selectively dispense any of a plurality of different grades or types of fuel, and the plurality of instructions may further include instructions which, when executed by the at least one processor, result in the at least one processor automatically enabling the automatically activated one of the plurality of fuel dispensers to dispense one of the plurality of different grades or types of fuel identified by a wirelessly received third code.

In a fourth aspect, a method of remotely activating any of a plurality of electromechanically controlled fuel dispensers each configured to dispense any of a plurality of different grades of fuel may comprise associating, with a first processor in a first database, each of the plurality of fuel dispensers with a different identification code, associating, with the first processor in the first or a second database, a first code with an electronic payment system and also with a default grade of fuel, the electronic payment system pre-identified by a fuel purchasing customer for automatic payment processing during subsequent transactions for the purchase of fuel by the customer at any of the plurality of fuel dispensers, and the default grade of fuel also pre-identified by the fuel purchasing customer as one of the plurality of grades of fuel to be dispensed by any of the plurality of fuel dispensers during subsequent transactions for the purchase of fuel by the customer, in response to a wirelessly received identification code, identifying with the first processor the one of the plurality of fuel dispensers associated in the first database with the identification code that matches the wirelessly received identification code, in response to a wirelessly received second code, automatically activating with the first processor the identified one of the plurality of fuel dispensers from an inactive state in which the identified one of the plurality of fuel dispensers is disabled from dispensing fuel to an active state in which the identified one of the plurality of fuel dispensers is enabled to dispense the default grade of fuel associated in the first database with the first code if the first code in the first or second database matches the wirelessly received second code, and automatically processing with the first processor payment for the purchase of the default grade of fuel dispensed from the identified one of the plurality of fuel dispensers following activation thereof using the pre-identified electronic payment system associated with the first code in the first or the second database.

In a fifth aspect, a method of remotely activating any of a plurality of electromechanically controlled fuel dispensers each configured to dispense any of a plurality of different types of fuel may comprise associating, with a first processor in a first database, each of the plurality of fuel dispensers with a different identification code, associating, with the first processor in the first or a second database, a first code with an electronic payment system and also with a default type of fuel, the electronic payment system pre-identified by a fuel purchasing customer for automatic payment processing during subsequent transactions for the purchase of fuel by the customer at any of the plurality of fuel dispensers, and the default type of fuel also pre-identified by the fuel purchasing customer as one of the plurality of type of fuel to be dispensed by any of the plurality of fuel dispensers during subsequent transactions for the purchase of fuel by the customer, in response to a wirelessly received identification code, identifying with the first processor the one of the plurality of fuel dispensers associated in the first database with the identification code that matches the wirelessly received identification code, in response to a wirelessly received second code, automatically activating with the first processor the identified one of the plurality of fuel dispensers from an inactive state in which the identified one of the plurality of fuel dispensers is disabled from dispensing fuel to an active state in which the identified one of the plurality of fuel dispensers is enabled to dispense the default type of fuel associated in the first database with the first code if the first code in the first or second database matches the wirelessly received second code, and automatically processing with the first processor payment for the purchase of the default type of fuel dispensed from the identified one of the plurality of fuel dispensers following activation thereof using the pre-identified electronic payment system associated with the first code in the first or the second database.

In a sixth aspect, a system for remotely enabling fuel dispensation may comprise a plurality of fuel dispensers, a plurality of wireless signal broadcasting devices each located at or near a different one of the plurality of fuel dispensers, at least one database having stored therein a plurality of identification codes each associated with a different one of the plurality of wireless signal broadcasting devices and also with a corresponding one of the plurality of fuel dispensers at or near which each different wireless signal broadcasting device is located, and a plurality of customer codes each associated with a different one of a plurality of customer members of a membership service program and each also associated with a different electronic payment system preauthorized by a corresponding one of the plurality of customer members for automatic payment processing during transactions for the purchase of fuel carried out by the customer member at any of the plurality of fuel dispensers, and a server coupled to each of the plurality of fuel dispensers, the server including at least one module to identify, in response to a wirelessly received identification code, the one of the plurality of fuel dispensers associated in the at least one database with the identification code that matches the wirelessly received identification code, to automatically activate, in response to a wirelessly received customer code, the identified one of the plurality of fuel dispensers from an inactive state in which the identified one of the plurality of fuel dispensers is disabled from dispensing fuel to an active state in which the identified one of the plurality of fuel dispensers is enabled to dispense fuel if the customer code in the at least one database matches the wirelessly received customer code, and to automatically process payment for the purchase of fuel dispensed from the identified one of the plurality of fuel dispensers following activation thereof using the pre-identified electronic payment system associated with the customer code in the at least one database.

In a seventh aspect, a mobile electronic device may comprise a wireless communication circuit, a display monitor, a processor coupled to the wireless communication circuit and to the display monitor, and a memory. The memory may have instructions stored therein which, when executed by the processor, cause the processor to automatically or in response to user input, control the wireless communication circuit to establish a wireless communication link with one of an electromechanically controlled fuel dispenser and a server coupled thereto that is within a wireless communication range of the mobile electronic device, control the display monitor to display a plurality or a subset of the plurality of different fuels that are dispensable from the fuel dispenser, and in response to user selection of one of the plurality or the subset of the plurality of different fuels displayed on the display monitor, transmit instructions via the wireless communication link to control the fuel dispenser from an inactive state in which the fuel dispenser is inhibited from dispensing fuel to an active state in which the fuel dispenser is enabled to dispense the selected one of the plurality or the subset of the plurality of different fuels.

In an eighth aspect, a mobile electronic device may comprise a wireless communication circuit, a memory, a database, at least one of the memory and the database having stored therein payment information identifying at least one system of payment specific to a user of the mobile electronic device via which payment can be processed for the purchase of fuel, a display monitor, and a processor coupled to the wireless communication circuit and to the display monitor. The memory may have instructions stored therein which, when executed by the processor, cause the processor to automatically or in response to user input, control the wireless communication circuit to establish a wireless communication link with one of an electromechanically controlled fuel dispenser and a server coupled thereto that is within a wireless communication range of the mobile electronic device, control the display monitor to display the payment information, transmit the payment information to the one of the fuel dispenser and the server coupled thereto via the wireless communication link, and in response to receipt by the mobile electronic device from the one of the fuel dispenser and the server coupled thereto, via the wireless communication link, of information indicating that the at least one system of payment identified by the payment information is accepted for processing of payment for the purchase of fuel to be dispensed from the fuel dispenser, control the display monitor to display at least one of (a) a message indicating acceptance of the at least one system of payment identified by the payment information for processing of payment for the purchase of fuel to be dispensed from the fuel dispenser, and (b) a plurality or a subset of the plurality of different fuels that are dispensable from the fuel dispenser.

In a ninth aspect, a method is provided for remotely activating an electromechanically controlled fuel dispenser using a mobile electronic device having a processor coupled to a display monitor and to a wireless communication circuit. The method may comprise automatically or in response to user input to the mobile electronic device, controlling with the processor the wireless communication circuit to establish a wireless communication link with one of the electromechanically controlled fuel dispenser and a server coupled thereto that is within a wireless communication range of the mobile electronic device, controlling the display monitor to display a plurality or a subset of the plurality of different fuels that are dispensable from the fuel dispenser, and in response to user selection of one of the plurality or the subset of the plurality of different fuels displayed on the display monitor, transmitting instructions via the wireless communication link to control the fuel dispenser from an inactive state in which the fuel dispenser is inhibited from dispensing fuel to an active state in which the fuel dispenser is enabled to dispense the selected one of the plurality or the subset of the plurality of different fuels.

In a tenth aspect, a method is provided for remotely activating an electromechanically controlled fuel dispenser using a mobile electronic device having a processor coupled to a display monitor and to a wireless communication circuit, the mobile electronic device having stored therein payment information identifying at least one system of payment specific to a user of the mobile electronic device via which payment can be processed for the purchase of fuel. The method may comprise automatically or in response to user input to the mobile electronic device, controlling with the processor the wireless communication circuit to establish a wireless communication link with one of the electromechanically controlled fuel dispenser and a server coupled thereto that is within a wireless communication range of the mobile electronic device, controlling the display monitor to display the payment information, transmitting the payment information to the one of the fuel dispenser and the server coupled thereto via the wireless communication link, and in response to receipt by the mobile electronic device from the one of the fuel dispenser and the server coupled thereto, via the wireless communication link, of information indicating whether the at least one system of payment identified by the payment information is accepted for processing of payment for the purchase of fuel to be dispensed from the fuel dispenser, controlling the display monitor to display at least one of (a) a message indicating acceptance of the at least one system of payment identified by the payment information for processing of payment for the purchase of fuel to be dispensed from the fuel dispenser, and (b) a plurality or a subset of the plurality of different fuels that are dispensable from the fuel dispenser.

In an eleventh aspect, an electromechanically controlled fuel dispenser may comprise a dispensing section having a nozzle that is manually actuatable to dispense fuel from any of a plurality of different sources of fuel, the dispensing section having an inactive state in which the dispensing section is inhibited from dispensing fuel and an activate state in which the dispensing section is enabled to dispense fuel, and a control section including a wireless communication circuit, a processor coupled to the wireless communication circuit, and a memory. The memory may have instructions stored therein which, when executed by the processor, cause the processor to automatically control the wireless communication circuit to establish a wireless communication link with a mobile electronic device that is within a wireless communication range of the fuel dispenser, and in response to receipt via the wireless communication link of a fuel selection request from the mobile electronic device, control the dispensing section from the inactive state to the active state to enable the fuel dispenser to dispense fuel from the one of the plurality of different sources of fuel identified by the fuel selection request.

In a twelfth aspect, an electromechanically controlled fuel dispenser may comprise a dispensing section having a nozzle that is manually actuatable to dispense fuel from any of a plurality of different sources of fuel, the dispensing section having an inactive state in which the dispensing section is inhibited from dispensing fuel and an activate state in which the dispensing section is enabled to dispense fuel, and a control section including a wireless communication circuit, a processor coupled to the wireless communication circuit, and a memory. The memory may have instructions stored therein which, when executed by the processor, cause the processor to automatically control the wireless communication circuit to establish a wireless communication link with a mobile electronic device that is within a wireless communication range of the fuel dispenser, receive from the mobile electronic device, via the wireless communication link, payment information identifying a system of payment specific to a user of the mobile electronic device via which payment can be processed for the purchase of fuel, transmit the received payment information to a server, separate from the mobile electronic device, for processing thereof, receive from the server a message indicating whether the system of payment identified by the payment information is accepted for processing of payment for the purchase of fuel to be dispensed from the fuel dispenser, and if the message received from the server indicates that the system of payment identified by the payment information is accepted for processing of payment for the purchase of fuel to be dispensed from the fuel dispenser, transmit to the mobile electronic device, via the wireless communication link, at least one of (a) information indicating acceptance of the at least one system of payment identified by the payment information for processing of payment for the purchase of fuel to be dispensed from the fuel dispenser, and (b) information identifying each of the plurality or each of a subset of the plurality of fuel sources dispensable via the fuel dispenser.

In a thirteenth aspect, a method is provided for remotely activating an electromechanically controlled fuel dispenser having a processor coupled to a wireless communication circuit. The method may comprise automatically controlling, with the processor, the wireless communication circuit to establish a wireless communication link with a mobile electronic device that is within a wireless communication range of the fuel dispenser, and in response to receipt via the wireless communication link of a fuel selection request from the mobile electronic device, controlling the fuel dispenser from an inactive state in which the fuel dispenser is inhibited from dispensing fuel to an activate state in which the fuel dispenser is enabled to dispense fuel from one of a plurality of different sources of fuel identified by the fuel selection request.

In a fourteenth aspect, a method may be provided for remotely activating an electromechanically controlled fuel dispenser having a processor coupled to a wireless communication circuit. The method may comprise automatically controlling, with the processor, the wireless communication circuit to establish a wireless communication link with a mobile electronic device that is within a wireless communication range of the fuel dispenser, receiving from the mobile electronic device, via the wireless communication link, payment information identifying a system of payment specific to a user of the mobile electronic device via which payment can be processed for the purchase of fuel, transmitting the received payment information to a server, separate from the mobile electronic device, for processing thereof, receiving from the server a message indicating whether the system of payment identified by the payment information is accepted for processing of payment for the purchase of fuel to be dispensed from the fuel dispenser, and if the message received from the server indicates that the system of payment identified by the payment information is accepted for processing of payment for the purchase of fuel to be dispensed from the fuel dispenser, transmitting to the mobile electronic device, via the wireless communication link, at least one of (a) information indicating acceptance of the at least one system of payment identified by the payment information for processing of payment for the purchase of fuel to be dispensed from the fuel dispenser, and (b) information identifying each of the plurality or each of a subset of the plurality of fuel sources dispensable via the fuel dispenser.

In a fifteenth aspect, a server may be communicatively coupled to an electromechanically controlled fuel dispenser having a dispensing section configured to dispense fuel from any of a plurality of different sources of fuel and a control section including a wireless communication circuit, and the server may comprise a processor, and a memory. The memory may have instructions stored therein which, when executed by the processor, cause the processor to automatically control the wireless communication circuit of the fuel dispenser to establish a wireless communication link with a mobile electronic device that is within a wireless communication range of the fuel dispenser, and in response to receipt by the fuel dispenser, via the wireless communication link, of a fuel selection request from the mobile electronic device, control the dispensing section of the fuel dispenser from an inactive state in which the dispensing section is inhibited from dispensing fuel to an activate state in which the dispensing section is enabled to dispense fuel from one of the plurality of different sources of fuel identified by the fuel selection request.

In a sixteenth aspect, a server may be communicatively coupled to an electromechanically controlled fuel dispenser having a dispensing section configured to dispense fuel from any of a plurality of different sources of fuel and a control section including a wireless communication circuit, and the server may comprise a processor, and a memory. The memory may have instructions stored therein which, when executed by the processor, cause the processor to automatically control the wireless communication circuit of the fuel dispenser to establish a wireless communication link with a mobile electronic device that is within a wireless communication range of the fuel dispenser, receive from the mobile electronic device, via the wireless communication link and the fuel dispenser, payment information identifying a system of payment specific to a user of the mobile electronic device via which payment can be processed for the purchase of fuel to be dispensed from the fuel dispenser, determine whether the system of payment identified by the payment information is acceptable for processing of payment for the purchase of fuel to be dispensed from the fuel dispenser, and if the system of payment identified by the payment information is determined acceptable for processing of payment for the purchase of fuel to be dispensed from the fuel dispenser, instruct the fuel dispenser to transmit to the mobile electronic device, via the wireless communication link, at least one of (a) information indicating acceptance of the at least one system of payment identified by the payment information for processing of payment for the purchase of fuel to be dispensed from the fuel dispenser, and (b) information identifying each of the plurality or each of a subset of the plurality of fuel sources dispensable via the fuel dispenser.

In a seventeenth aspect, a system may comprise a plurality of electromechanically controlled fuel dispensers each having a first wireless communication circuit, a first memory and a first processor coupled to the first wireless communication circuit and to the first memory, each of the plurality of fuel dispensers having an inactive state in which the fuel dispenser is inhibited from dispensing fuel and an active state in which the fuel dispenser is enabled to dispense fuel from any of a plurality of different sources of fuel, and a mobile electronic device having a second wireless communication circuit, a second memory and a second processor coupled to the second wireless communication circuit and the second memory. Each of the first and second memories may have instructions stored therein which, when executed by the first and second respective processors, cause the first and second processors to control the first and second wireless communication circuits respectively to (a) automatically establish a wireless communication link between the second wireless communication circuit and the first wireless communication circuit of a proximate one of the plurality of fuel dispensers that is nearest in proximity to the mobile electronic device, or (b) establish a wireless communication link between the second wireless communication circuit and the first wireless communication circuit of a selected one of the plurality of fuel dispensers, identified by the mobile electronic device in response to a first user input to the mobile electronic device, that is within a wireless communication range of the mobile electronic device, and the second memory may further have instructions stored therein which, when executed by the second processor, cause the second processor to control the proximate or selected fuel dispenser, via the wireless communication link, from the inactive state to the active state to enable the proximate or selected fuel dispenser to dispense fuel from one of the plurality of different sources of fuel identified by the mobile electronic device in response to a second user input to the mobile electronic device.

In an eighteenth aspect, a system may comprise a plurality of electromechanically controlled fuel dispensers each having a first wireless communication circuit, a first memory and a first processor coupled to the first wireless communication circuit and to the first memory, and a mobile electronic device having a second wireless communication circuit, a second memory and a second processor coupled to the second wireless communication circuit and the second memory, the mobile electronic device having stored therein payment information identifying at least one system of payment specific to a user of the mobile electronic device via which payment can be processed for the purchase of fuel. Each of the first and second memories may have instructions stored therein which, when executed by the first and second respective processors, cause the first and second processors to control the first and second wireless communication circuits respectively to (a) automatically establish a wireless communication link between the second wireless communication circuit and the first wireless communication circuit of a proximate one of the plurality of fuel dispensers that is nearest in proximity to the mobile electronic device, or (b) establish a wireless communication link between the second wireless communication circuit and the first wireless communication circuit of a selected one of the plurality of fuel dispensers, identified by the mobile electronic device in response to a first user input to the mobile electronic device, that is within a wireless communication range of the mobile electronic device, and the second memory may further have instructions stored therein which, when executed by the second processor, cause the second processor to control the display monitor to display the payment information, transmit the payment information to the proximate or selected fuel dispenser via the wireless communication link, and in response to receipt by the mobile electronic device from the proximate or selected fuel dispenser, via the wireless communication link, of information indicating that the at least one system of payment identified by the payment information is accepted for processing of payment for the purchase of fuel to be dispensed from the fuel dispenser, control the display monitor to display at least one of (a) a message indicating acceptance of the at least one system of payment identified by the payment information for processing of payment for the purchase of fuel to be dispensed from the fuel dispenser, and (b) a plurality or a subset of the plurality of different fuels that are dispensable from the fuel dispenser.

In a nineteenth aspect, a method may be provided for remotely activating one of a plurality of electromechanically controlled fuel dispensers, each having a first processor and each coupled to a plurality of different sources of fuel, using a mobile electronic device having a second processor. The method may comprise controlling the first and second wireless communication circuits to (a) automatically establish a wireless communication link between the second wireless communication circuit and the first wireless communication circuit of a proximate one of the plurality of fuel dispensers that is nearest in proximity to the mobile electronic device, or (b) establish a wireless communication link between the second wireless communication circuit and the first wireless communication circuit of a selected one of the plurality of fuel dispensers, identified by the mobile electronic device in response to a first user input to the mobile electronic device, that is within a wireless communication range of the mobile electronic device, executing a fuel selection application stored on the mobile electronic device using the second processor, and controlling, via the fuel selection application executing on the mobile electronic device and over the wireless communication link, the proximate or selected fuel dispenser from an inactive state in which the proximate or selected fuel dispenser is inhibited from dispensing fuel to an activate state in which the fuel dispenser is enabled to dispense fuel from one of the plurality of different sources of fuel.

In a twentieth aspect, a method may be provided for remotely activating one of a plurality of electromechanically controlled fuel dispensers, each having a first processor and each coupled to a plurality of different sources of fuel, using a mobile electronic device having a second processor coupled to a display monitor, the mobile electronic device having stored therein payment information identifying at least one system of payment specific to a user of the mobile electronic device via which payment can be processed for the purchase of fuel. The method may comprise controlling the first and second wireless communication circuits to (a) automatically establish a wireless communication link between the second wireless communication circuit and the first wireless communication circuit of a proximate one of the plurality of fuel dispensers that is nearest in proximity to the mobile electronic device, or (b) establish a wireless communication link between the second wireless communication circuit and the first wireless communication circuit of a selected one of the plurality of fuel dispensers, identified by the mobile electronic device in response to a first user input to the mobile electronic device, that is within a wireless communication range of the mobile electronic device, executing a fuel selection application stored on the mobile electronic device using the second processor, selecting, via the fuel selection application executing on the mobile electronic device and over the wireless communication link, the payment information identifying the at least one system of payment, transmitting to the proximate or selected fuel dispenser, via the wireless communication link, the selected payment information, and if the at least one system of payment identified by the selected payment information is accepted for processing of payment for the purchase of fuel to be dispensed from the fuel dispenser, controlling the display monitor to display at least one of (a) a message indicating acceptance of the at least one system of payment identified by the payment information for processing of payment for the purchase of fuel to be dispensed from the fuel dispenser, and (b) a plurality or a subset of the plurality of different fuels that are dispensable from the fuel dispenser.

DESCRIPTION OF THE ILLUSTRATIVE EMBODIMENTS

Figure 1:
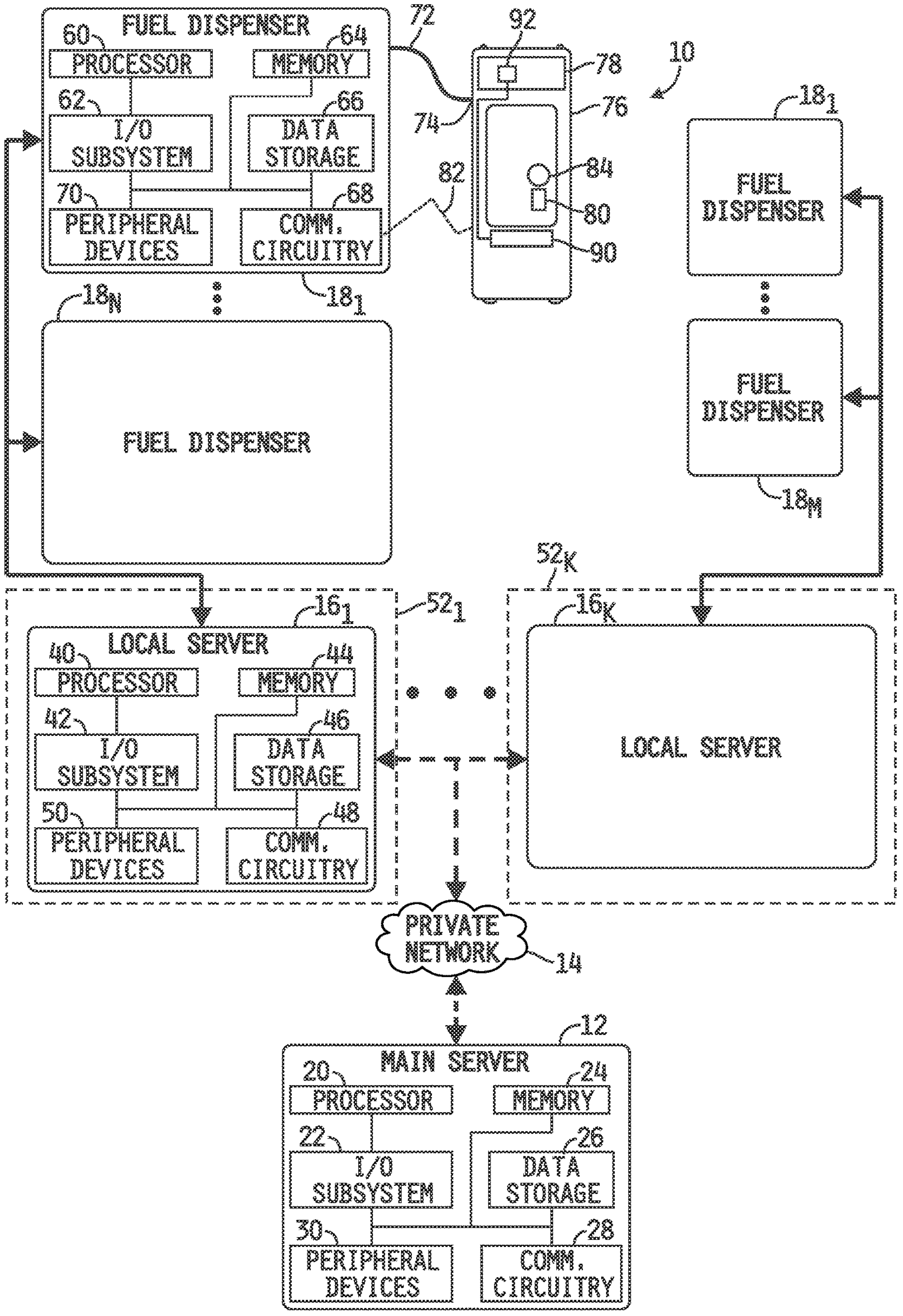
FIG. 1 is a simplified block diagram of an embodiment of a system for wirelessly activating an electromechanical fuel dispenser, for carrying out the subsequent fuel dispensation process through completion and for providing wirelessly connected purchasers of fuel with purchaser-specific discount rewards/offers for one or more goods and/or services offered for sale by an enterprise via which the fuel is purchased.

For the purposes of promoting an understanding of the principles of the invention, reference will now be made to a number of illustrative embodiments shown in the attached drawings and specific language will be used to describe the same.

In the following description, numerous specific details such as logic implementations, resource partitioning/sharing/duplication implementations, types and interrelationships of system components, and logic partitioning/integration choices are set forth in order to provide a more thorough understanding of the present disclosure. Control structures, gate level circuits, driver circuits and full software instruction sequences have not been shown in detail in order not to obscure the disclosure. It will be appreciated, however, by one skilled in the art that embodiments of the disclosure may be practiced without such specific details. Those of ordinary skill in the art, with the included descriptions, will be able to implement appropriate functionality without undue experimentation.

References in the specification to "one embodiment", "an embodiment", "an example embodiment", "one illustrative embodiment" etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of this disclosure may be implemented in hardware, firmware, software, or any combination thereof. Embodiments implemented in a computer system may include one or more bus-based interconnects between components and/or one or more point-to-point interconnects between components. Embodiments of this disclosure may also be implemented as instructions stored on one or more machine-readable media, which may be read and executed by one or more processors. As used herein, the term "machine-readable medium," and variants thereof, refers generally to non-transient data storage media and excludes any transitory signals. A machine-readable medium may be embodied as any device or physical structure for storing or transmitting information in a form readable by a machine (e.g., a computing device). For example, a machine-readable medium may be embodied as any one or combination of read only memory (ROM), random access memory (RAM), magnetic disk storage media, optical storage media, flash memory device, and/or other conventional machine-readable storage medium.

The terms "customer," "fuel purchaser," "purchaser" and "user," and variants thereof, are used interchangeably in the following description. Such terms should be understood to define and refer to any purchaser of fuel from a retail fueling station including, but not limited to, an operator and/or any passenger of a motor vehicle to be or being refueled, an operator and/or any passenger of a motorized or non-motorized vehicle carrying, towing or otherwise transporting a motor vehicle to be or being refueled, an operator and/or any passenger of a motorized or non-motorized vehicle carrying, towing or otherwise transporting a fuel container to be or being filled with fuel, or the like. The terms "inactive," "inactive state," "inactivated state," "inactive operational state," "deactivate," "deactivation," and variants thereof, used herein with reference to an electromechanically controlled fuel dispenser, are defined for purposes of this disclosure as an operational state (or in the case of "deactivate" or "deactivation" to control to an operational state) of the fuel dispenser in which the fuel dispenser generally, and the dispensing section of the fuel dispenser in particular, is inhibited or prevented from dispensing fuel of any type or grade. The terms "active," "activate state," "activated state," "activate," "activation," and variants thereof, used herein with reference to an electromechanically controlled fuel dispenser, are defined for purposes of this disclosure as an operational state (or in the case of "activate" or "activation" to control to an operational state) of the fuel dispenser in which the fuel dispenser generally, and the dispensing section of the fuel dispenser in particular, is enabled to dispense a selected fuel type and/or grade from a source of fuel of the selected type and/or grade.

Referring now to FIG. 1, a system 10 is shown for wirelessly activating an electromechanical fuel dispenser for subsequent dispensation of fuel, for carrying out the subsequent fuel dispensation process through completion and for providing wirelessly connected purchasers of fuel with purchaser-specific discount rewards/offers for one or more goods and/or services offered for sale by an enterprise via which the fuel is purchased. In the illustrated embodiment, the system 10 includes a main server 12 coupled via a private network 14 to one or more local hub servers $\mathbf{16}_1$-$\mathbf{16}_K$, with each local hub server $\mathbf{16}_1$-$\mathbf{16}_K$ coupled to one or more electromechanical fuel dispensers $\mathbf{18}_1$-$\mathbf{18}_N$, $\mathbf{18}_1$-$\mathbf{18}_M$; e.g., K, N and M may each be any positive integer. Each fuel dispenser $\mathbf{18}_1$-$\mathbf{18}_N$, $\mathbf{18}_1$-$\mathbf{18}_M$ is configured to be enabled and ready to be manually manipulated to dispense a selected fuel type and/or grade after being controlled from an inactive state to an active state. As described in more detail below, a wireless communication link may be selectively established between a fuel dispenser $\mathbf{18}_1$-$\mathbf{18}_N$, $\mathbf{18}_1$-$\mathbf{18}_M$ (and/or a corresponding one of the local servers $\mathbf{16}_1$-$\mathbf{16}_K$) and a mobile communication device 80 (and/or a vehicle communication device 90), and the fuel dispenser may then be wirelessly and remotely activated via the wireless communication link using the mobile communication device 80 (and/or the vehicle communication device 90). In one embodiment, the fuel dispenser $\mathbf{18}_1$-$\mathbf{18}_N$, $\mathbf{18}_1$-$\mathbf{18}_M$ may, once activated, be manually controlled in a conventional manner to dispense a type and/or grade of fuel selected as part of the remote activation process. In alternate embodiments, the fuel dispenser activation process may be partially carried out wirelessly and remotely using the mobile communication device 80 (and/or the vehicle communication device 90), and then completed by manually selecting the fuel type and/or grade. In any case, the ability to wirelessly and remotely activate, or partially activate, an electromechanically controlled fuel dispenser for subsequent dispensation of fuel effectively reduces the amount of time required to be spent manually manipulating the fuel dispenser during fuel purchase transactions, thus providing for a number of attendant benefits.

In some embodiments, the enterprise served by the main (or "enterprise") server is 12 a retail enterprise that offers for sale goods and/or services in addition to fuel. As will be further described below, the main server 12 in some such embodiments illustratively hosts an enterprise member services (EMS) program which includes or otherwise has access to a database containing a plurality of virtual customer rewards repositories each configured to store and manage virtual rewards/offers for a different one of a corresponding plurality of customer-members of the EMS program. The EMS program further illustratively includes a customer purchase history database containing purchase histories of one or more customers of the retail enterprise. In addition to virtual discount coupons offered to all customers of the EMS program, the EMS program also illustratively includes, in some embodiments, a customized reward/offer feature in which the purchase history of each customer-member is collected over time and stored, and customer-specific rewards or offers for goods and/or services offered for sale by the enterprise are then generated from a database of rewards/offers based on the customer's purchase history. Such customer-specific rewards or offers are then typically stored in the customer's rewards repository in the form of virtual rewards or offers; i.e., virtual discount coupons, that may be subsequently redeemed by the customer toward the purchase of corresponding products and/or services offered for sale by the enterprise. As used herein, the term "enterprise member services program," "enterprise membership services program" or EMS and "shopper membership service" are interchangeable and refer to a shopper or customer service which may offer to customer members one or more services such as making available to customers one or more virtual discount coupons that may be redeemable by the retail enterprise against the purchase of from the retail enterprise of various goods, which may include fuel, and/or services and/or tracking and maintaining customer purchase histories in the customer purchase history database accessible by the main server 12. In this regard, the terms "shopper membership account" and "EMS account" are likewise interchangeable and refer to a mechanism by which the retail enterprise may make available to customers one or more virtual discount coupons and/or by which a customer's purchase history and information about the customer can be maintained by the main server 12 in a database separately from purchase histories of and information about other customers. Further in this regard, the term "EMS identification code" or EMSID illustratively refers to at least one collection of letters, symbols and/or numbers that is different for, and therefore unique to, each customer member of the enterprise membership services program, and which is used to uniquely identify a customer's EMS account within the enterprise membership services program. In one embodiment, for example, the EMSID for each customer may include a unique, several-digit access code and a separate and unique, several-digit password, although in other embodiments the EMSID may include more, fewer and/or different codes and/or passwords.

As will be discussed in further detail below, the main server 12 illustratively includes an EMS module that manages and controls a customer-member interface, e.g., a web-based interface, to the EMS program via which customers can access and manage their individual EMS accounts. Illustratively, each customer may access their individual (and private from other customer-members) EMS account, i.e., their individual EMS page(s) within the web-based EMS interface, which may be referred to hereinafter as an "EMS website," by entering that customer's EMSID into a graphic user interface element of the web-based EMS interface. Therein, the customer may access, establish, modify and otherwise manage the customer's EMS account information including, for example, but not limited to, name, address, email address, mobile telephone number and, as will be described in greater detail below in relation to various embodiments illustrated in FIGS. 14A-22, at least one of a preferred or preselected fuel grade and/or type and electronic payment information (EPI) associated with one or more forms of electronic payment.

The main server 12 may serve an enterprise of any conceivable size and/or diversity that offers a range of consumer products and/or services via one or more retail outlets, e.g., brick-and-mortar outlets, and/or via one or more on-line shopping services, e.g., one or more publicly-accessible or privately-accessible web sites hosted by an enterprise and accessible via a system of interconnected computer networks, e.g., the Internet, using a web browser. The latter may be referred to herein as a "virtual" or "on-line" shopping outlet or service, and the combination of one or more retail outlets and one or more on-line shopping outlets may be referred to herein as a so-called "bricks-and-clicks" enterprise. In any case, the customer purchase histories may be as equally as diverse as the enterprise, and may therefore include a narrow or a wide range of product and/or service purchases, or any range in between. Customer-specific rewards or offers may be provided in the form of discount rewards or offers, e.g., virtual discount coupons, for the purchase of any one or combination of products and/or services offered for sale by the enterprise.

As briefly described above, each customer-member of the EMS program is illustratively assigned, or selects, a unique EMS identification code (EMSID). In one embodiment, the mobile communication device 80 or a vehicle communication device 90 illustratively provides the customer's EMSID to the fuel dispenser $\mathbf{18}_1$-$\mathbf{18}_N$, $\mathbf{18}_1$-$\mathbf{18}_M$ (or to a corresponding one of the local servers $\mathbf{16}_1$-$\mathbf{16}_K$, or to the main server 12) when a wireless communication link 82 is established therebetween. In such embodiments the fuel dispenser $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$) to which the mobile communication device 80 or vehicle communication device 90 is wirelessly linked passes the EMSID to the main or enterprise server 12, or the mobile communication device 80 or vehicle communication device 90 passes the EMSID directly to the main or enterprise server 12 The main or enterprise server 12 is thus notified whenever an EMS customer-member is in wireless communication, i.e., linked by a wireless communication connection, with an enterprise fuel dispenser $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$ or with the main server 12) for the purpose of purchasing fuel. In such embodiments, the main server 12 illustratively includes a rewards/offer module via which the main server 12 can determine and push one or more customer-specific rewards/offers to any EMS customer-member by transmitting the customer-specific rewards/offers to the enterprise fuel dispenser $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$) to which the EMS customer-member is wirelessly linked, along with instructions to cause the enterprise fuel dispenser $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$) to wirelessly transmit the one or more customer-specific rewards/offers to the wirelessly linked mobile communication device 80 or vehicle communication device 90, or via which the main server 12 can determine and push one or more such rewards/offers directly to any such EMS customer-member by wirelessly transmitting such customer-specific rewards/offers directly to the customer-member's mobile communication device 80 or vehicle communication device 90. Because such wirelessly connected EMS customer-members are presently in the process of purchasing fuel at an enterprise fueling station, the customer-specific rewards/offers, e.g., virtual discount coupons, may be specifically tailored to fuel-related discounts or rewards, e.g., a fuel unit price discounts, upgrades to higher grade fuel, etc., to discounts or rewards at the co-located enterprise fueling station, e.g., free soft drink, 2-for-1 hot dogs, discounted or free car wash, etc., and/or to discounts or rewards at one or more enterprise fueling stations located elsewhere. Alternatively or additionally, the customer-specific rewards/offers may be specifically tailored to discounts or rewards at one or more non-fuel-related retail outlets owned and/or operated by the enterprise.

In the embodiment illustrated in FIG. 1, the main server 12 is illustratively connected to one or more local servers $\mathbf{16}_1$-$\mathbf{16}_K$ via a private network 14, and each local server $\mathbf{16}_1$-$\mathbf{16}_K$ is illustratively implemented at a fueling (or filling) station, i.e., a fuel sales facility or "fuel center", $\mathbf{52}_1$-$\mathbf{52}_K$ respectively. Some retail enterprises may include a single brick and mortar fuel sales facility 52, and other larger enterprises may include two or more physically remote brick and mortar fuel sales facilities $\mathbf{52}_1$-$\mathbf{52}_K$. In the latter case, the retail enterprise may include, for example, at least one main business facility with two or more remote brick and mortar fuel sales facilities, and for purposes of this document the two or more remote brick and mortar fuel sales facilities $\mathbf{52}_1$-$\mathbf{52}_K$ in such an arrangement are referred to as fuel sales "hubs." In this disclosure, the system 10 will be illustrated and described in the context of such a larger retail enterprise having at least one main business facility located remotely from two or more fuel sales hubs. In this regard, the main server 12 in the system 10 shown in FIG. 1 will typically be located at a main business location of the retail enterprise, and will be coupled via the network 14 to two or more local servers $\mathbf{16}_1$-$\mathbf{16}_K$, each of which will typically be located at a different one of the two or more hub locations $\mathbf{52}_1$-$\mathbf{52}_K$.

Each of the hub locations $\mathbf{52}_1$-$\mathbf{52}_K$ may include any number of electromechanically controlled fuel dispensers communicatively coupled to a corresponding local server, and in the embodiment illustrated in FIG. 1, for example, the local server $\mathbf{16}_1$ is communicatively coupled to "N" such electromechanically controlled fuel dispensers $\mathbf{18}_1$-$\mathbf{18}_N$, where N may be any positive integer, and the local server $\mathbf{16}_K$ is communicatively coupled to "M" such electromechanically controlled fuel dispensers $\mathbf{18}_1$-$\mathbf{18}_M$, where M may be any positive integer (and where M may or may not be equal to N). Communicative coupling between the local server $\mathbf{16}_1$ and the one or more electromechanically controlled fuel dispensers $\mathbf{18}_1$-$\mathbf{18}_N$, and between the local hub server $\mathbf{16}_K$ and the one or more electromechanically controlled fuel dispensers $\mathbf{18}_1$-$\mathbf{18}_M$, may be accomplished using any known communication coupling, and communications over any such hardwire and/or wireless coupling may be accomplished using any known communication protocol.

In some alternative embodiments of such a large retail enterprise, one or more of the local servers $\mathbf{16}_1$-$\mathbf{16}_K$ may be omitted, and the main server 12 may be coupled directly, via the network 14, to the one or more electromechanically controlled fuel dispensers $\mathbf{18}_1$-$\mathbf{18}_N$, $\mathbf{18}_1$-$\mathbf{18}_M$, or the main server 12 may be omitted and at least one of the local servers $\mathbf{16}_1$-$\mathbf{16}_K$ may be configured to act as a so-called master server with the remaining local servers $\mathbf{16}_1$-$\mathbf{16}_K$ configured to act as so-called slave servers. In other alternative embodiments in which the retail enterprise includes only a single brick and mortar fuel sales facility, the local servers $\mathbf{16}_1$-$\mathbf{16}_K$ may be omitted and the main server 12 may be coupled directly, e.g., via a wired or wireless interface, to one or more electromechanically controlled fuel dispensers, e.g., $\mathbf{18}_1$-$\mathbf{18}_N$ or $\mathbf{18}_1$-$\mathbf{18}_M$, or the main server 12 and all but one local server, e.g., $\mathbf{16}_1$, may be omitted and the sole local server, e.g., $\mathbf{16}_1$, may be coupled directly, e.g., via a wired or wireless interface, to one or more electromechanically controlled fuel dispensers, e.g., $\mathbf{18}_1$-$\mathbf{18}_N$.

For purposes of the following description, any process disclosed as being controlled by the main server 12 may, in some embodiments, instead be controlled, in whole or in part, by one or more local servers $\mathbf{16}_1$-$\mathbf{16}_K$, and/or may be controlled, in whole or in part, by one of the electromechanically controlled fuel dispensers $\mathbf{18}_1$-$\mathbf{18}_N$, $\mathbf{18}_1$-$\mathbf{18}_M$. Likewise, any process disclosed as being controlled by any of the local servers $\mathbf{16}_1$-$\mathbf{16}_K$ may, in some embodiments, instead be controlled, in whole or in part, by the main server 12, and/or may be controlled, in whole or in part, by one of the electromechanically controlled fuel dispensers $\mathbf{18}_1$-$\mathbf{18}_N$, $\mathbf{18}_1$-$\mathbf{18}_M$. Further still, any process disclosed as being controlled by any of the electromechanically controlled fuel dispensers $\mathbf{18}_1$-$\mathbf{18}_N$, $\mathbf{18}_1$-$\mathbf{18}_M$ may, in some embodiments, instead be controlled, in whole or in part, by one or more of the local servers $\mathbf{16}_1$-$\mathbf{16}_K$, and/or may be controlled, in whole or in part, by the main server 12.

The main server 12 may be embodied as any type of server (e.g., a web server) or similar computing device capable of performing the functions described herein. In the illustrative embodiment of FIG. 1, the main server 12 includes a processor 20, an I/O subsystem 22, a memory 24, a data storage 26, a communication circuitry 28, and one or more peripheral devices 30. It should be appreciated that the main server 221 may include other components, sub-components, and devices commonly found in a sever and/or computing device, which are not illustrated in FIG. 1 for clarity of the description.

The processor 20 of the main server 12 may be embodied as any type of processor capable of executing software/firmware, such as a microprocessor, digital signal processor, microcontroller, or the like. The processor 20 may be a single processor or include multiple processors. The I/O subsystem 22 of the main server 12 may be embodied as circuitry and/or components to facilitate input/output operations with the processor 20 and/or other components of the main server 12. The processor 20 is communicatively coupled to the I/O subsystem 22.

The memory 24 of the main server 12 may be embodied as or otherwise include one or more conventional volatile and/or non-volatile memory devices. The memory 24 is communicatively coupled to the I/O subsystem 22 via a number of signal paths. Although only a single memory device 24 is illustrated in FIG. 1, the main server 12 may include additional memory devices in other embodiments. Various data and software may be stored in the memory 24. The data storage 26 is also communicatively coupled to the I/O subsystem 22 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 28 of the main server 12 may include any number of devices and circuitry for enabling and controlling communications between the main sever 12 and the one or more local servers $\mathbf{16}_1$-$\mathbf{16}_K$, and/or for enabling and controlling communications between the main server 12 and any one or more of the fuel dispensers $\mathbf{18}_1$-$\mathbf{18}_N$, $\mathbf{18}_1$-$\mathbf{18}_M$, any of one or more mobile communication devices 80 and/or any of one or more vehicle communication devices 90. In the illustrated embodiment, for example, communication between the main server 12 and the one or more local servers $16_1$-$16_K$ takes place wirelessly via the network 14, wherein the network 14 may represent, for example, a private local area network (LAN), a personal area network (PAN), a storage area network (SAN), a backbone network, a global area network (GAN), a wide area network (WAN), or collection of one or more of any such computer networks such as an intranet, extranet or the Internet (i.e., a global system of interconnected networks upon which various applications and/or services run including, for example, the World Wide Web (WWW)). In alternative embodiments, the communication path between the main server 12 and the one or more local servers $16_1$-$16_K$ may be a non-private network and/or may be, in whole or in part, a wired connection.

Generally, the communication circuitry 28 may be configured to use any one or more, or combination, of conventional secure and/or unsecure communication protocols to conduct communications between the main server 12 and the one or more local servers $16_1$-$16_K$. As such, the network 14 may include any number of additional devices, such as additional computers, routers, and switches, to facilitate communications between the main server 12 and the one or more local servers $16_1$-$16_K$. Communication between the one or more local servers $16_1$-$16_K$ and the one or more electromechanically controlled fuel dispensers $18_1$-$18_N$, $18_1$-$18_M$ may take place via one or more conventional wired or wireless communication interfaces.

In some embodiments, the main server 12 may also include one or more peripheral devices 30. Such peripheral devices 30 may include any number of additional input/output devices, interface devices, and/or other peripheral devices. For example, the peripheral devices 30 may include one or more conventional displays, keyboards, point-and-select devices, audio processing circuits, and/or other input/output devices.

An embodiment of one of the local servers, e.g., $16_1$, is also illustrated in FIG. 1, and generally includes the same components as the main server 12. For example, a processor 40 is coupled to an I/O subsystem 42, and the I/O subsystem 42 is coupled to a memory 44, a data storage unit 46, communication circuitry 48 and one or more peripheral devices 50. In some embodiments, each of the foregoing components may be identical to corresponding components of the main server 12 described above, and a detailed explanation of such components will not be repeated here for brevity. In other embodiments, the local server $16_1$ may be configured differently than the main server 12 described above. In any case, the communication circuitry 48 of the local server $16_1$ facilitates communication with the communication circuitry 28 of the main server 12 and vice versa so that information can be shared between the main server 12 and the local server $16_1$ via the network 14. Although only one such main server 12 is shown in FIG. 1, it should be appreciated that, in other embodiments, the system 10 may include any number of main servers.

The local server $16_K$, as well as any additional local server(s), may be substantially similar to the local server $16_1$ and include similar components. As such, the description provided above of the components of the local server $16_1$ may be equally applicable to such similar components of the local server $16_K$ and are not repeated here so as not to obscure the present disclosure. Further details of one illustrative embodiment of an example one of the local servers $16_1$-$16_K$ will be provided below with respect to FIG. 7. Of course, it should be appreciated that in some embodiments one or more of the local servers $16_1$-$16_K$ may be dissimilar to others of the local servers $16_1$-$16_K$.

Referring still to FIG. 1, an embodiment of one, e.g., $18_1$, of the plurality of electromechanically controlled fuel dispensers $18_1$-$18_N$, $18_1$-$18_M$ are shown. In the illustrated embodiment, the electromechanically controlled fuel dispenser $18_1$ generally includes the same components as the main server 12 and each of the local servers $16_1$-$16_K$. For example, a processor 60 is coupled to an I/O subsystem 62, and the I/O subsystem 62 is coupled to a memory 64, a data storage unit 66, communication circuitry 68 and one or more peripheral devices 70. In some embodiments, each of the foregoing components may be identical to corresponding components of the main server 12 described above, and a detailed explanation of such components will not be repeated here for brevity. In other embodiments, the fuel dispenser $18_1$ may be configured differently than the main server 12 described above. In embodiments that include one or more local servers $16_1$-$16_K$, the communication circuitry 68 of the fuel dispenser $18_1$ facilitates communication with the communication circuitry 48 of a corresponding one of the local servers $16_1$-$16_K$ and vice versa so that information can be shared between the fuel dispenser $18_1$ and the corresponding one of the local servers $16_1$-$16_K$ via a wired or wireless communication interface. In alternate embodiments that do not include any local servers $16_1$-$16_K$ and in which the main server 12 is coupled directly to the one or more fuel dispensers $18_1$-$18_N$ (and/or $18_1$-$18_M$), the communication circuitry 68 of the fuel dispenser $18_1$ facilitates communication with the communication circuitry 28 of main server 12 and vice versa so that information can be shared between the fuel dispenser $18_1$ and the main server 12 via the network 14.

The electromechanically controlled fuel dispenser $18_N$, as well as any additional fuel dispensers, may be substantially similar to the fuel dispenser $18_1$ and include similar components. As such, the description provided above of the components of the fuel dispenser $18_N$ may be equally applicable to such similar components of the fuel dispenser $18_1$ and are not repeated here so as not to obscure the present disclosure. Of course, it should be appreciated that in some embodiments one or more of the electromechanically controlled fuel dispensers $18_1$-$18_N$, $18_1$-$18_M$ may be dissimilar to others of the fuel dispensers $18_1$-$18_N$, $18_1$-$18_M$. As further illustrated in FIG. 1, the fuel dispenser $18_1$ is shown coupled via a fuel hose 72 to a fuel inlet orifice of a conventional motor vehicle 78. Each of the fuel dispensers $18_1$-$18_N$, $18_1$-$18_M$ are so equipped, with one end of the fuel hose 72 coupled to a conventional nozzle 74 sized to be received within the fuel inlet orifice of the motor vehicle. Further details of one illustrative embodiment of an example one of the electromechanically controlled fuel dispensers $18_1$-$18_N$, $18_1$-$18_M$ will be provided below with respect to FIG. 2.

In some embodiments, a mobile communication device 80 may be carried by an operator 84 (or a passenger) of the motor vehicle 78, and in such embodiments the mobile communication device 80 may be configured to communicate wirelessly with the fuel dispenser $18_1$ via a wireless communication link established between the communication circuitry 68 of the fuel dispenser $18_1$ and communication circuitry carried by the mobile communication device 80. Alternatively or additionally, a vehicle communication device 90 may be embedded or carried by the motor vehicle 78, and in embodiments the vehicle communication device 90 may be configured to communicate wirelessly with the fuel dispenser $18_1$ via a wireless communication link established between the communication circuitry 68 of the fuel dispenser $18_1$ and communication circuitry carried by the vehicle communication device 90. Alternatively or additionally still, the mobile communication device 80 and/or the vehicle communication device 90 may be configured to communicate wirelessly with a corresponding one of the local servers $16_1$-$16_K$ (or the main server 12) via a wireless communication link established between the communication circuitry 48 of the corresponding one of the local servers $16_1$-$16_K$ (or the communication circuitry 28 of the main server 12) and communication circuitry carried by the mobile communication device 80 and/or the vehicle communication device 90.

The mobile communication device 80 may illustratively be any mobile, e.g., hand-held, electronically controlled device capable of establishing a wireless communication link with at least one of the electromechanically controlled fuel dispensers $18_1$-$18_N$, $18_1$-$18_M$, at least one of the local servers $16_1$-$16_K$ and/or the main server 12, and of executing instructions for remotely activating one of the electromechanically controlled fuel dispensers $18_1$-$18_N$, $18_1$-$18_M$ via such a wireless communication link. For example, the mobile communication device 80 may be embodied as, without limitation, a portable computer such as a tablet computer, a laptop computer, a notebook computer, or other mobile computing device, a smart phone, a cellular telephone, or the like. It will be understood that a customer may use multiple different mobile communication devices 80 to remotely activate one of the fuel dispensers $18_1$-$18_N$, $18_1$-$18_M$, and/or that multiple customers may use a single mobile communication device 80 to remotely activate one of the fuel dispensers $18_1$-$18_N$, $18_1$-$18_M$. Further details of one illustrative embodiment of the mobile communication device 80 will be provided below with respect to FIGS. 3 and 5.

The vehicle communication device 90 may illustratively be any electronically controlled device mounted in, embedded in or carried by the motor vehicle 76 that is capable of establishing a wireless communication link with at least one of the electromechanically controlled fuel dispensers $18_1$-$18_N$, $18_1$-$18_M$, at least one of the local servers $16_1$-$16_K$ and/or the main server 12, and of executing instructions for remotely activating one of the electromechanically controlled fuel dispensers $18_1$-$18_N$, $18_1$-$18_M$ via such a wireless communication link. For example, the vehicle communication device 90 may be embodied as or form part of, without limitation, a vehicle navigation system, a vehicle entertainment system, an in-vehicle information system, or the like. Further details of one illustrative embodiment of the vehicle communication device 90 will be provided below with respect to FIGS. 4 and 6.

In some embodiments, the mobile communication device 80 is configured, as will be described in detail below, to wirelessly and remotely activate one of the fuel dispensers $18_1$-$18_N$, $18_1$-$18_M$, via a wireless communication link 82 established between the mobile communication device 80 and the fuel dispenser or via a wireless communication link established between the mobile communication device 80 and a corresponding one of the local servers $16_1$-$16_K$ (or the main server 12), for subsequent dispensation of fuel. In some alternate embodiments, the vehicle communication device 90 may instead be so configured to wirelessly and remotely activate one of the fuel dispensers $18_1$-$18_N$, $18_1$-$18_M$, via a wireless communication link established between the vehicle communication device 90 and the fuel dispenser or via a wireless communication link established between the vehicle communication device 90 and a corresponding one of the local servers $16_1$-$16_K$ (or the main server 12), for subsequent dispensation of fuel. In still other alternate embodiments, the mobile communication device 80 and the vehicle communication device 90 may each be configured to separately or together wirelessly and remotely activate one of the fuel dispensers $18_1$-$18_N$, $18_1$-$18_M$. In this regard, the term "mobile electronic device," as used herein, may refer to and mean the mobile communication device 80 or the vehicle communication device 90, or alternatively to the combination of the mobile communication device 80 and the vehicle communication device 90 operating together.

Figure 2:
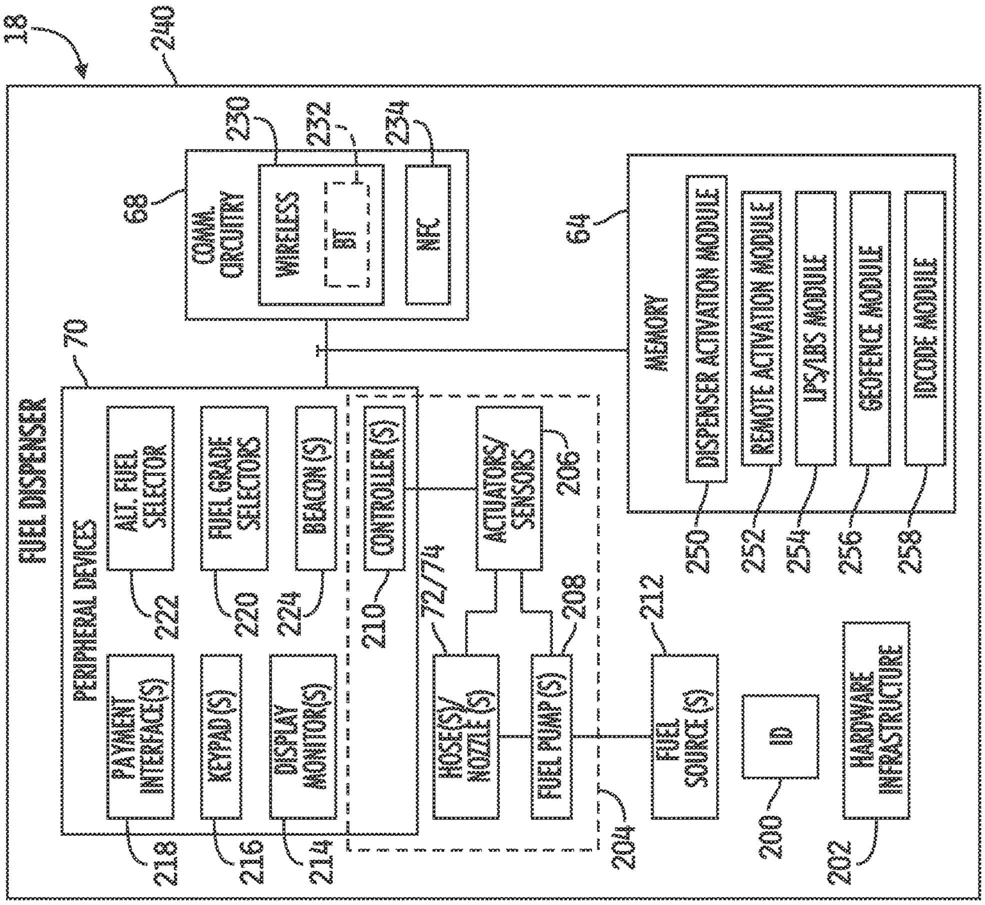
FIG. 2 is a simplified block diagram of an embodiment of an example one of the electromechanically controlled fuel dispensers illustrated in FIG. 1.

Referring now to FIG. 2, a simplified block diagram is shown of an embodiment of some of the features of an example one, 18, of the one or more electromechanically controlled fuel dispensers $18_1$-$18_N$, $18_1$-$18_M$ illustrated in FIG. 1. In the illustrated embodiment, for example, the fuel dispenser 18 includes an identification number or code (ID) 200 mounted to or integral with the fuel dispenser 18. In one embodiment, the ID 200 is illustratively sized to be large enough to be visible by occupants of the motor vehicle 76 and, in some embodiments, by an attendant of the corresponding hub location $52_1$-$52_K$. The ID 200 may illustratively be any one or combination of letters, numbers, symbols or the like. In some alternative embodiments, the ID 200 may be or include a conventional barcode or a 2-dimensional machine-readable code, e.g., a matrix barcode or quick response (QR) code, that may be scanned or otherwise captured, e.g., via a camera, of a mobile communication device 80 for the purpose of identifying the particular fuel dispenser 18. In any case, the fuel dispenser 18 further includes hardware infrastructure 202 in the form of, for example, one or more frames, brackets, shelves and the like to house and support the various electromechanical components and to mount the fuel dispenser at a suitable location relative to the corresponding hub location $52_1$-$52_K$.

The fuel dispenser 18 further includes a fuel dispensing section 204 which includes a number of conventional actuators and sensors 206 coupled to one or more conventional fuel pumps 208, to one or more conventional fuel hose/nozzle combinations 72/74 and electrically connected to one or more conventional controllers 210 that form(s) part of the peripheral devices 70 of the fuel dispenser 18. The one or more fuel pumps 208 is/are fluidly coupled to a plurality of different sources, e.g., storage containers, of fuel 212 via suitable fluid flow conduits. Prior to operating the fuel dispensing section 204, the nozzles 74 of the one or more hose/nozzle combinations 72/74 are typically removably mounted within and supported by a storage receptacle defined by the fuel dispenser 18.

The fuel dispensing section 204 is manually operable or actuatable in a conventional manner to dispense fuel from one of the sources of fuel 212 via one of the hose/nozzle combinations 72/74 when the fuel dispensing section 204 of the fuel dispenser 18 is activated, e.g., by effecting payment and/or selecting an appropriate fuel type and/or grade. For example, a selected one of the nozzles 74 is manually withdrawn from its storage receptacle on the fuel dispenser 18 and inserted into a fuel inlet orifice of the motor vehicle 76 or suitable fuel storage container. When the fuel dispenser 18 is activated, a lever carried by the selected nozzle 74 (and forming one of the actuators 206) is manually actuated to start and stop the flow of fuel from a selected one of the fuel sources 212 through the selected nozzle 74. Fuel flow control is accomplished by the processor 60, which executes conventional instructions stored in the memory 64 of the fuel dispenser 18 to control the one or more controllers 210 to cause one or more of the actuators 206 to engage and control at least one of the fuel pumps 208 to pump fuel from a selected one of the fuel sources 212 through one of the hose/nozzle combinations 72/74. In one embodiment, the plurality of different sources of fuel 212 dispensable from the fuel dispenser 18 includes sources of at least two or more different grades, i.e., octane ratings, of gasoline. In another embodiment, the plurality of different sources of fuel 212 dispensable from the fuel dispenser 18 includes at least one grade, i.e., octane rating, of gasoline and at least one type of diesel fuel. It will be understood, however, that this disclosure does not place any limitations on the number, type and/or grade of different fuels that may be dispensed from the fuel dispenser 18. In this regard, the plurality of different sources of fuel 212 may include any number, types and/or grades of known fuel, liquid or otherwise, examples of which may include, but are not limited to, any grade, i.e., octane rating, of gasoline (e.g., petrol), any grade or type (e.g., petroleum-derived or otherwise) of diesel fuel, compressed natural gas (CNG), compressed hydrogen (CH), a mixture of compressed natural gas and hydrogen (HCNG), liquefied petroleum gas (LPG), Ethanol, biofuel, biodiesel, Kerosene, and the like.

The fuel dispenser 18 illustrated in FIG. 2 further includes a number of additional peripheral devices 70 including, for example, one or more conventional display monitors 214, one or more conventional keypads 216 and one or more conventional payment interfaces 218. The one or more conventional payment interfaces 218 may include at least one conventional payment interface configured to read and identify, e.g., via magnetic stripe, radio-frequency identification tag (RFID), or the like, a pre-paid debit medium, e.g., pre-paid debit card, and/or a charge/credit medium, e.g., credit or debit card. In some embodiments, the one or more payment interfaces 218 may further include at least one conventional payment interface configured to accept and process cash. In any case, the one or more payment interfaces 218 are manually operated in a conventional manner to process payment for the purchase of fuel dispensed by, or to be dispensed by, the fuel dispenser 18.

In some embodiments, the peripheral devices 70 further include a number of conventional fuel grade selectors 220 each identifying a different source 212 of, e.g., a particular grade, i.e., octane rating, of gasoline. Alternatively or additionally, the peripheral devices 70 may also include at least one conventional alternate fuel selector 222 identifying at least one alternate source 212 of fuel, e.g., diesel fuel. In any case, each of the fuel grade selectors 220 and the at least one alternate fuel grade selector 222 are manually-actuated switches or buttons requiring manual selection thereof. Selection of one of the plurality of different fuel sources 212 from which to dispense fuel via the fuel dispenser 18 is conventionally accomplished by manual selection of one of the number of fuel grade selectors 220 or the at least one alternative fuel selector 222.

In some embodiments, the peripheral devices 70 may further include one or more conventional electronic beacons 224, e.g., conventional radio beacons, for the purpose of transmitting radio signals carrying information corresponding to the location and/or identity of the fuel dispenser 18. At least one such beacon 224 may be mounted to or near the fuel dispenser 18, and is illustratively configured to periodically broadcast one or more unique wireless identification signals, i.e., one or more identification signals that distinguish the particular beacon 224 from other beacons 224, e.g., other beacons 224 associated with other fuel dispensers 18. In some alternate embodiments, the at least one beacon 224 may be configured to broadcast one or more unique wireless signals non-periodically. In some embodiments, each fuel dispenser 18 has a single beacon 224 associated therewith, i.e., located at or near the fuel dispenser 18. In other embodiments, each fuel dispenser 18 may have two or more beacons 224, e.g., a "set" of beacons 224, associated therewith. In such embodiments, each set of beacons 224 may illustratively be configured to periodically broadcast a wireless identification signal that is identical to those in the set of beacons but different and distinguishable from the wireless identification signals broadcast by all other beacons 224, e.g., those associated with other fuel dispensers 18. Alternatively, each set of beacons 224 may be configured to periodically broadcast a wireless identification signal that is different and distinguishable from the wireless identification signals broadcast by those beacons 224 within the set of point-of-sale beacons 224 and that is also different and distinguishable from the wireless identification signals broadcast by all other beacons within the retail enterprise.

In some embodiments, the one or more beacons 224 are each configured to periodically broadcast wireless identification signals in the radio frequency (RF) range, although any of the one or more beacons 224 may be configured to alternatively broadcast wireless identification signals in one or more other frequency ranges. In any case, the one or more beacons 224 are further each configured to broadcast wireless identification signals with a predefined broadcast range and/or orientation (i.e., direction). Illustratively, the broadcast range of each beacon 224 is sufficiently large, wide and/or oriented to be detected by mobile communication devices 80 and/or vehicle communication devices 90 carried by customers during a normal fuel stop, e.g., during refueling of a vehicle or other container from a fuel dispenser 18, while is at the same time sufficiently small, narrow and/or oriented so as not to be detected by mobile communication devices 80 and/or vehicle communication devices 90 of customers being processed by one or more adjacent fuel dispensers 18.

Illustratively, the unique wireless identification signals broadcast by each beacon 224 carry decodable information in the form of a unique identification code (UID). Generally, the UID of each beacon 224, or in some embodiments each set of beacons 224, uniquely identifies that beacon 224 and distinguishes that beacon 224 from all other beacons within the retail enterprise or at least those associated with one or more other fuel dispensers 18 located at a common fuel center 52. In some embodiments, the UID may further include, and/or the unique wireless identification signals broadcast by the one or more beacons 224 may additionally carry, beacon type information in the form of a beacon type code (BT). Generally, the beacon type code, BT, identifies the general location or use of the beacon 224 within the retail enterprise. Example beacon types may include, but should not be limited to, fuel dispenser beacons, fuel center beacons, point-of-sale beacons, brick-and-mortar and/or fuel center location entrance beacons, beacons associated with specific departments or product category locations within the retail enterprise, general store location beacons, or the like. The beacon type code, BT, of each beacon 224, in embodiments in which include the beacon type code, BT, is thus a fuel dispenser beacon or "FD beacon." Those skilled in the art will recognize additional and/or alternative information that may be included within or appended to the UID, and/or carried by the unique wireless identification signals broadcast by the one or more beacons 224, and it will be understood that any such additional and/or alternative information is contemplated by this disclosure.

The beacon 224 illustrated in FIG. 2 and just described above represent only one example of a wireless signal broadcasting device that may be included in the peripheral devices 212 of the various fuel dispensers 18$_1$-18$_N$, 18$_1$-18$_M$, and that may be located at or near one or more of the fuel dispensers 18$_1$-18$_N$, 18$_1$-18$_M$ for the purpose of broadcasting one or more unique wireless identification signals. Those skilled in the art will recognize other wireless signal broadcasting devices that may be substituted for one or more of the beacons 224, and it will be understood that any such other wireless signal broadcasting devices are contemplated by this disclosure. Any one or more such alternate wireless signal broadcasting device may be operable to broadcast one or more unique wireless identification signals periodically or non-periodically in any frequency range with any orientation or direction and/or having any broadcast range, and decodable information carried by such one or more unique wireless identification signals may illustratively include, in addition to a unique identification code, UID, a beacon type code (BT) and/or other additional and/or alternative information that may be included within or appended to the UID.

In addition to circuitry for facilitating communication with the local server 16$_1$, the communication circuitry 68 of the fuel dispenser 18 further includes a conventional wireless communication circuit 230 via which the fuel dispenser 18 can communication wirelessly with wirelessly-enabled external devices or systems. The wireless communication circuit 230 may be configured to communicate wirelessly using any known electromagnetic technology, examples of which include, but are not limited to, radio frequency (RF), infrared (IR), microwave (MW), magnetic, optical and the like. In embodiments using radio frequency communication technology, wireless communications may be conducted using any known RF communication protocol, examples of which include, but are not limited to, Bluetooth® shortwave radio communications, wifi wireless local area network (WLAN), wireless Universal Serial Bus (USB), and the like. In the specific example illustrated in FIG. 2, the wireless communication circuit 230 includes a conventional Bluetooth® module 232 configured to conduct wireless communications in accordance with an established Bluetooth® communications protocol. Alternatively or additionally, the communication circuitry 68 may include a conventional near-field communication (NFC) device 234 which may be included in embodiments in which the mobile electronic device (80/90) also has such a near-field communication device such that information, e.g., in the form of instructions and/or customer identification information such as EMSIDs, user names, passwords, or the like, and/or customer payment information, e.g., credit/debit card information or the like, can be transferred from the mobile electronic device (80/90) to the fuel dispenser 18 by tapping the two near-field communication devices together or by passing the near-field communication device of a so-equipped mobile electronic device (80/90) sufficiently close to the near-field communication device 234 to effectuate such communication.

The various components of the fuel dispenser 18 illustrated in FIGS. 1 and 2 are illustratively carried in a single housing 240 which may be formed using one or more panels of one or more suitable materials such as glass, plastic, metal or the like. The housing 240 may have any shape, and in one embodiment is generally rectangular in shape. In some embodiments, the housing 240 may carry a single fuel dispenser, and in other embodiments the housing 240 may carry multiple fuel dispensers, e.g., two fuel dispensers, each facing in opposite directions.

The memory 64 of the fuel dispenser 18 includes a number of software modules stored therein, each containing one or more sets of instructions that are executable by the processor 60 of the fuel dispenser 18 to accomplish a specific function. For example, the memory 64 illustratively includes a conventional dispenser activation module 250 having stored therein instructions which, when executed by the processor 60 of the fuel dispenser 18, cause the processor 60 to be responsive to the above-described manual operations of processing payment and selecting a fuel grade and/or type to control the dispensing section from an inactive state in which the dispensing section 204 is inhibited from dispensing fuel to an active state in which the dispensing section 204 is enabled to be manually manipulated, as described above, to dispense fuel from one of the plurality of different sources of fuel 212. In some embodiments, the inactive state is the normal or default state of the dispensing section 204, and control of the dispensing section 204 from the inactive state to the active state typically requires the sequential, manual operations of processing payment by the one or more payment interfaces 218 followed by manual selection via the selectors 220/222 of a desired fuel type and/or grade. In other embodiments, control of the dispensing section 204 may be at least partially overridden, e.g., to process payment, by an attendant at a corresponding hub location, e.g., 52$_1$. In such embodiments, the payment and fuel selection functions remain manual operations, but the payment operation may be carried out remotely from the fuel dispenser 18 under the control of a local server, e.g., 16$_1$.

In one embodiment, the memory 64 further includes a remote activation module 252 having stored therein instructions which, when executed by the processor 60 of the fuel dispenser 18, cause the processor 60 to control the wireless communication circuit 230 to establish a wireless communication link with a mobile electronic device, i.e., a mobile communication device 80 and/or a vehicle communication device 90, and to then be responsive to instructions transmitted by the remote electronic device to the fuel dispenser 18, via the wireless communication link, to control the dispensing section 204 from the inactive state to the active state. Further details relating to the operation of the fuel dispenser 18 in accordance with such instructions stored in the remote activation module 252 will be described below with respect to FIGS. 9A-9B and 11.

In some embodiments, the memory 64 of the fuel dispenser 18 further includes a conventional local positioning system (LPS) and/or location-based service (LBS) module 254. In one embodiment, the module 254 is an LPS module and has stored therein instructions which, when executed by the processor 60, cause the processor 60 to control the one or more beacons 224 to transmit signals, e.g., radio frequency signals such as Bluetooth® Low Energy signals, wifi, ultra wide band (UWB), etc., containing information that can be used by a compatible LPS module running on the mobile electronic device (80/90) to determine the position of the beacon 224 (and hence, the position of the fuel dispenser 18 and/or the mobile electronic device (80/90). In another embodiment, the module 254 is an LBS module and has stored therein instructions which, when executed by the processor 60, cause the processor 60 to utilize global positioning system (GPS) information transmitted by a so-equipped mobile electronic device to determine its position relative to a known position of the fuel dispenser 18.

The memory 64 of the fuel dispenser 18 may further include a conventional geofence module 256. In one embodiment, the module 256 has stored therein a set of geographic coordinates which together define a virtual boundary at least partially about the fuel dispenser 18. The module 256 further has instructions stored therein which, when executed by the processor 60, cause the processor 60 to utilize global positioning system (GPS) information transmitted by a so-equipped mobile electronic device to determine the position of the mobile electronic device relative to the virtual boundary defined at least partially about the fuel dispenser 18. The processor 60 can thus determine when and whether a GPS-equipped mobile electronic device has entered and exited the area defined within the virtual boundary.

The memory 64 of the fuel dispenser 18 may further include an ID Code module 258 having stored therein instructions which, when executed by the processor 60, cause the processor 60 to generate a random or pseudo-random number (IDCODE), and to control one of the display monitors 214 to display the generated number. Illustratively, the generated number may include any number of digits, and may include or incorporate one or more non-random numbers, such as an identification number of the fuel dispenser, an identification number of the hub location $\mathbf{52}_1$, or the like. As one specific example, a random two-digit number, e.g., 23, may be generated by the processor 60 and combined with the identification number, e.g., 1, of the fuel dispenser 18 to produce the IDCODE 231 which the processor 60 then causes to be displayed on one of the display monitors. In embodiments that include the IDCODE module, the remote activation module 252 may, as described below, include instructions to establish a wireless communication link with a mobile electronic device that is within wireless communication range of the fuel dispenser 18 and that transmits the displayed IDCODE in response to user input to the mobile electronic device. Illustratively, the instructions stored in the IDCODE module 256 may cause the processor 60 to periodically regenerate and display the IDCODE with any specified frequency, and/or to require detection of the transmission by a mobile electronic device of any number of sequentially generated IDCODES before establishing a wireless communication link with the mobile electronic device.

Figure 3:
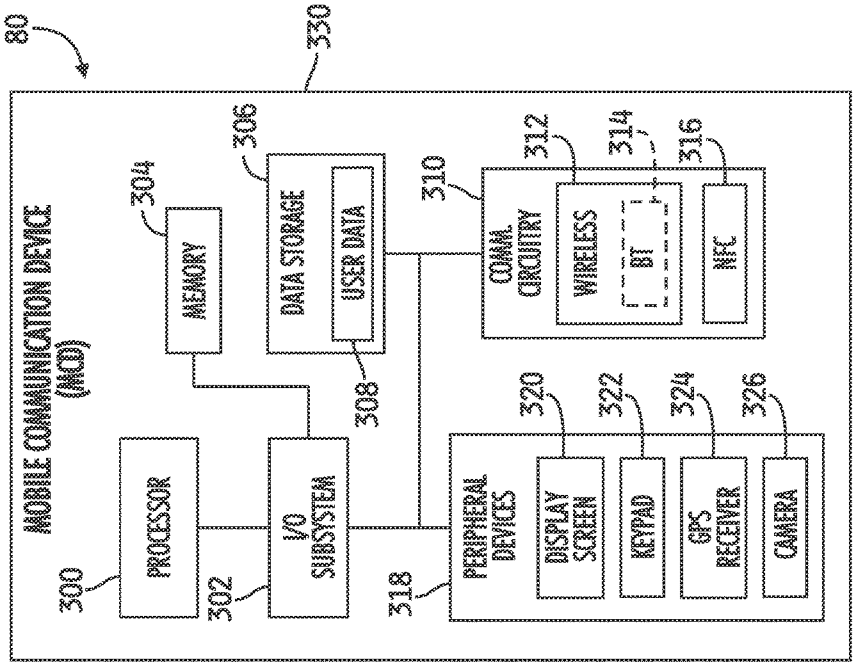
FIG. 3 is a simplified block diagram of an embodiment of the mobile communication device illustrated in FIG. 1.

Referring now to FIG. 3, a simplified block diagram of an embodiment of the mobile communication device (MCD) 80 is shown. In the illustrated embodiment, the mobile communication device 80 generally includes the same components as the main server 12. For example, a processor 300 is coupled to an I/O subsystem 302, and the I/O subsystem 302 is coupled to a memory 304, a data storage unit 306, communication circuitry 310 and one or more peripheral devices 318. In some embodiments, some or all of the foregoing components may be identical to corresponding components of the main server 12 and/or of the fuel dispenser 18 described above, and a detailed explanation of such components will not be repeated here for brevity. In other embodiments, the mobile communication device 80 may be configured differently than the main server 12 and/or the fuel dispenser 18 described above. In the illustrated embodiment, for example, the data storage 306 includes a user data area 308 within which data specific to the user may be stored. Examples of such user data may include, but should not be limited to, payment information identifying one or more systems of payment, e.g., credit/debit card information, prepaid debit card information, fuel-specific charge card, etc., specific to the user via which payment can be processed for the purchase of fuel, motor vehicle information identifying one or more motor vehicles for which the user may purchase fuel, fuel type and/or grade preferences of the user, photographic data, e.g., of odometer readings, etc., and the like.

The communication circuitry 310 is illustratively identical to the communication circuitry 68 of the fuel dispenser 18, particularly in embodiments in which a wireless communication link will be established between the fuel dispenser 18 and the mobile communication device 80 and/or between the mobile communication device 80 and another electronic system, e.g., one of the plurality of local servers $\mathbf{16}_1$-$\mathbf{16}_K$ and/or the main server 12. In the illustrated embodiment, the communication circuitry 310 illustratively includes a wireless communication circuit 310, and in some embodiments the wireless communication circuit 310 further illustratively includes a Bluetooth® module 314 configured to conduct radio frequency communication in accordance with one or more known Bluetooth® communications protocols (including, for example, Bluetooth® Low Energy). If and when wirelessly communicating with the main server 12, a local server 16 or a fuel dispenser 18, the mobile communication device 16 may use any suitable communication protocol. As with the communication circuitry 68 of the fuel dispenser 18, some embodiments of the communication circuitry 310 of the mobile electronic device 80 may alternatively or additionally include a near-field communication (NFC) device 316 such that information, e.g., in the form of instructions, can be transferred from NFC device 316 of the mobile electronic device (80/90) to the NFC device 254 of the fuel dispenser 18 (and/or vice versa) by tapping the two near-field communication devices together or by passing/holding the mobile communication device 80 sufficiently close to the fuel dispenser 18 so as to effectuate such communication.

The peripheral devices 318 of the mobile electronic device 80 illustratively include at least one display screen 320, at least one keypad 32, a GPS receiver 324, and a camera 326. In some embodiments, the display screen 320 may be a conventional display-only screen, in which case a keypad 32 is provided separately from the screen 320. In other embodiments, the display screen 320 may be a conventional touch-screen display, and in such embodiments they keypad 32 may be omitted if included as part of the touch-screen display. The GPS receiver 324 is illustratively a conventional global positioning system (GPS) receiver configured to continually determine the geographical coordinates of the mobile communication device 80 (and optionally the time of day) via radio signals continually broadcast by a plurality of earth-orbiting GPS satellites, and to provide such geographical coordinates (and optionally the time of day) to the processor 300. The camera 326 is likewise conventional, and conventional instructions are stored in the memory 304 via which the processor 300 can control operations of the camera 326 and to capture, time, date and coordinate stamp, and store in the data storage 308 photos taken by the camera 326.

The various components of the mobile communication device 80 illustrated in FIG. 3 are illustratively carried in a single housing 330 or case which may be formed using one or more panels of one or more suitable materials such as glass, plastic, metal or the like. The housing 330 or case may have any shape, and in one embodiment is generally rectangular in shape.

Figure 4:
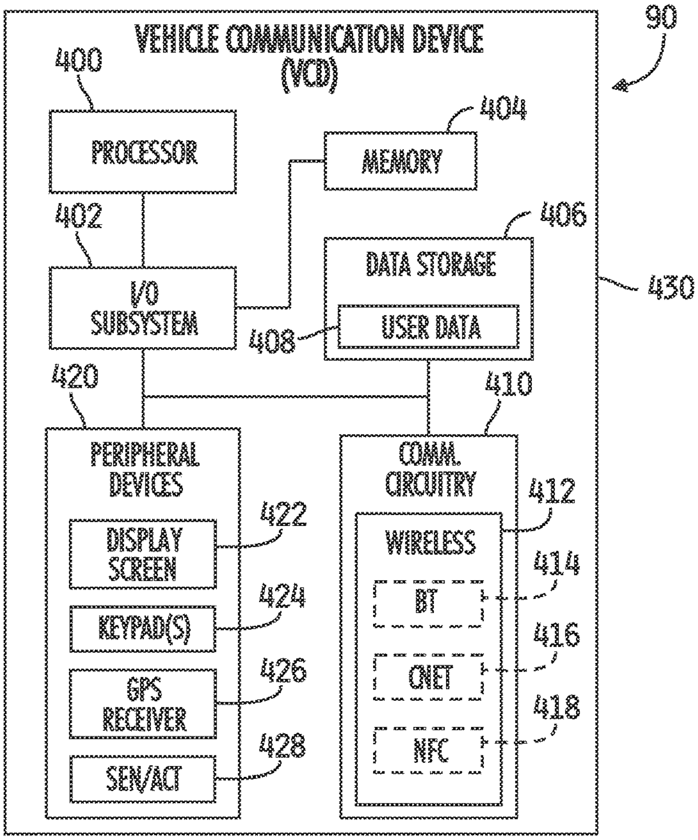
FIG. 4 is a simplified block diagram of an embodiment of the vehicle communication device illustrated in FIG. 1.

Referring now to FIG. 4, a simplified block diagram of an embodiment of the vehicle communication device (VCD) 90 of FIG. 1 is shown. In the illustrated embodiment, the vehicle communication device 90 generally includes the same components as the main server 12. For example, a processor 400 is coupled to an I/O subsystem 402, and the I/O subsystem 402 is coupled to a memory 404, a data storage unit 406, communication circuitry 410 and one or more peripheral devices 420. In some embodiments, some or all of the foregoing components may be identical to corresponding components of the main server 12 and/or of the fuel dispenser 18 and/or of the mobile communication device 80 described above, and a detailed explanation of such components will not be repeated here for brevity. In other embodiments, the vehicle communication device 90 may be configured differently than the main server 12 and/or the fuel dispenser 18 and/or the mobile communication device 80 described above.

In the illustrated embodiment, the data storage 406 includes a user data area 408 within which data specific to the user may be stored as described above with respect to the user data area 308 of the data storage 306 of the mobile electronic device 80. The communication circuitry 410 is illustratively identical to the communication circuitry 310 of the mobile communication device 80, particularly in embodiments in which a wireless communication link will be established between the vehicle communication device 90 and a fuel dispenser 18, a local server 16 and/or the main server 12. In the illustrated embodiment, the communication circuitry 410 thus illustratively includes a wireless communication circuit 410 that further illustratively includes a Bluetooth® module 414 configured to conduct radio frequency communication in accordance with one or more known Bluetooth® communications protocols (including, for example, Bluetooth® Low Energy), and a near-field communication (NFC) device 418 such that information, e.g., in the form of instructions and/or data, can be transferred from NFC device 418 of the vehicle electronic device 90 to the NFC device 254 of the fuel dispenser 18 and/or vice versa, and/or such that information can be transferred by the NFC device 418 of the vehicle communication device 90 to the NFC device 316 of the mobile communication device 80 and/or vice versa. The communication circuitry 410 may further illustratively include a network communication device 416 that allows the vehicle communication device 90 to wirelessly access the Internet or other communication network.

The peripheral devices 420 of the vehicle electronic device 90 illustratively include at least one display screen 422, at least one keypad 424 and a GPS receiver 426, all as described above with respect to the peripheral devices 318 of the mobile electronic device 80. The peripheral devices 420 further illustratively include a number of vehicles sensors and/or actuators, or a data interface accessing such sensors and/or actuators, via which the processor 400 can receive vehicle and/or engine operating information. As one particular example of such vehicle operating information, which should not be considered limiting in any way, the processor 400 illustratively has access to odometer mileage such that the processor 400 may, at any time, determine the current mileage traveled by the vehicle 76.

The various components of the vehicle communication device 90 illustrated in FIG. 4 are illustratively carried in a single housing 430 or case which may be formed using one or more panels of one or more suitable materials such as glass, plastic, metal or the like. The housing 430 or case may have any desired shape, and may be partially or fully embedded within a structure, e.g., an instrument panel, of the motor vehicle 76.

Figure 5:
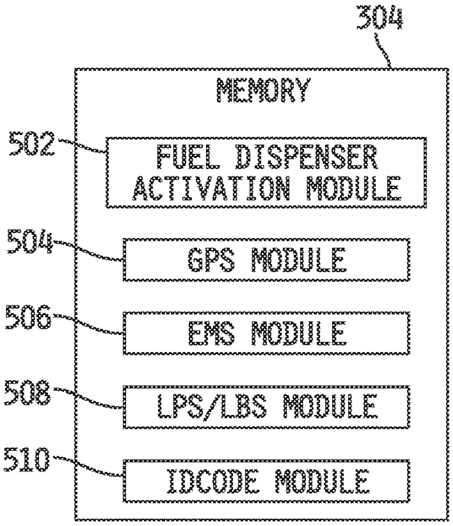
FIG. 5 is a simplified block diagram of an embodiment of the memory of the mobile communication device of FIG. 3 showing a number of illustrative software algorithm modules stored therein.

Referring now to FIG. 5, a simplified block diagram of an embodiment of the memory 304 of the mobile communication device 80 of FIG. 3 is shown illustrating a number of software algorithm modules stored therein. In the illustrated embodiment, for example, the memory 304 includes a fuel dispenser activation module 502 having stored therein instructions executable by the processor 300 of the mobile electronic device 80. In one embodiment, the fuel dispenser activation module 502 has instructions stored therein which, when executed by the processor 300, cause the processor 300 to control the wireless communication circuit 310 to establish a wireless communication link with the wireless control circuit 230 one of the fuel dispensers $\mathbf{18}_1$-$\mathbf{18}_N$, $\mathbf{18}_1$-$\mathbf{18}_M$, (or with the wireless control circuit of one of the local servers $\mathbf{16}_1$-$\mathbf{16}_K$ or the main server 12), and to then transmit instructions to the fuel dispenser (or a corresponding one of the local servers or the main server), via the wireless communication link, to control the dispensing section 204 of the fuel dispenser from the inactive state to the active state. Further details relating to one embodiment of the operation of the mobile communication device 80 in accordance with instructions stored in the fuel dispenser activation module 502 will be described below with respect to FIGS. 9A-9B and 10. Other embodiments of the operation of the mobile communication device 80 in accordance with instructions stored in the fuel dispenser activation module 52 will be described with respect to FIGS. 14-22.

The memory 304 of the mobile communication device 80 further includes a global positioning system (GPS) module 504 having instructions stored therein which, when executed by the processor 300 of the mobile electronic device 80, cause the processor 300 to continually receive geographical coordinates (and time of day information) from the GPS receiver 324. In some embodiments, the processor 300 is further operable, in accordance with the instructions stored in the GPS module 504 to transmit one or more times or periodically, e.g., at the request of the LBS module 254 and/or geofence module 256 of the fuel dispenser 18, the geographical coordinates of the GPS receiver 324 via the wireless communication circuit 312.

The memory 304 of the mobile communication device 80 further includes an enterprise member services (EMS) module 506 having instructions stored therein which are executable by the processor 300 of the mobile electronic device 80. In one embodiment, the instructions stored in the EMS module 506 illustratively cause the processor 300 to have access to the customer's enterprise member services account and to the customer's rewards repository, both maintained by the main server 12. In other embodiments, the EMS module 308 may include instructions executable by the processor 300 to communicate customer-member information to and from the main server 12 or other system, to control one or more local peripheral devices to facilitate communications between customer-members of the enterprise membership service (EMS) program and the main server 12 or other system and to facilitate customer input of customer-identifying information, e.g., an EMS identifying number and/or code (EMSID).

The memory 304 of the mobile communication device 80 may further include a location position system (LPS) and/or location-based services (LBS) module 508 which may illustratively be identical or communicatively complementary to the LPS/LBS module 256 described above with respect to the fuel dispenser 18. In embodiments that include the LPS/LBS module 508, the module 508 illustratively has instructions stored therein which, when executed by the processor 300 of the mobile electronic device 80, cause the processor 300 to control the wireless communication circuit 312 to transmit signals one or more times or periodically, e.g., in response to a request signal transmitted by an LPS/LBS device or system of a fuel dispenser 18, local server 16 or main server 12, or vice versa, in order to facilitate a determination of the position of the mobile electronic device 80 relative to one or more fuel dispensers $\mathbf{18_1}$-$\mathbf{18_N}$, $\mathbf{18_1}$-$\mathbf{18_M}$ (or relative to one of the local servers $\mathbf{16_1}$-$\mathbf{16_K}$ or the main server 12) or vice versa.

The memory 304 of the mobile communication device 80 may further include an identification code (IDCODE) module 510 that is communicatively complementary to the IDCODE module 258 described above with respect to the fuel dispenser 18. In embodiments that include the IDCODE module 510, for example, the module 510 illustratively has instructions stored therein which, when executed by the processor 300 of the mobile electronic device 80, cause the processor 300 to be responsive to user input of the random or pseudo-random IDCODE produced by the processor 60 of one of the fuel dispensers $\mathbf{18_1}$-$\mathbf{18_N}$, $\mathbf{18_1}$-$\mathbf{18_M}$ and displayed on one of the display monitors 214 to control the wireless communication circuit 312 to transmit signals one or more times or periodically, for the purpose of establishing a wireless communication link with the corresponding one of the fuel dispensers $\mathbf{18_1}$-$\mathbf{18_N}$, $\mathbf{18_1}$-$\mathbf{18_M}$ (or local server 16 or main server 12 coupled thereto).

Figure 6:
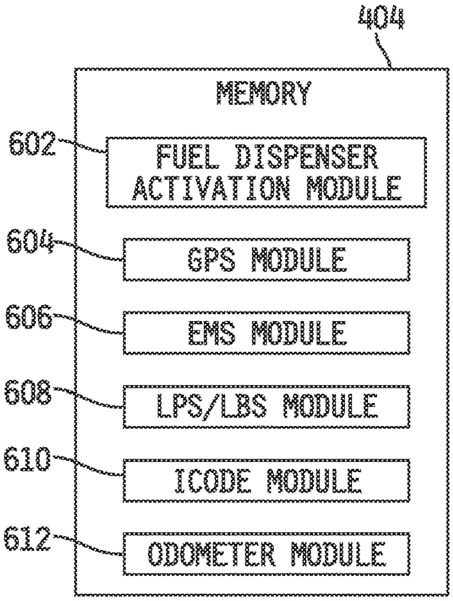
FIG. 6 is a simplified block diagram of an embodiment of the memory of the vehicle communication device of FIG. 4 showing a number of illustrative software algorithm modules stored therein.

Referring now to FIG. 6, a simplified block diagram of an embodiment of the memory 404 of the vehicle communication device 90 of FIG. 4 is shown illustrating a number of software algorithm modules stored therein. In the illustrated embodiment, for example, the memory 404 includes a fuel dispenser activation module 602 having stored therein instructions which are executable by the processor 400 of the vehicle electronic device 90. In one embodiment, the fuel dispenser activation module 602 has instructions stored therein which, when executed by the processor 400, cause the processor 400 to control the wireless communication circuit 412 to establish a wireless communication link with the wireless control circuit 230 one of the fuel dispensers $\mathbf{18_1}$-$\mathbf{18_N}$, $\mathbf{18_1}$-$\mathbf{18_M}$, (or with the wireless control circuit of one of the local servers $\mathbf{16_1}$-$\mathbf{16_K}$ or the main server 12), and to then transmit instructions to the fuel dispenser (or a corresponding one of the local servers or the main server), via the wireless communication link, to control the dispensing section 204 of the fuel dispenser from the inactive state to the active state. Further details relating to such operation of the vehicle communication device 90 in accordance with one embodiment of the instructions stored in the fuel dispenser activation module 602 will be described below with respect to FIGS. 9A-9B and 10. Other embodiments of the operation of the vehicle communication device 90 in accordance with instructions stored in the fuel dispenser activation module 52 will be described with respect to FIGS. 14-22.

The memory 404 further includes a GPS module 604, and an EMS module 606 identical in structure and operation to the GPS module 504 and EMS module 506 of the memory 304 of the mobile communication device 80. The memory 404 may further include an LPS/LBS module 608 and an IDCODE module 610 that are each likewise identical in structure and operation to the LPS/LBS module 508 and IDCODE module 510 of the memory 304 of the mobile communication device 80. The memory 404 may further include an odometer module 612 having instructions stored therein which, when executed by the processor 400 of the vehicle communication device 90, cause the processor 400 to monitor and maintain a current value of the vehicle odometer, i.e., a current value of the mileage traveled by the motor vehicle 76.

Figure 7:
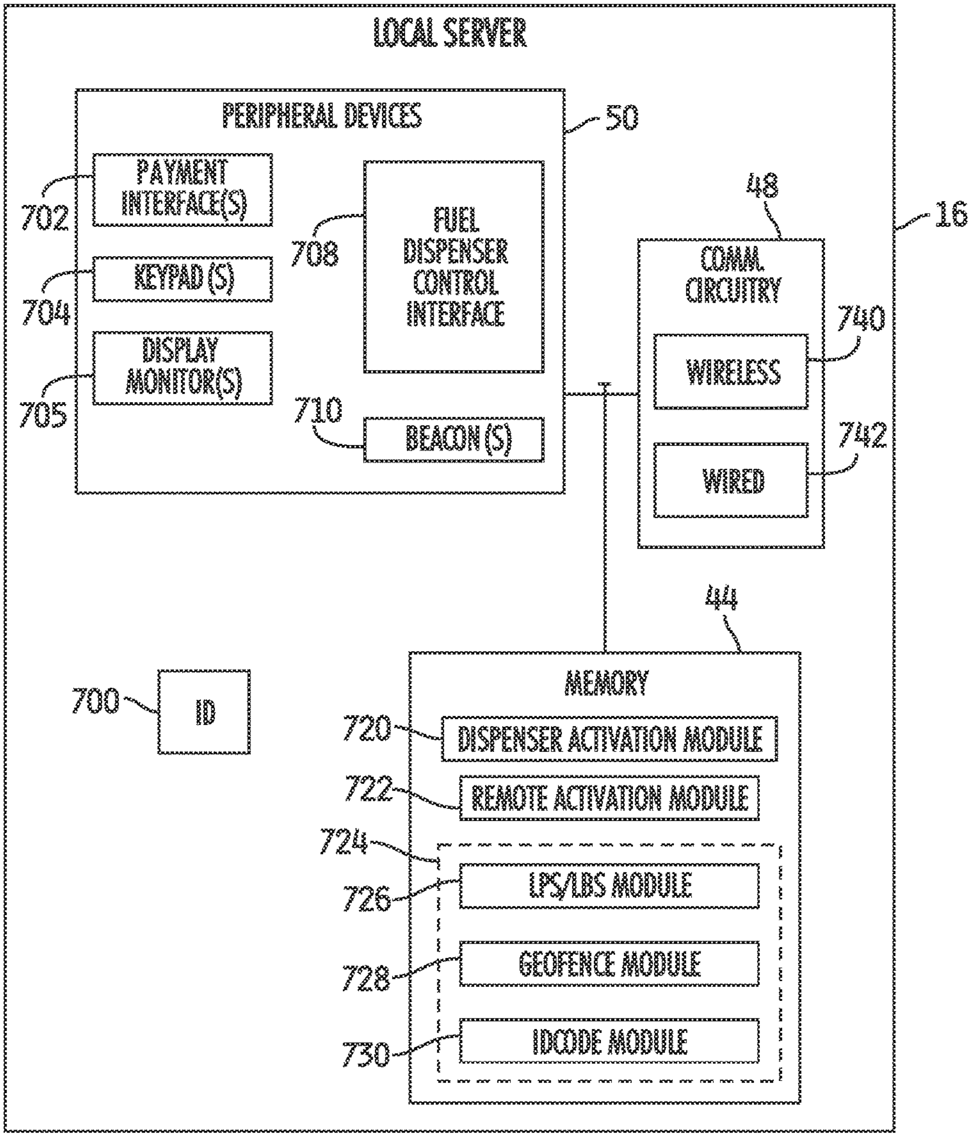
FIG. 7 is a simplified block diagram of an embodiment of an example one of the local servers illustrated in FIG. 1.

Referring now to FIG. 7, a simplified diagram of an embodiment of some of the features of an example one, 16, of the local servers $\mathbf{16_1}$-$\mathbf{16_K}$ illustrated in FIG. 1 is shown. In the illustrated embodiment, the peripheral devices 50 of the local server 16 illustratively include one or more payment interfaces 702, one or more keypads 704 and one or more display monitors 706, all of which may be similar or identical in structure and/or function to like components of the fuel dispenser 18 illustrated in FIG. 2. The peripheral devices 50 further illustratively include a conventional fuel dispenser control interface 708 having a number of manually operated switches via which operation of one or more of the number of on-site fuel dispensers $\mathbf{18_1}$-$\mathbf{18_N}$, $\mathbf{18_1}$-$\mathbf{18_M}$ may be controlled and/or overridden. For example, the manual payment operation described above with respect to FIG. 2 may, in some embodiments, be alternatively effectuated via the one or more payment interfaces 702 of the local server 16, and in such cases the attendant may then manually control the fuel dispenser control interface 708 to override this operation on the corresponding fuel dispenser 18 such that, after effectuating payment via the one or more payment interfaces 702, the customer need only remotely control the fuel dispenser 18 to select a desired type and/or grade of fuel.

The peripheral devices 50 of the local server 16 may, in some embodiments, further include one or more beacons 710 identical in structure and function to the one or more beacons 224 described with respect to FIG. 2, except that in embodiments in which the UID includes beacon type information such beacon type information illustratively identifies the one or more beacons 710 as one or more fuel center beacons 710. Likewise, the local server 16 may include a unique identification number or code 700, and the memory 720 may include a conventional dispenser activation module 720, a remote activation module 722 and one or more additional modules 724, such as an LPS/LBS module 726, a geofence module 728 and/or an IDCODE module 730, all identical in structure and operation to like-named components and modules illustrated and described above with respect to FIG. 2. The communication circuitry 48 may further include wireless communication circuitry 740 in addition to wired communication circuitry 742 used to normally communicate with the one or more fuel dispensers $\mathbf{18_1}$-$\mathbf{18_N}$, $\mathbf{18_1}$-$\mathbf{18_M}$.

In one embodiment, a wireless communication link is established between the mobile electronic device (i.e., the mobile communication device 80 and/or the vehicle communication device 90) and one of the electromechanically controlled fuel dispensers $\mathbf{18_1}$-$\mathbf{18_N}$, $\mathbf{18_1}$-$\mathbf{18_M}$. The mobile electronic device may then be operated to remotely and wirelessly control the fuel dispenser, e.g., $\mathbf{18_1}$, via the wireless communication link, to an activated state in which the dispensing section 204 of the fuel dispenser, e.g., $\mathbf{18_1}$, is enabled to be mechanically manipulated to dispense fuel. In such embodiments, the mobile electronic device may directly control the fuel dispenser $\mathbf{18_1}$, and in such cases the control section of the fuel dispenser $\mathbf{18_1}$ which controls activation of the dispensing section 204 includes the processor 60, the remote activation module 252 and the one or more controllers 210. Alternatively, the fuel dispenser $\mathbf{18_1}$ may operate as a pass-through device by passing all commands/requests from the mobile electronic device to the corresponding local server, e.g., $\mathbf{16_1}$, or the main server 12, and acting only upon commands/requests transmitted back to the fuel dispenser $\mathbf{18_1}$ from the local server $\mathbf{16_1}$ or the main server 12. In such cases, the processor 40 of the local server $\mathbf{16_1}$ (or the processor 20 of the main server 12) primarily controls the dispensing section 204 of the fuel dispenser $\mathbf{18_1}$, and the "control section" of the fuel dispenser $\mathbf{18_1}$ which controls activation of the dispensing section 204 thus includes not only the processor 60 and the one or more controllers 210 acting upon the dispensing section 204 of the fuel dispenser $\mathbf{18}_1$ but also the processor 40 and remote activation module 722 of the local server $\mathbf{16}_1$ (or the processor 20 and similar remote activation module stored within the memory 24 of the main server 12). Alternatively still, control of the dispensing section 204 may be carried out in-part by the processor 60, under the direction of instructions stored in the remote activation module 252 of the fuel dispenser $\mathbf{18}_1$, and in-part by the processor 40 under the direction of instructions stored in the remote activation module 722 of the local server $\mathbf{16}_1$ (or the processor 20 and similar remote activation module stored within the memory 24 of the main server 12). In such cases, the "control section" of the fuel dispenser $\mathbf{18}_1$ which controls activation of the dispensing section 204 thus includes not only the processor 60, the remote activation module 252 and the one or more controllers 210 acting upon the dispensing section 204 of the fuel dispenser $\mathbf{18}_1$ but also the processor 40 and remote activation module 722 of the local server $\mathbf{16}_1$ (or the processor 20 and similar remote activation module stored within the memory 24 of the main server 12).

In other embodiments, the wireless communication link may be established between the mobile electronic device (i.e., the mobile communication device 80 and/or the vehicle communication device 90) and a local server, e.g., $\mathbf{16}_1$, serving a plurality of electromechanically controlled fuel dispensers, e.g., $\mathbf{18}_1$-$\mathbf{18}_N$. In such cases, the "control section" of the selected fuel dispenser, e.g., $\mathbf{18}_1$, which controls activation of the dispensing section 204 may include primarily the processor 40, acting under the direction of the remote activation module 722 of the local server $\mathbf{16}_1$ (or the processor 20 and similar remote activation module stored within the memory 24 of the main server 12), and also the processor 60 controlling the one or more controllers 210 in accordance with instructions received from the processor 40 of the local server $\mathbf{16}_1$. Alternatively, the local server $\mathbf{16}_1$ in this embodiment may operate as a pass-through device by passing all commands/requests from the mobile electronic device to the selected fuel dispenser, e.g., $\mathbf{18}_1$, and by passing all fuel dispenser operating information provided by the fuel dispenser $\mathbf{18}_1$ back to the mobile electronic device via the wireless link. In such cases, the processor 60 of the fuel dispenser $\mathbf{18}_1$ primarily controls the dispensing section 204 of the fuel dispenser $\mathbf{18}_1$ under the direction of the remote activation module 252, and the "control section" of the fuel dispenser $\mathbf{18}_1$ which controls activation of the dispensing section 204 thus includes not only the processor 40 of the local server $\mathbf{16}_1$ but also the processor 60, the remote activation module 252 of the fuel dispenser $\mathbf{18}_1$ and the one or more controllers 210. Alternatively still, control of the dispensing section 204 in this embodiment may be carried out in-part by the processor 60, under the direction of instructions stored in the remote activation module 252 of the fuel dispenser $\mathbf{18}_1$, and in-part by the processor 40 under the direction of instructions stored in the remote activation module 722 of the local server $\mathbf{16}_1$ (or the processor 20 and similar remote activation module stored within the memory 24 of the main server 12). In such cases, the "control section" of the fuel dispenser $\mathbf{18}_1$ which controls activation of the dispensing section 204 thus includes not only the processor 60, the remote activation module 252 and the one or more controllers 210 acting upon the dispensing section 204 of the fuel dispenser $\mathbf{18}_1$ but also the processor 40 and remote activation module 722 of the local server $\mathbf{16}_1$ (or the processor 20 and similar remote activation module stored within the memory 24 of the main server 12).

In still other embodiments, the wireless communication link may be established between the mobile electronic device (i.e., the mobile communication device 80 and/or the vehicle communication device 90) and the main server 12. In such cases, the "control section" of the selected fuel dispenser, e.g., $\mathbf{18}_1$, which controls activation of the dispensing section 204 may include primarily the processor 20, acting under the direction of a remote controlled fueling module 842 of the main server 12, and also the processor 60 controlling the one or more controllers 210 in accordance with instructions received from the processor 20 of the main server 12. Alternatively, the main server 12 in this embodiment may operate as a pass-through device by passing all commands/requests from the mobile electronic device to the selected fuel dispenser, e.g., $\mathbf{18}_1$, and by passing all fuel dispenser operating information provided by the fuel dispenser $\mathbf{18}_1$ back to the mobile electronic device via the wireless link. In such cases, the processor 60 of the fuel dispenser $\mathbf{18}_1$ primarily controls the dispensing section 204 of the fuel dispenser $\mathbf{18}_1$ under the direction of the remote activation module 252, and the "control section" of the fuel dispenser $\mathbf{18}_1$ which controls activation of the dispensing section 204 thus includes not only the processor 20 of the main server 12 but also the processor 60, the remote activation module 252 of the fuel dispenser $\mathbf{18}_1$ and the one or more controllers 210. Alternatively still, control of the dispensing section 204 in this embodiment may be carried out in-part by the processor 60, under the direction of instructions stored in the remote activation module 252 of the fuel dispenser $\mathbf{18}_1$, and in-part by the processor 20 under the direction of instructions stored in the remote controlled fueling module 842 of the main server 12. In such cases, the "control section" of the fuel dispenser $\mathbf{18}_1$ which controls activation of the dispensing section 204 thus includes not only the processor 60, the remote activation module 252 and the one or more controllers 210 acting upon the dispensing section 204 of the fuel dispenser 181 but also the processor 10 and remote controlled fueling module 842 of the main server 12.

Thus, depending upon the nature of the devices between which the wireless communication link is established, the "control section" which controls activation of the dispensing section 204 of the selected fuel dispenser 18 may be solely contained within the fuel dispenser 18 or contained, in-part, within the fuel dispenser 18 and in-part within a local server $\mathbf{16}_1$ or main server 12 to which the fuel dispenser 18 is communicatively coupled.

Figure 8:
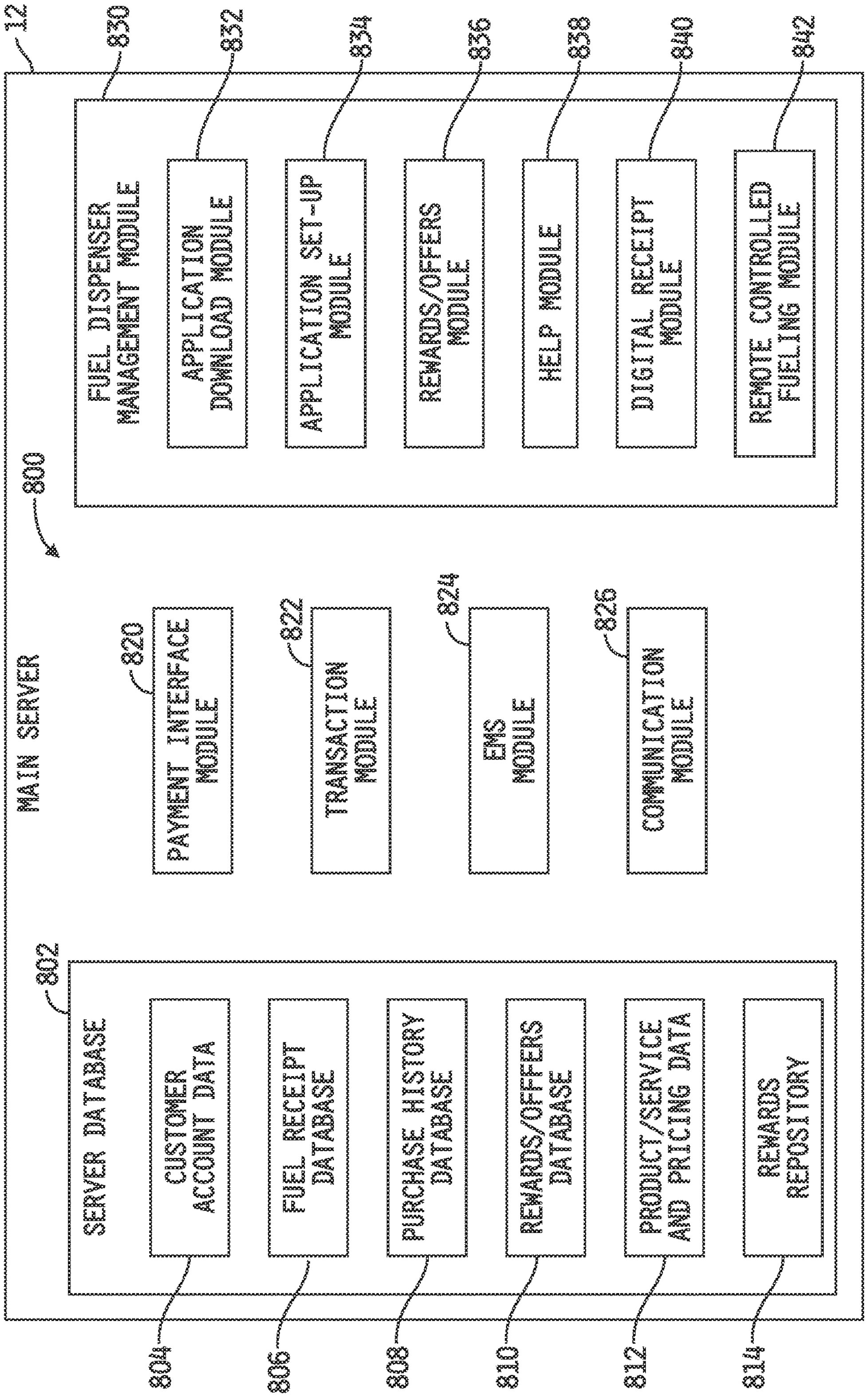
FIG. 8 is a simplified block diagram of an embodiment of a software environment of the main server illustrated in FIG. 1.

Referring now to FIG. 8, a simplified block diagram of an embodiment of a software environment 800 of the main server illustrated in FIG. 1 is shown. In the illustrated embodiment, the environment 800 includes a server database 802 which includes customer account data 804, a fuel receipt database 806, a customer purchase history database 808, a rewards/offers database 810, product/service and pricing data 412 and a rewards repository 814. The main server 12 further includes a payment interface module 820, a transaction module 822, an enterprise member services (EMS) module 824 and a communication module 826, as well as a fuel dispenser management module 830.

The main server 12 manages payment transactions, oversees the operations of the local servers $\mathbf{16}_1$-$\mathbf{16}_K$ and provides, stores and manages rewards/offers, i.e., virtual discount coupons, for customer members of the enterprise member services (EMS) program offered and managed by the enterprise via the EMS module 824. Customers may elect to participate in the EMS program offered, managed and maintained by the retail enterprise by establishing a user account (which may be referred to herein as an "EMS account" or "customer account") within the server 12, which user account may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "shopper," "customer," "member," "customer member" and "household," and variants thereof, are used interchangeably in this disclosure, and such terms should be understood to refer interchangeably to an individual customer or a predefined group of individual customers (referred to herein as a "household") who purchase products and/or services from the enterprise, including fuel from any of its hub locations $\mathbf{16}_1$-$\mathbf{16}_K$, and who are members of an enterprise member services (EMS) program of the type described herein and provided and managed by the retail enterprise.

Illustratively, a software application program is available for download from the main server 12 via a public network 1202 (see, e.g., FIG. 12) for customers electing to access the EMS program via one or more of their mobile electronic devices, e.g., one or more mobile communication devices 80 and/or one or more vehicle communication devices 90. Once downloaded and activated, customers can access and manage their EMS program account and program features via the software application module executed by their mobile electronic device, e.g., the EMS module 508 in the case of the mobile communication device 80 and the EMS module 606 in the case of the vehicle communication device 90. Illustratively, the main server 12 additionally hosts and controls an EMS website accessible via the public network 1202, and in such embodiments customers can access and manage their EMS accounts and program features by accessing their EMS page(s) of the EMS website hosted by the main server 12 via a web-enabled computing device, e.g., either the mobile communication device 80, the vehicle communication device 90 or another web-enabled computing device such as a personal, laptop, notebook or tablet computer. In embodiments in which customers access and manage their EMS accounts and program features via the EMS website, any such mobile communication device 80, vehicle communication device 90 and/or other web-enabled computing device will illustratively be equipped with one or more conventional web browsers.

In the illustrated embodiment, the customer account data 804 of the server database 802 has stored therein information relating to user accounts and profile data for each of the customer members of the EMS program. As customers join the EMS program, the server 12 establishes an EMS account within the customer account data 804 that is unique to the customer, and assigns to customer, or the customer selects, a corresponding EMS member identification (EMSID) as briefly described above. The EMSID associated with each customer is entered into the main server 12 and stored along with the customer's profile data in the customer account data 804 of the main server 12. Illustratively, the EMSID may thereafter be used to access the customer's EMS account.

In some embodiments, the EMSID may illustratively include or identify a purchase tracking identifier code. Such a purchase tracking identifier code may be or include, for example, one or more of a customer ID card, an ID associated with an RFID tag, which RFID tag may be part of the NFC communication circuitry of the mobile electronic device, a shopper's incentive card, or the like. At least one of the above-described purchase tracking identifier code items may be provided to the main server 12 automatically by the fuel dispenser activation module 502, 602 of the mobile electronic device upon establishment of the wireless communication link between the mobile electronic device and a selected one of the fuel dispensers $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$ or the main server 12). It is through such a purchase tracking identifier code that the main server 12 monitors and may track, via the EMS module 824, purchases made by customer members from the retail enterprise during purchase transactions, including fuel purchases made by customer members. All such purchase transaction data relating to items purchased by customer members during purchase transactions carried out via one or more payment interfaces is stored in the customer purchase history database 808. Illustratively, the purchase transaction data includes, but is not limited to, product/service identification information, product/service pricing, and the like.

In other embodiments, the EMSID may not be provided in or as part of any tangible form, and may instead be or include one or more easily remembered sequences of numbers, letters, symbols or other characters. In any case, EMSIDs communicated to any of the fuel dispensers 18 or to a local server 16 or the main server 12 allows the main server 12 to identify the corresponding customers. For example, when a customer manually enters the customer's EMSID into one of the fuel dispensers 18 as part of a purchase transaction (e.g., during the purchase transaction or as part of the process of commencing the purchase transaction), the processor 60 of the fuel dispenser 18 communicates the EMSID to the main server 12 which identifies the shopper via the EMSID and associates that shopper with the current purchase transaction being carried out at the corresponding fuel dispenser 18. As will be described in greater detail below, the member shopper's EMSID may, in some embodiments, be automatically provided, via the member shopper's mobile communication device 80 or vehicle communication device 90, to the main server 12 during a purchase transaction, e.g., in a manner that is transparent or semi-transparent to the customer and that does requires the customer to perform few or no manual acts. In any case, all such purchase transaction data relating to fuel purchased by such an identified customer during a purchase transaction carried out via one of the fuel dispensers 18 of the retail enterprise is illustratively stored in the customer purchase history database 808 where it is associated with the identified customer via the customer's EMSID. The main server 12 may, in some embodiments, make virtual discount offers available to the customer and/or associate purchases made by the customer with the customer's purchase history to thereby monitor and track purchases, including fuel purchases, made by the customer from the retail enterprise during purchase transactions. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to shopper members, and/or which tracks items purchased by shopper members during item purchase transactions at point-of-sale systems or terminals may be alternatively be used.

As part of the EMS program described herein, the main server 12 may provide discount rewards or offers to customer members for one or more items purchasable from the business enterprise, e.g., in the form of one or more corresponding virtual discount coupons. In this regard, each customer member is provided by the main server 12 with access to dedicated rewards repository 814 in which such discount rewards specific to the customer member are stored and via which the customer member may access and redeem one or more such virtual discount coupons. In one embodiment, the server database 802 includes a plurality of rewards repositories 814; one for each of the plurality of customer members of the EMS program. Alternatively, the server database 802 may include a single rewards repository 814, and each customer member of the EMS program may be provided with access to a dedicated portion of such a single rewards repository 814; i.e., a portion of the repository which can be accessed by one customer member to the exclusion of all other customer members. When a customer member's mobile electronic device 80 or vehicle communication device 90 provides the customer member's EMSID to the main server 12 via a wireless communication link, for example, the processor 20 of the main server 12 may identify the customer and associate that customer with the current purchase transaction being carried out at the fuel dispenser $\mathbf{18}_1$-$\mathbf{18}_N$, $\mathbf{18}_1$-$\mathbf{18}_M$. The main server 12 can, during and as long as a wireless communication link is established and maintained between the customer's mobile electronic device and one of the fuel dispensers $\mathbf{18}_1$-$\mathbf{18}_N$, $\mathbf{18}_1$-$\mathbf{18}_M$ (or local server $\mathbf{16}_1$-$\mathbf{16}_K$ or main server 12), push discount rewards or offers to the customer's mobile electronic device, which the customer can choose, e.g., via simple customer input to the mobile electronic device, to save within the customer's rewards repository 808, for subsequent redemption against a corresponding product or service.

The product/service and pricing data 812 of the server database 802 contains information relating to the retail products and services sold by the retail enterprise which the main server 12 serves, which information includes product and pricing information for each of the plurality of different fuels dispensable by a fuel dispenser 18 from one of the fuel sources 212. The information stored in the product/service and pricing database 812 may further include any one or more of current product inventory information, product/service location within the corresponding retail outlet, past, current and future service usage and cost, past, current and future product cost and ordering information, product and service identification information, past, current and future product and service discount information, and the like for any product and/or service offered by the retail enterprise served by the main server 12.

The fuel receipt database 806 has stored therein virtual, e.g., digital representations, of fuel receipts for fuel purchases made by customer members of the EMS program. The fuel receipt database 806 may or may not be partitioned, although each fuel receipt is illustratively linked to a corresponding customer member, e.g., via the customer member's EMSID.

The rewards/offers database 810 illustratively has stored therein an earn/reward offer bank in the form of one or more tables of earn requirements and corresponding discount rewards. The earn/reward offer bank is initially constructed based on the purchase transaction data for all customer members of the EMS program at an arbitrary point in time, and is thereafter periodically updated based on purchase transaction data collected and stored in the purchase history database 808 since previously updating the earn/reward bank.

The payment interface module 820 of the main server 12 is configured, in a conventional manner, to process tangible forms of electronic payment systems (EPS), e.g., tangible electronic funds transfer instruments such as credit cards, debit cards, etc., used at the fuel dispensers $\mathbf{18}_1$-$\mathbf{18}_N$, $\mathbf{18}_1$-$\mathbf{18}_M$ and/or local hubs $\mathbf{52}_1$-$\mathbf{52}_K$ when purchasing fuel. In accordance with this disclosure, the payment interface module 820 is likewise configured to process payment information stored within a mobile electronic device and transmitted via a wireless communication link to the main server 12, which identifies one or more customer-specific systems of payment for processing by the payment interface module 820 for the purchase of fuel to be dispensed from one of the fuel dispensers $\mathbf{18}_1$-$\mathbf{18}_N$, $\mathbf{18}_1$-$\mathbf{18}_M$.

The transaction module 822 is configured to monitor purchases of fuel and other products and/or services made by customer members of the EMS program using any of the purchase interfaces, e.g., any of the fuel dispensers $\mathbf{18}_1$-$\mathbf{18}_N$, $\mathbf{18}_1$-$\mathbf{18}_M$, and/or any of the local servers $\mathbf{16}_1$-$\mathbf{16}_K$, and to store purchase transaction data associated with such purchases in the purchase history database 808. Illustratively, the purchase history database 808 is partitioned or otherwise configured to store such purchase transaction data in a manner that provides for the separate tracking and identification of at least a portion of the purchase histories of each customer member and further provides for the tracking and identification of at least a portion of the purchase histories of all customer members. For example, which should not be considered to be limiting in any way, the transaction module 822 is illustratively configured in one embodiment to store the purchase transaction data in the purchase history database 808 in a manner that separately identifies and tracks identification and pricing information for each fuel purchase and product/service purchase made by each customer member, and that identifies and tracks identification and pricing information for each such product and service purchased by all customer members.

The communication module 826 is configured, in a conventional manner, to control and manage all communications between the main server 12 and the local servers $\mathbf{16}_1$-$\mathbf{16}_K$ in embodiments that include the local servers $\mathbf{16}_1$-$\mathbf{16}_K$, to control and manage all communications between the main server 12 and all fuel dispensers $\mathbf{18}_1$-$\mathbf{18}_N$, $\mathbf{18}_1$-$\mathbf{18}_M$ in embodiments that do not include one or more local servers $\mathbf{16}_1$-$\mathbf{16}_K$ and to control and manage all communication between the main server 12 and all mobile electronic devices, e.g., all mobile communication devices 80 and all vehicle communication devices 90.

The fuel dispenser management module 830 of the main server 12 illustratively includes an application download module 832, an application set-up module 834, a rewards/offers module 836, a help module 838 and a digital receipt module 840. The application download module 832 illustratively includes one or more downloadable versions of the fuel dispenser activation modules 502/602, and conventional instructions that are executable by the processor 20 of the main server to manage downloading of such modules by and to mobile electronic devices. The application set-up module 834 has stored therein a set-up software program which may downloaded with or separately from the fuel dispenser activation module application software 502/602. The application setup software program includes instructions which, when executed by the processor 300/400 of the mobile electronic device, cause the processor 300/400 to interactively assist customers in setting up the fuel dispenser activation module application software 502/602 on their mobile electronic devices, such as by entering and storing payment information, vehicle information and user preferences. One simplified example of such an application setup software program will be described in detail below with reference to FIG. 13.

The rewards/offers module 836 is illustratively an application program containing instructions which, when executed by the processor 20 of the main server 12, cause the processor 20 to access at least the purchase history database 808, the rewards/offers database 810 and rewards repository 814 for the purpose of generating customer-specific rewards, i.e., virtual discount coupons, and pushing such customer-specific rewards to wirelessly connected mobile electronic devices as briefly described above.

The help module 838 has stored therein a help software program which may downloaded with or separately from the fuel dispenser activation module application software 502/602. The help software program includes instructions which, when executed by the processor 300/400 of the mobile electronic device, cause the processor 300/400 to interactively assist customers with trouble shooting the fuel dispenser activation module application software 502/602 on their mobile electronic devices, and to provide information about the software 502/602.

The digital receipt module 840 has stored therein instructions which, when executed by the processor 20 of the main server 12, cause the processor 20 to manage digital receipts resulting from the purchase of fuel by generating such receipts following completion of customer purchases of fuel, and then storing the generated digital receipts in the fuel receipt database 806 in a manner that links each such digital fuel receipt to a customer member of the EMS program. Following such storage of the digital fuel receipts in the fuel receipt database 806, the digital receipts are generally accessible to and by the customer members as part of the EMS program.

The fuel dispenser management module 830 further includes a remote controlled fueling module 842 having stored therein instructions which, when executed by the processor 20 of the main server 12, cause the processor 20 to control, in one embodiment, payment processing via the payment interface module 820. Alternatively or additionally, the instructions stored in the remote controlled fueling module 842 may include instructions which, when executed by the processor 20, cause the processor 20 to select fuel grade and/or type specified by a customer. Alternatively or additionally still, the instructions stored in the remote controlled fueling module 842 may include instructions which, when executed by the processor 20, cause the processor 20 to generate and push customer-specific rewards/offers to wirelessly connected customers via the rewards/offers module 836. Further details relating to the operation of the main server 12 in accordance with one embodiment of the instructions stored in the remote controlled fueling module 842 will be described below with respect to FIGS. 9A-9B and 11, and further details relating to the operation of the server 12 in accordance with another embodiment of the instructions stored in the remote controlled fueling module 842 will be described below with respect to FIGS. 14A-22 generally and, more specifically, with respect to FIGS. 17-18 and 21-22.

Figure 9A:
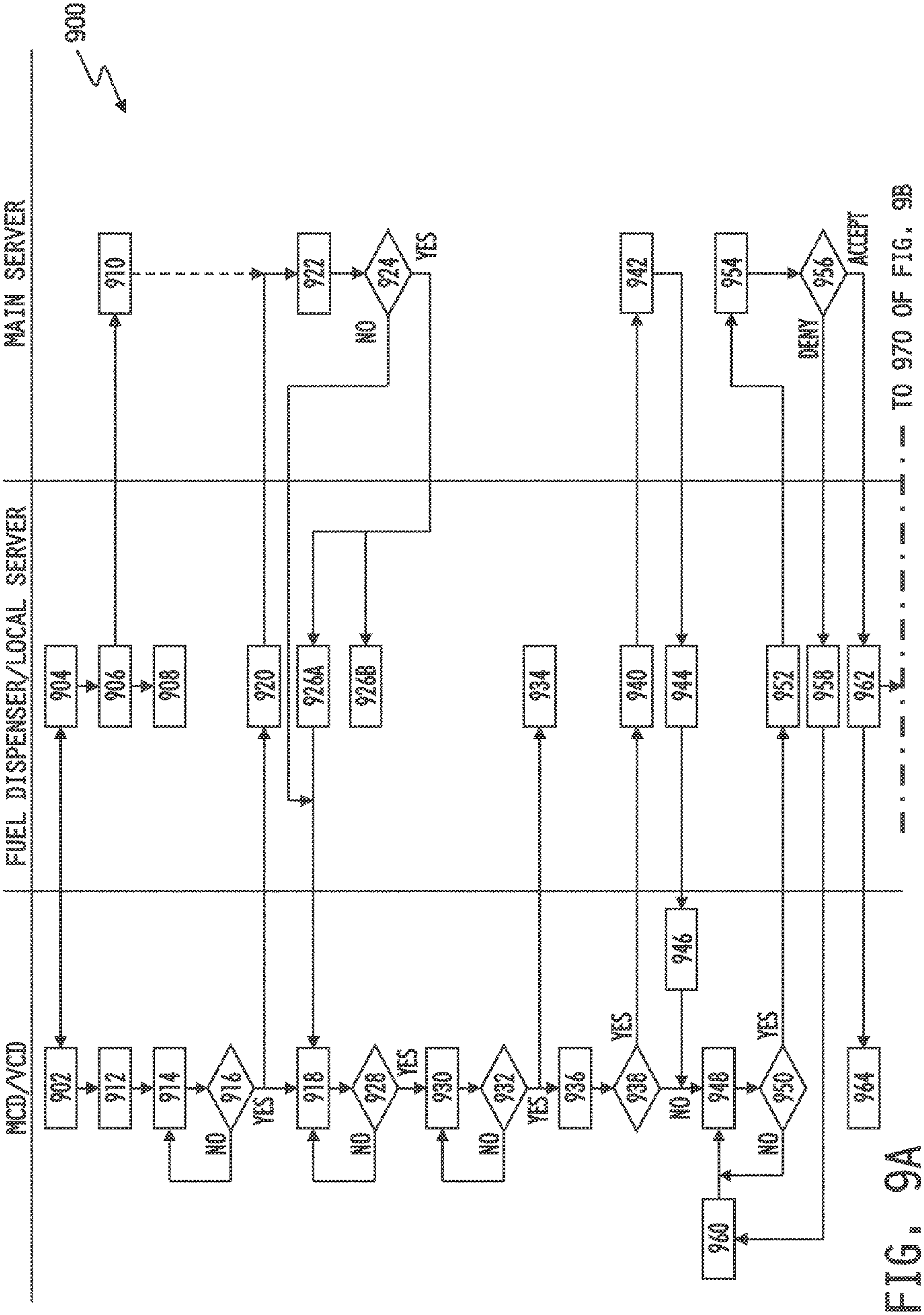
FIGS. 9A and 9B collectively show a simplified flow diagram of an embodiment of a process for wirelessly activating one of the electromechanical fuel dispensers illustrated in FIG. 1, for carrying out the subsequent fuel dispensation process through completion and for providing wirelessly connected purchasers of fuel with purchaser-specific discount rewards/offers for one or more goods and/or services offered for sale by an enterprise via which the fuel is purchased.
Figure 9B:
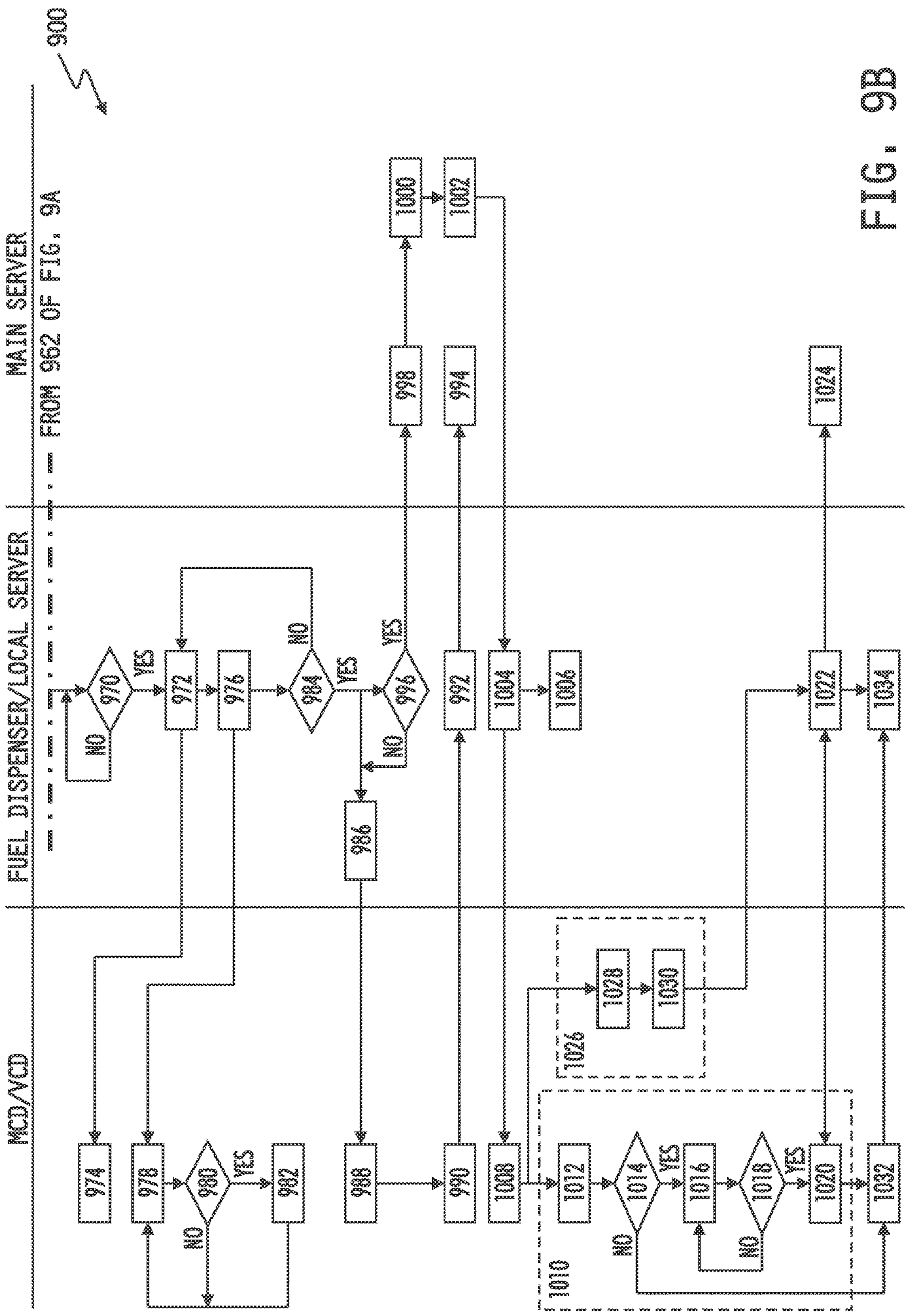

Referring now to FIGS. 9A and 9B, a simplified flow diagram is shown of an embodiment of a process 900 for wirelessly activating one of the electromechanical fuel dispensers illustrated in FIG. 1 via a mobile electronic device, for carrying out the subsequent fuel dispensation process through completion and for providing wirelessly connected purchasers of fuel with purchaser-specific discount rewards/offers for one or more goods and/or services offered for sale by an enterprise via which the fuel is purchased.

As indicated by the framework of the process 900 illustrated in FIGS. 9A-9B, a portion of the process 900, i.e., the portion to the left of the left-most vertical line and centered under the heading “MDC/VCD,” represents the fuel dispenser activation module software application 502/602 that is executable by a processor (e.g., processor 300 or 400) of a mobile electronic device (e.g., the mobile communication device 80 and/or vehicle communication device 90 respectively). In one embodiment, this portion of the process 900 is illustratively stored in the memory 304 (and/or data storage 306) of the mobile communication device 80 in the form of instructions executable by the processor 300 of the mobile communication device 80, and the process steps of this portion of the process 900 will be described below for purposes of this disclosure as being executed by the processor 300 of the mobile communication device 80. It will be understood, however, that in some alternate embodiments, this portion of the process 900 may be stored in the memory 404 (and/or data storage 406) of the vehicle communication device 90 in the form of instructions executable by the processor 400 of the vehicle communication device 90. In still other alternate embodiments, this portion of the process 900 may be stored, in whole or in part, in the memory 304 (and/or data storage 306) of the mobile communication device 80 in the form of instructions executable, in part, by the processor 300 of the mobile communication device 80 and in part by the processor 400 of the vehicle communication device 90, or stored, in whole or in part, in the memory 404 (and/or data storage 406) of the vehicle communication device 90 in the form of instructions executable, in part, by the processor 400 of the vehicle communication device 90 and in part by the processor 300 of the mobile communication device 80.

Another portion of the process 900, i.e., the portion between the two vertical lines and centered under the heading “Fuel Dispenser/Local Server,” represents the remote activation module software application 252 that is executable by the processor 60 of each of the plurality of fuel dispensers $\mathbf{18}_1$-$\mathbf{18}_N$, $\mathbf{18}_1$-$\mathbf{18}_M$ and/or the remote activation module software application 722 that is executable by the processor 40 of each of the local servers $\mathbf{16}_1$-$\mathbf{16}_K$. In one embodiment, this portion of the process 900 is illustratively stored in the memory 64 (and/or data storage 66) of the fuel dispensers $\mathbf{18}_1$-$\mathbf{18}_N$, $\mathbf{18}_1$-$\mathbf{18}_M$ in the form of instructions executable by the processor 60 of the fuel dispensers $\mathbf{18}_1$-$\mathbf{18}_N$, $\mathbf{18}_1$-$\mathbf{18}_M$, and the process steps of this portion of the process 900 will be described below for purposes of this disclosure as being executed by the processor 60 of the fuel dispensers $\mathbf{18}_1$-$\mathbf{18}_N$, $\mathbf{18}_1$-$\mathbf{18}_M$. It will be understood, however, that in some alternate embodiments, this portion of the process 900 may be stored in the memory 44 (and/or data storage 46) of the local servers $\mathbf{16}_1$-$\mathbf{16}_K$, in the form of instructions executable by the processor 40 of the local servers $\mathbf{16}_1$-$\mathbf{16}_K$ (or stored in the memory 24 and/or data storage 26 of the main server 12 in the form of instructions executed by the processor 20 of the main server 12, in embodiments that do not include the local servers $\mathbf{16}_1$-$\mathbf{16}_K$). In still other alternate embodiments, this portion of the process 900 may be stored, in whole or in part, in the memory 64 (and/or data storage 66) of the fuel dispensers $\mathbf{18}_1$-$\mathbf{18}_N$, $\mathbf{18}_1$-$\mathbf{18}_M$ in the form of instructions executable, in part, by the processor 60 of the fuel dispensers $\mathbf{18}_1$-$\mathbf{18}_N$, $\mathbf{18}_1$-$\mathbf{18}_M$ and in part by the processor 40 of a corresponding one of the local servers $\mathbf{16}_1$-$\mathbf{16}_K$, or stored, in whole or in part, in the memory 44 (and/or data storage 46) of the local servers $\mathbf{16}_1$-$\mathbf{16}_K$ in the form of instructions executable, in part, by the processor 40 of the local servers $\mathbf{16}_1$-$\mathbf{16}_K$ and in part by the processor 60 of a corresponding one of the fuel dispensers $\mathbf{18}_1$-$\mathbf{18}_N$, $\mathbf{18}_1$-$\mathbf{18}_M$.

Yet another portion of the process 900, i.e., the portion to the right of the right-most vertical line and centered under the heading "Main Server," represents the remote controlled fueling module software application 842 that is executable by the processor 20 of the main server 12. In one embodiment, this portion of the process 900 is illustratively stored in the memory 24 (and/or data storage 26) of the main server 12 in the form of instructions executable by the processor 20 of the main server 12, and the process steps of this portion of the process 900 will be described below for purposes of this disclosure as being executed by the processor 20 of the main server. It will be understood, however, that in some alternate embodiments that do not include a main server 12, this portion of the process 900 may be stored in the memory 44 (and/or data storage 46) of one or more of the local servers $\mathbf{16}_1$-$\mathbf{16}_K$ in the form of instructions executable by the processor 40 of the one or more local servers $\mathbf{16}_1$-$\mathbf{16}_K$.

It will further be understood that portions of the process 900 illustrated as being executed by one processor/device or one processor/server may alternatively be executed by a different processor/device or processor/server, some examples of which are described above.

Referring now specifically to FIG. 9A, the process 900 begins at steps 902 and 904 where a wireless communication link is established between the mobile electronic device (the mobile communication device 80 and/or the vehicle communication device 90) and one of the plurality of electromechanically controlled fuel dispensers $\mathbf{18}_1$-$\mathbf{18}_N$, $\mathbf{18}_1$-$\mathbf{18}_M$ (or a corresponding one of the local servers $\mathbf{16}_1$-$\mathbf{16}_K$ in embodiments which include one or more of the local servers $\mathbf{16}_1$-$\mathbf{16}_K$, or the main server 12 in embodiments that do not include local servers $\mathbf{16}_1$-$\mathbf{16}_K$). Step 902 is illustratively carried out by the processor 300 and step 904 is illustratively carried out by the processor 60 to establish a wireless communication link via the wireless communication circuits 312 and 230 respectively.

The wireless communication circuits 312 and 230 are typically short-range communication circuits having a limited range of communication, i.e., a limited range or maximum distance between the two over which the wireless communication link can be established and maintained. Reference will be made herein to the mobile electronic device being within a wireless communication range of a fuel dispenser or local server and vice versa, and as used herein the phrase "wireless communication range" should be understood to mean that the wireless communication circuits of the devices and/or servers in question are within, i.e., less than or equal to, the maximum distance between the two over which a wireless communication link can be established and maintained. Example wireless communication ranges may vary between 20 cm or so for some near-field communication (NFC) devices to several hundred meters for some outdoor wifi and/or short range wireless devices. The theoretical maximum wireless communication range for standard Bluetooth® transmitters/receivers is about 100 meters or so, and around 50 or so meters for Bluetooth® Low Energy transmitters/receivers. It will be understood that the foregoing wireless communication ranges are provided only by way of example, and should not be considered to be limiting in any way.

The present disclosure contemplates using any of a number of different conventional techniques and/or technologies for establishing a wireless communication link between a mobile electronic device and a corresponding fuel dispenser $\mathbf{18}_1$-$\mathbf{18}_N$, $\mathbf{18}_1$-$\mathbf{18}_M$ (or local server $\mathbf{16}_1$-$\mathbf{16}_K$) located within the wireless communication ranges of each other. In accordance with steps 902 and 904, the processor 300 and the processor 60 each play a part in establishing such a wireless communication link, although one or the other of the processor 300 and the processor 60 may initiate or play a more primary role in establishing the communication link than the other depending upon the technique and/or technology used to establish the wireless communication link. In one embodiment, for example, the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) each include one or more beacons 224/710, and the memory 84 of each fuel dispenser $\mathbf{18}_1$-$\mathbf{18}_N$, $\mathbf{18}_1$-$\mathbf{18}_M$ (or local server $\mathbf{16}_1$-$\mathbf{16}_K$) has stored instructions stored therein which, when executed by the processor 60, cause the processor 60 to control the one or more beacons 224/710 to transmit periodic and repeating wireless signals. When a mobile electronic device is within the wireless communication range of such a fuel dispenser 18 or local server 16, the wireless signals transmitted by the one or more beacons 224/710 are detected by the wireless communication circuit 312 of the mobile electronic device, and the processor 300 responds to such detection by initiating transmission and reception of wireless signals with the processor 60 of the fuel dispenser 18 or local server 16 via the one or more beacons 224/710 to establish the wireless communication link between the mobile electronic device and the fuel dispenser 18 or local server 16.

In another embodiment, the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) each include the geofence module 256/728 stored in its memory 64/44, and the mobile electronic device includes a GPS receiver 324/426. In one implementation, the processor 60 of the fuel dispenser 18 or local server 16 periodically and repeatedly controls the wireless communication circuit 230 to transmit one or more geographical coordinates stored in the memory 64 that define the fuel dispenser's (or local server's) geofence. When a mobile electronic device is within the communication range of such a fuel dispenser 18 or local server 16, the processor 300 is operable to receive via the wireless communication circuit 68 the transmitted geographical coordinate(s) and compare with the current GPS coordinates provided by the on-board GPS receiver 324. The processor 60 of the fuel dispenser that is closest in proximity to the mobile electronic device then communicates with the processor 300 of the mobile electronic device, via the wireless communication circuits 230 and 312, to establish the wireless communication link between the mobile electronic device and the fuel dispenser 18. In another implementation, the processor 300 of the mobile electronic device controls the wireless communication circuit 312 to periodically and repeatedly transmit the current GPS coordinates received by the GPS receiver 324, and the processor 60 of the fuel dispenser 18 or local server 16 operates with the processor 300 of the mobile electronic device to establish a wireless communication link between the two when the processor 60 detects that the mobile electronic device has entered the virtual boundary defined by the geofence coordinates stored in the memory 64 and is within the wireless communication range of the fuel dispenser or local server 16.

In another embodiment, the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) each include the LPS/LBS module 254/726 stored in its memory 64/44, and the mobile electronic device likewise includes the LPS/LBS module 508/608 stored in its memory 304/404. When a mobile electronic device is within the wireless communication range of such a fuel dispenser 18 or local server 16, wireless signals, e.g., wifi, short-range RF, etc., transmitted by the wireless communication circuit 230 are detected by the wireless communication circuit 312 of the mobile electronic device, and the processor 300 responds to such detection by initiating transmission and reception of wireless signals with the processor 60 of the fuel dispenser 18 or local server 16 via the wireless communication circuit 312 to establish the wireless communication link between the mobile electronic device and the fuel dispenser 18 or local server 16.

In another embodiment, the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) each include the IDCODE module 258/730 stored in its memory 64/44, and the mobile electronic device likewise includes the IDCODE module 510/610 stored in its memory 304/404. The processor 60 of the fuel dispenser 18 or local server controls one of the display monitors 214 to generate, display, and periodically update/change, a random or pseudo-random number. A customer then enters the random or pseudo-random number into the mobile electronic device when sufficiently near the display monitor 214 to read the number. The processor 300 then controls the wireless communication circuit 312 to transmit the entered number, and upon detection of the transmitted number by the wireless communication circuit 230, the processor 60 initiates transmission and reception of wireless signals with the processor 300 of the mobile electronic device via the wireless communication circuit 312 to establish the wireless communication link between the mobile electronic device and the fuel dispenser 18 or local server 16. In a variant of this embodiment, the customer may alternatively scan or capture an image of the ID 200/700, e.g., in the form of a barcode or matrix code (such as a QR code), and the processor 300 may then control the wireless communication circuit 312 to transmit the captured ID 200/700. Upon detection of the transmitted ID 200/700 by the wireless communication circuit 230, the processor 60 then initiates transmission and reception of wireless signals with the processor 300 as before to establish the wireless communication link between the mobile electronic device and the fuel dispenser 18 or local server 16. In another variant of this embodiment, the processor 300 of the mobile electronic device may be response to input of the customer's EMSID or other EMS program identifier to control the wireless communication circuit 312 to transmit the entered EMSID or other EMS program identifier. Upon detection of the transmitted EMSID or other EMS program identifier by the wireless communication circuit 230, the processor 60 may then initiate transmission and reception of wireless signals with the processor 300 as before to establish the wireless communication link between the mobile electronic device and the fuel dispenser 18 or local server 16.

In another embodiment, the fuel dispensers $\mathbf{18}_1$-$\mathbf{18}_N$, $\mathbf{18}_1$-$\mathbf{18}_M$ and the mobile electronic device each include an NFC device 234/316/418, and the processor 300 of the mobile electronic device and/or the processor 60 of a fuel dispenser 18 operate to establish a wireless communication link between the two when the mobile electronic device is brought within the wireless communication range of the NFC devices.

Those skilled in the art will recognize that the foregoing mechanisms and techniques for establishing a wireless communication link between the mobile electronic device (e.g., the mobile communication device 80 and/or the vehicle communication device 90) and one of the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) may be used alone or in any combination. Moreover, it will be understood that such foregoing mechanisms and techniques are merely illustrative, and that other conventional mechanisms and/or techniques for establishing such a wireless communication links are intended to fall within the scope of this disclosure.

As part of, or following, the process of establishing the wireless communication link, the processor 300 illustratively provides information relating to the identity of the customer to the wirelessly linked fuel dispenser 18 (e.g., EMSID and/or other customer-identifying information). In any case, after the wireless communication link is established between the mobile electronic device and the one of the fuel dispensers $\mathbf{18}_1$-$\mathbf{18}_N$, $\mathbf{18}_1$-$\mathbf{18}_M$ (or local servers $\mathbf{16}_1$-$\mathbf{16}_K$) within its wireless communication range, the process advances from step 904 to step 906 where the processor 60 illustratively controls one of the display monitors 214 to display one or more customer-specific message(s), and further controls the communication circuitry 68 to transfer the customer identity information, e.g., EMSID, to the main server 12. Following step 906, the processor 60 is illustratively (and optionally) operable at step 908 to deactivate the fuel grade/type selectors 220, 222 on the wirelessly linked fuel dispenser 18.

At step 910, the processor 20 of the main server is operable to locate customer information in the server database 802 (e.g., customer account, purchase history, etc.) based on the customer identity information, e.g., EMSID, transmitted by the wirelessly linked fuel dispenser 18.

Following establishment of the wireless communication link at step 902, the processor 300 of the mobile electronic device is operable at step 912 to control the display screen 320 to display an interface of the fuel dispenser application module 502 which may include information about the wirelessly linked fuel dispenser 18 and which may include the display of application information and/or selectable control icons (e.g., help, exit). Thereafter at step 914, the processor 300 is illustratively operable to control the display screen 320 to display another interface of the fuel dispenser application module 502 which may include a list of customer vehicles, e.g., a list of motor vehicles pre-designated or pre-entered by the customer that represent motor vehicles which the customer may at some point wish to refuel, and which may further include one or more prompts for customer selection from the list of the motor vehicle being refueled. At step 916, the processor 300 determines whether the customer has selected one of the motor vehicle from the displayed list of motor vehicles. If not, the process 900 loops back to step 914, and if so the process 900 advances to steps 918 and 920.

At step 918, the processor 300 illustratively controls the display screen 320 to display a selectable list of fuel types and/or grades that are dispensable from the wirelessly connected fuel dispenser 18. In the illustrated embodiment, the fuel types and/or grades available for dispensing from any of the fuel dispensers $\mathbf{18}_1$-$\mathbf{18}_N$, $\mathbf{18}_1$-$\mathbf{18}_M$ are common across all fuel dispensers and, as such, the fuel types and/or grades displayed on the selectable list are preset by the fuel dispenser activation module 502. In some alternative embodiments, the available fuel types and/or grades may vary among fuel dispensers $\mathbf{18}_1$-$\mathbf{18}_N$, $\mathbf{18}_1$-$\mathbf{18}_M$ and/or among local hubs $\mathbf{16}_1$-$\mathbf{16}_K$, and in such embodiments the process 900 may include an additional step executed by the processor 60 of the wirelessly connected fuel dispenser 18 to transmit, via the wireless communication link, the selectable list of fuel types and/or grades that are available for dispensing from the wirelessly connected fuel dispenser 18. In one embodiment, the processor 300 may be further illustratively operable at step 918 to control the display screen 320 by highlighting a particular fuel type or grade that was pre-designated (e.g., during set-up) by the customer. Alternatively or additionally, the processor 300 may be further illustratively operable at step 918 to control the display screen 320 to delete, either automatically or as designated by the customer during set up of the fuel dispenser activation software application, the display of fuel types and/or grades that are not appropriate for vehicle being refueled (e.g., delete all gasoline options for motor vehicles having diesel engines, and all diesel fuel alternatives for gasoline engines, etc.).

The "YES" branch of step 916 also advances to step 920 as the processor 300 of the mobile electronic device transmits the selected motor vehicle information to the wirelessly connected fuel dispenser 18 via the wireless communication line. At step 920, the processor 60 of the wirelessly connected fuel dispenser 18, in turn, transmits the selected vehicle information to the main server 12 (e.g., via a corresponding one of the local servers $\mathbf{16}_1$-$\mathbf{16}_K$), and thereafter at step 922 the processor 20 of the main server 12 receives the selected motor vehicle information and determines whether, based on the customer's purchase history and/or other factors which may or may not include the history of fuel purchases for the selected motor vehicle, whether to provide customer with a fuel grade upgrade offer for vehicle being refueled. Optionally, the processor 20 may alternatively or additionally be operable at step 922 to determine and generate general and/or customer-specific rewards/offers to offer customer, based on customer purchase history, and in this regard step 922 may also be executed following step 910 as illustrated by dashed line connection between the two steps 910 and 922. Following step 922, the processor 20 is operable at step 924 to transfer the fuel grade upgrade offer, if generated, to the wirelessly connected fuel dispenser 18, e.g., via a corresponding one of the local servers $\mathbf{16}_1$-$\mathbf{16}_K$). If any general and/or customer-specific rewards/offers have been generated by the processor 20, the processor 20 also transfers such rewards/offers at step 924 to the wirelessly connected fuel dispenser 18, e.g., via a corresponding one of the local servers $\mathbf{16}_1$-$\mathbf{16}_K$).

At step 926A, the processor 60 of the wirelessly connected fuel dispenser is operable to transfer to the mobile electronic device, via the wireless communication link, the fuel upgrade offer, if any, transferred thereto by the main server 12. Such a fuel grade upgrade offer enters the mobile electronic device at step 918, e.g., along with current fuel type/grade pricing information. The customer may, in some embodiments, have the option of applying the fuel grade upgrade offer to the current purchase of fuel, or to store the fuel grade upgrade offer in the user data section of the data storage 308 for subsequent use or transfer to the customer's rewards repository 814 in the main server 12. At step 926B, the processor 60 of the wirelessly connected fuel dispenser 18 is further operable to store, e.g., within the data storage 66 or the memory 64, any general and/or customer-specific rewards generated by the main server 12 and transferred to the wirelessly connected fuel dispenser 18 at step 92. Any such general and/or customer-specific rewards may, for example, be transferred to the mobile electronic device during fueling. If no such fuel upgrade offer is generated at step 922, the "NO" branch of step 924 skips step 926A and proceeds directly to step 918.

Following step 918, the processor 300 of the mobile electronic device determines at step 928 whether the customer has selected a fuel grade and/or type from the displayed list. If not, the process 900 loops back to step 918, and otherwise the process advances to step 930. At step 930, the processor 300 illustratively controls the display screen 320 to display another interface which includes fuel cost and/or amount areas along with a prompt to the customer to enter amount of fuel to be dispensed, e.g., in monetary cost (e.g., $10.00), in volume (e.g., 10 gallons), or "fill up." Thereafter as step 932, the processor 300 is operable to determine whether the customer has selected a fuel amount at step 930. If not, the process 900 loops back to step 930 and otherwise the process 900 advances to step 934 during which the processor 300 transmits, via the wireless communication link, the selected fuel amount to the wirelessly connected fuel dispenser 18. At step 934, the processor 60 controls the delivery section 204 for the delivery of a selected amount of a selected fuel type and/or grade. Illustratively, the processor 60 may also be operable at step 934 to limit the amount of fuel delivery to a maximum volume or cost, which may be universally applied or determined on a customer-by-customer basis.

The "YES" branch of step 932 also advances to step 936 where the processor 300 is illustratively operable to control the display screen 320 to display available car wash options along with a prompt requesting customer selection of one of the displayed options, e.g., good, better, best, free with fill up, no thanks. Thereafter at step 938, the processor 300 determines the car wash option that the customer has selected. If "none" or "no thanks," the process advances to step 948. Otherwise, the process 900 advances to step 940 during which the processor 300 transmits the selected car wash option to the wirelessly connected fuel dispenser 18 via the wireless communication link. At step 940, the processor 60 of the wirelessly connected fuel dispenser 18 transfers the customer-selected car wash option to the main server 12 (e.g., via a corresponding one of the local servers $\mathbf{16}_1$-$\mathbf{16}_K$). At step 942, the processor 20 of the main server generates a coupon code for the customer-selected car wash, and then transfers the generated coupon code back to the wirelessly connected fuel dispenser 18 (e.g., via a corresponding one of the local servers $\mathbf{16}_1$-$\mathbf{16}_K$). At step 944, the wirelessly connected fuel dispenser 18 transmits the generated coupon code for the customer-selected car wash to the mobile electronic device via the wireless communication link. At step 946, the processor 300 of the mobile electronic device stores the generated coupon code for the customer-selected car wash in the memory 304 or user data section 308 of the data storage 306 for subsequent redemption at a designated car wash facility.

At step 948, the processor 300 of the mobile electronic device is illustratively operable to control the display screen to display another interface which includes payment information identifying one or more systems of payment specific to the user of the mobile electronic device via which payment can be processed for the purchase of fuel to be dispensed from the wirelessly connected fuel dispenser 18. The one or more systems of payment may be, for example, one or more credit/debit cards, fuel charge cards, pre-paid charge cards, etc., and such one or more systems of payment are illustratively pre-designated by the customer during set-up of the fuel dispenser activation software application 502. In any case, the interface displayed at step 948 illustratively includes a prompt requesting customer selection of one of the displayed systems of payment, and may further include a highlighted or otherwise designated default preference for one of the displayed systems of payment. Thereafter at step 950, the processor 300 determines whether the customer has selected one of the displayed systems of payment. If not, the process 900 loops back to step 948, and if so the process 900 advances to step 952 during which the processor 300 transmits the payment information for the selected system of payment to the fuel dispenser 18 via the wireless communication link.

At step 952, the processor 60 of the wirelessly connected fuel dispenser 18 transfers the payment information for the customer-selected system of payment to the main server 12 (e.g., via a corresponding one of the local servers $16_1$-$16_K$). Thereafter at step 954, the processor 20 of the main server 12 processes the payment information for the customer-selected system of payment and either accepts or denies the system of payment for the purchase of fuel. Thereafter at step 956, if the customer-selected system of payment is denied, the processor 20 transfers a "denied" message to the wirelessly connected fuel dispenser 18 (e.g., via a corresponding one of the local servers $16_1$-$16_K$), and at step 958 the processor 60 of the wirelessly connected fuel dispenser 18 transmits the "denied" message to the mobile electronic device via the wireless communication medium. At step 960, the processor 300 then controls the display screen 320 to display a message informing denial of the customer-selected system of payment for payment of fuel to be dispensed from the fuel dispenser 18. Step 960 then loops back to step 948 where the customer may select payment information for another system of payment or exit the process 900. If, at step 954 the customer-selected system of payment is accepted, the processor 20 transfers an "accepted" message to the wirelessly connected fuel dispenser 18 (e.g., via a corresponding one of the local servers $16_1$-$16_K$), and at step 962 the processor 60 of the wirelessly connected fuel dispenser 18 activates the dispenser section 204 of the fuel dispenser 18 to enable the dispenser section 204 to be manually manipulated, as described above, to dispense the selected type and/or grade of fuel. The processor 60 is further operable at step 962 to transmit an "fuel dispenser enabled" message to the mobile electronic device via the wireless communication medium, and at step 964 the processor 300 controls the display screen 320 to display a message informing that the wirelessly connected fuel dispenser 18 fuel dispenser is now activated and ready to dispense the selected type/grade of fuel.

Those skilled in the art will appreciate that the process 900 may alternatively be modified such that execution of the fuel payment steps 948-964 just described occur prior to execution of the fuel type and/or grade selection steps 918 and 928-934, such that a customer-specific system of payment is processed and must be accepted before the customer selects a type and/or grade to be dispensed. It will be further appreciated that any changes required to effect such modification of the process 900 would be a mechanical step for a skilled programmer, and therefore well within the skill level of a person of ordinary skill in the computer programming arts.

Referring now to FIG. 9B, the process 900 advances from step 962 to step 970 where the processor 60 of the wirelessly connected fuel dispenser 18 monitors one or more of the actuators and/or sensors 206 to determine whether the fuel nozzle 74 has been disengaged from the fuel dispenser 18 and whether the fuel control lever is depressed. If so, fuel delivery is underway with the fuel dispenser 18 dispensing fuel from a selected one of the plurality of different fuel sources 212 via the fuel nozzle 74, and the process 900 advances to step 972 where the processor 60 of the fuel dispenser 18 is operable to transmit fuel delivery cost and quantity metrics to the mobile electronic device via the wireless communication link. If the processor 60 determines at step 970 that the fuel nozzle 74 has not been depressed, the process 900 illustratively loops back to the beginning of step 970 until fuel delivery is detected. In any case, the processor 300 of the mobile electronic device is operable follow step 972 to advance to step 974 where the processor 60 is operable to control the display monitor 320 to display, in real-time or near real-time, the fuel delivery cost and quantity metrics typically otherwise displayed on one of the display monitors 214 of the fuel dispenser 18 during manual activation and control of the fuel dispenser 18.

The process 900 also advances from step 972 to step 976 where the processor 300 of the fuel dispenser is operable, during the fuel dispensing process, to transmit one, or sequentially transmit multiple ones, of the general and/or customer-specific rewards/offers, if any, stored in the memory 64 and/or data storage 66 at step 926B. Although not shown in FIG. 9B, the process 900 may further include additional sets of the steps 922 and 926B coupled to step 976, such that the processor 20 of the main server 12 may, partially during or throughout the fuel dispensation process, generate general and/or customer-specific rewards/offers and transfer such rewards/offers to the fuel dispenser 18. In one embodiment, the processor 60 of the fuel dispenser 18 may temporarily store any such general and/or customer-specific rewards received from the main server 12 in the memory 64 and/or data storage 66 prior to transmitting them to the mobile electronic device via the wireless communication link. Alternatively, the processor 60 of the fuel dispenser 18 may operate to transmit any such general and/or customer-specific rewards received from the main server 12 during the fuel dispensation process directly the mobile electronic device upon receipt. In any case, the processor 300 of the mobile electronic device is operable thereafter at step 978 to control the display screen 320 to display, e.g. sequentially, along with or in place of the fuel metrics, the general and/or customer-specific rewards/offers received from the fuel dispenser 18 via the wireless communication link.

Following step 978, the process 900 advances to step 980 where the processor 300 of the mobile electronic device is operable to determine whether the customer has selected, e.g., via a conventional touch-screen or screen-swipe selection, a displayed one of the general and/or customer-specific rewards/offers. If so, the process 900 advances to step 982 where the processor 300 is operable to store the selected general and/or customer-specific rewards/offer in the memory 304 or user data section 308 of the data storage 306. If not, the process 900 loops back to step 978, as it also does following completion of step 982.

The process 900 also advances from step 976 to step 984 where the processor 60 of the wirelessly connected fuel dispenser 18 monitors one or more of the actuators and/or sensors 206 to determine whether fuel delivery by the fuel dispenser 18 complete. If so, the process advances to steps 986 and 996, and otherwise the process loops back to step 972.

At step 986, the processor 60 of the wirelessly connected fuel dispenser 18 is operable, following completion of the fuel dispensation process, to transmit a reminder message to the mobile electronic device, via the wireless communication link, to return the nozzle 74 to the fuel dispenser 18. Thereafter at step 988, the processor 300 of the mobile electronic device is operable to control the display 320 to display the reminder message.

Following step 988, the processor 300 is illustratively operable at step 990 to transmit all rewards/offers selected during the fuel dispensation processed and stored in the memory 304 or data storage 306 to the fuel dispenser 18 via the wireless communication link. Thereafter at step 992, the processor 60 of the wirelessly connected fuel dispenser 18 is operable to transfer the transmitted rewards/offers (e.g., via a corresponding one of the local servers $16_1$-$16_K$) to the main server 12, and thereafter at step 994 the processor 20 of the main server 12 is operable to store all of the received rewards/offers in the rewards repository 814 for subsequent redemption by the customer.

The "YES" branch of step 984 also advances to step 996 following a determination by the processor 60 of the mobile electronic device 18 that the fuel dispensation process is complete. At step 996, the processor 60 is operable monitor one or more of the actuators and/or sensors 206 to determine whether the fuel nozzle 74 has been returned to the fuel dispenser 18. If not, the process 900 loops back to step 986, and otherwise the process 900 advances to step 998 where the processor 20 of the main server 12 is operable to process payment for the dispensed fuel using the customer-selected system of payment that was accepted by the processor 20 at step 956. Thereafter at step 1000, the processor 20 is operable to store a digital receipt of the payment in the customer-assigned section of fuel receipt database 806. Thereafter at step 1002, the processor 20 of the main server 12 is operable to transfer confirmation of the payment transaction to the wirelessly connected fuel dispenser 18 (e.g., via a corresponding one of the local servers $\mathbf{16_1}$-$\mathbf{16_K}$). The processor 60 of the wirelessly connected fuel dispenser 18 is then operable, at step 1004, to transmit the payment confirmation to the mobile electronic device via the wireless communication interface. The processor 60 is further operable at step 1006, following execution of step 1004, to reactivate the fuel grade/type selectors 220, 222 on the wirelessly linked fuel dispenser 18.

The processor 300 of the mobile electronic device is operable at step 1008 to control the display monitor 320 to display a confirmation of the payment transaction and, optionally, to display a message indicating that the fuel purchase and dispensation process is complete.

In embodiments of the process 900 in which the mobile electronic device is the mobile communication device 80, the process 900 may advance to step 1010. Illustratively step 1010 begins at step 1012 where the processor 300 of the mobile communication device 80 is operable to control the display screen 320 to display a message prompting the customer to capture a record of the odometer reading. If, at step 1014 the processor 300 determines that the customer has elected to capture a record of the odometer reading, the process advances to step 1014, and otherwise the process 900 advances to step 1032. In any case, following the "YES" branch of step 1014, the processor 300 is operable at step 1016 to enable operation of the on-board camera 326 and to control the display monitor 320 to display a prompt to the customer to operate the camera to capture a photograph of the odometer of the motor vehicle 76. Thereafter at step 1018, the processor 60 is operable to determine whether the customer has captured the odometer reading in a photo using the camera and, if so, the process 900 advances to step 1020. Otherwise, the process 900 returns to step 1016. At step 1020, the processor 300 is illustratively operable to process the photo to attach time, date and location data thereto, and to then transmit the processed photo to the wirelessly connected fuel dispenser 18 via the wireless communication link. Thereafter at step 1022, the processor 60 of the wirelessly connected fuel dispenser 18 is operable to transfer the processed photo to main server 12 (e.g., via a corresponding one of the local servers $\mathbf{16_1}$-$\mathbf{16_K}$), and thereafter at step 1024 the processor 20 of the main server 12 is operable to store the processed odometer photo in the customer-assigned section of the fuel receipt database 806.

In embodiments of the process 900 in which the mobile electronic device is the vehicle communication device 90, the process 900 may advance to step 1026. Illustratively step 1026 begins at step 1028 where the processor 400 of the vehicle communication device 90 is operable to obtain, e.g., automatically, a current odometer reading from the odometer module 612. Thereafter at step 1030 the processor 400 is illustratively operable to process the odometer data obtained from the odometer module, e.g., automatically, to include time, date and location data, and to transmit the processed odometer data to the wirelessly connected fuel dispenser 18 via the wireless communication link. Steps 1022 and 1024 are as described above, except that the processors act upon data rather than a photographic file.

In any case, step 1020 advances to step 1032 and step 1022 advances to step 1034. The processor 300 of the mobile electronic device is operable at step 1032, and the processor 60 of the wirelessly connected fuel dispenser 18 to disestablish the wireless communication link in a conventional manner.

It will be understood that in the illustrated process 900 just described, one or more of the process steps may be optional, i.e., not required, and that the illustrated processing order of one or a series of the steps of the process 900 may be modified without detracting from the scope of the disclosed process.

Figure 10:
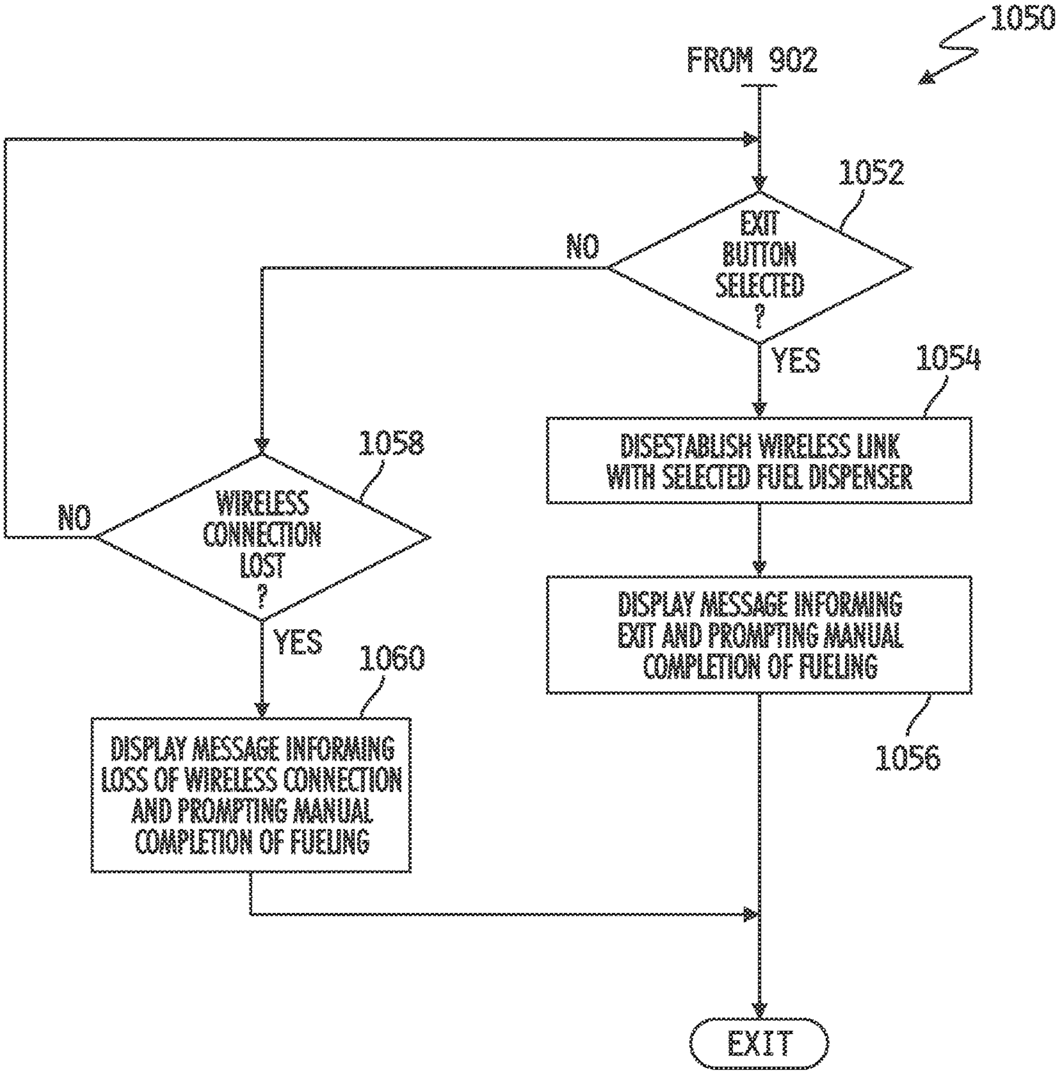
FIG. 10 is a simplified flow diagram of an embodiment of a process for controlling operation of a mobile or vehicle communication device during purchaser-initiated exit from the process illustrated in FIGS. 9A and 9B and/or following loss of a wireless connection with a fuel dispenser.

Referring now to FIG. 10, a simplified flow diagram is shown of an embodiment of a process 1050 for controlling operation of the mobile electronic device during purchaser-initiated exit from the process 900 illustrated in FIGS. 9A and 9B and/or following loss of a wireless connection with a wirelessly connected fuel dispenser 18. The process 1050 illustratively forms part of the fuel dispenser activation module 502/602, and is illustratively stored in the memory 304/404 and/or data storage 306/406 of the mobile electronic device in the form of instructions that are executable by the processor 300 (and/400). The process 1050 begins at step 1052 which follows execution of step 902 of the process 900, i.e., after the wireless communication link is established between the mobile electronic device and one of the fuel dispensers 18. At step 1052, the processor 300 is operable to determine whether the customer has selected an "exit" button located on the keypad 322 or displayed on the display screen 320 throughout the process 900 in the form of a touch-selectable icon. If so, the process 1050 advances to step 1054 where the processor 300 operates to disestablish, in a conventional manner, the wireless communication link between the mobile electronic device and the wirelessly connected fuel dispenser 18. The process 1050 advances from step 1054 to step 1056 where the processor 300 is operable to control the display screen 320 to display a message informing exit from the process 900 and, optionally, to prompt manual completion of the fuel dispensing process.

If, at step 1052, the processor 300 determines that the customer has not selected the "exit" button, the process 1050 advances to step 1058 where the processor 300 is operable to determine whether the wireless connection has been lost. The processor 300 may be configured to execute step 1058 in any conventional manner, such as by attempting communication with the fuel dispenser 18, transmitting periodic "heartbeat" signal pulses via the wireless communication circuit 312, followed by "listening" for return heartbeat signals transmitted by the fuel dispenser 18. In any case, if the processor 300 determines at step 1058 that the wireless connection with the fuel dispenser 18 has been lost, the process 1050 advances to step 1060, and otherwise loops back to step 1052. At step 1060, the processor 300 is illustratively operable to control the display monitor 320 to display a message informing of the loss of the wireless connection with the fuel dispenser 18 and, optionally, to prompt manual completion of the fuel dispensing process. The process 1050 ends after completion of either of steps 1056 or 1060.

Figure 11:
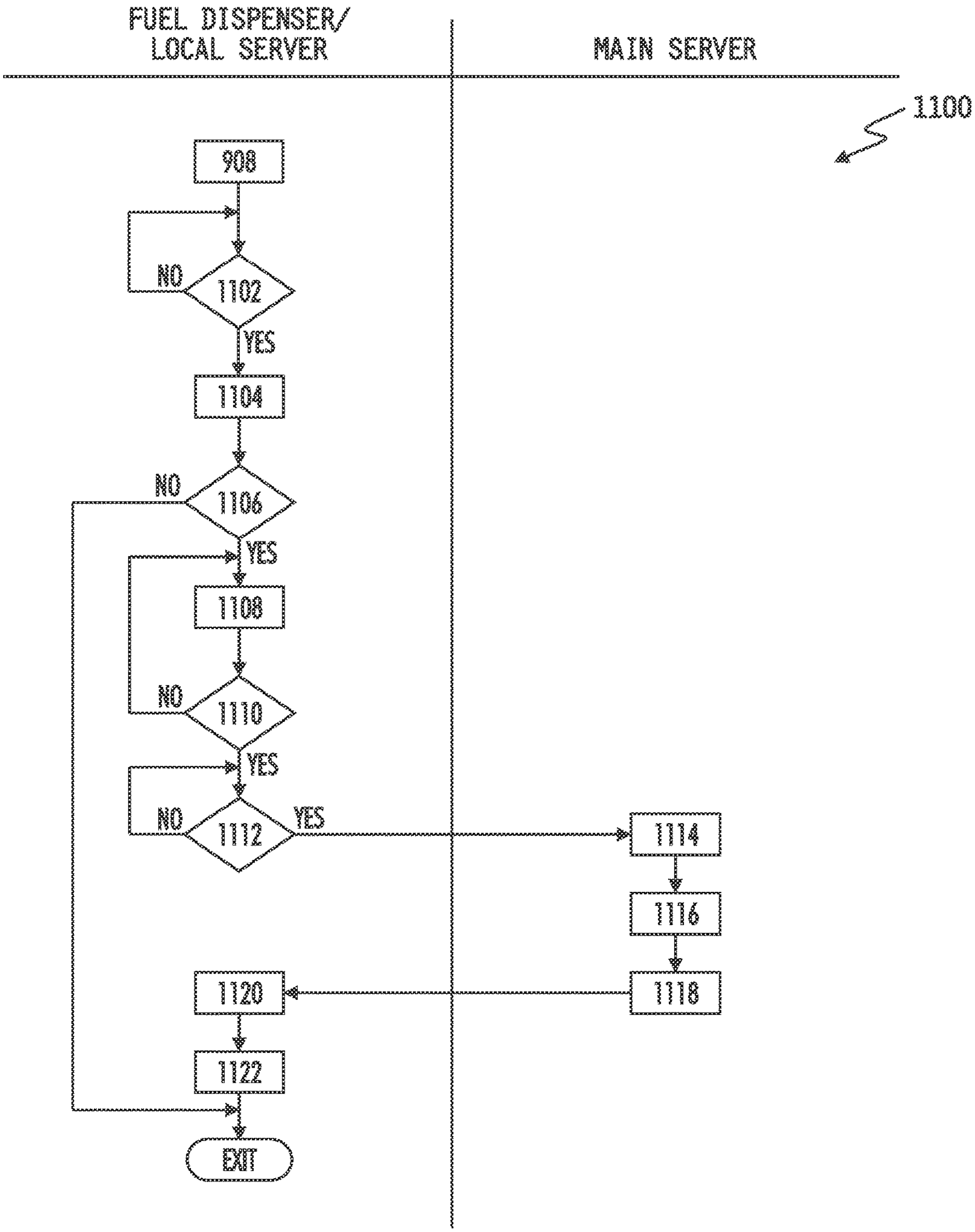
FIG. 11 is a simplified flow diagram of an embodiment of a process for controlling operation of any of the electromechanical fuel dispensers following loss of a wireless connection with a mobile or vehicle communication device.

Referring now to FIG. 11, a simplified flow diagram is shown of an embodiment of a process for controlling operation of any of the electromechanical fuel dispensers 18 following loss of a wireless connection with a mobile or vehicle communication device 80, 90, i.e., following loss of connection with a mobile electronic device. The process illustrated in FIG. 11 illustratively forms part of the process 900 illustrated in FIGS. 9A-9B, and is therefore subject to the same process and processing described above with respect to FIGS. 9A and 9B. The process illustrated in FIG. 11 follows completion of step 908 of the process 900 illustrated in FIG. 9A, e.g., following deactivation by the processor 60 of the fuel grade/type selectors 220, 222 on the wirelessly linked fuel dispenser 18, and begins at step 1102 where the processor 60 is operable to determine, in a conventional manner, whether the wireless communication link established with the mobile electronic device has been lost. If not, the process loops back to step 1102, and if so, the process advances to step 1104 where the processor 60 is operable to reactivate the fuel grade/type selectors 220, 222 on the wirelessly linked fuel dispenser 18. Thereafter at step 1106, the processor 60 is operable to determine in a conventional manner, e.g., by monitoring the one or more actuators and/or sensors 206, whether fuel delivery was in process when the wireless communication link was lost. If not, the process terminates, and otherwise the process advances to step 1108 where the fuel dispenser 18 is operable to continue dispensing fuel subject to conventional manual control of the nozzle 74. Thereafter at step 1110, the processor 60 is operable to determine in a conventional manner, e.g., by monitoring the one or more actuators and/or sensors 206, whether fuel delivery is complete. If not, the process loops back to step 1108, and if so the process advances to step 1112 where the processor 60 determines, e.g., as described above, whether the fuel nozzle 74 has been returned to the fuel dispenser 18. If not, the process loops back to step 1112, and otherwise the process advances to step 1114.

At step 1114, the processor 20 of the main server 12 is operable to process payment for dispensed fuel using customer-selected system of payment, as described above, and thereafter at step 1116 the processor 20 is operable to store a digital receipt for the payment in a customer-assigned section of fuel receipt database 806. Thereafter at step 1118, the processor 20 is operable to transfer confirmation of completion of the fuel purchase and dispensation transaction to the fuel dispenser 18. The processor 60 of the fuel dispenser 18 is then operable at step 1120 to control one of the display monitors 214 to display a message informing the total amount charged for fuel to the customer-selected system of payment and, optionally, informing of the storage of the digital receipt in customer's fuel receipt database 806. Following step 1120, the process advances to step 1122 where the processor 60 is illustratively operable to control one of the display monitors 214 to display a message prompting the customer to capture a photo of motor vehicle's odometer reading. If captured, such a photo is illustratively stored temporarily in the memory 304 or user data area 308 of the data storage 306, and can be subsequently transferred to the fuel receipt database 806 of the main server 12 via wireless connection to main server 12.

Figure 12:
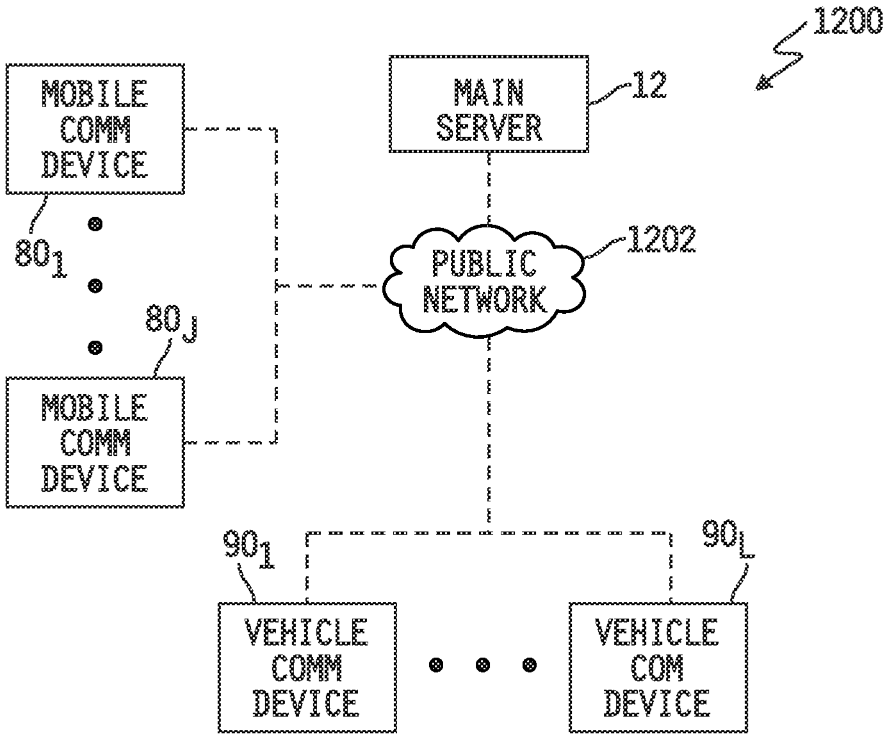
FIG. 12 is a simplified block diagram of an embodiment of a communication system for conducting wireless communications between the main server and any of the mobile and/or vehicle communication devices.

Referring now to FIG. 12, a simplified block diagram is shown of an embodiment of a communication system 1200 for conducting wireless communications between the main server 12 and any of a plurality of the mobile and/or vehicle communication devices. In the illustrated embodiment, for example, the main server 12 is illustratively shown connectable to a public network 1202, e.g., the Internet, to which a number, J, of the mobile communication devices $80_1$-$80_J$ and a number, L, of the vehicle communication devices $90_1$-$90_L$ are also connectable, where J and L may each be any positive integer. The public network 1202 may illustratively be used to access the application download module 832 of the main server 12 so that copies of fuel dispenser activation modules 502 can be downloaded from the main server 12, via the public network 1202, to any number of the mobile communication devices $80_1$-$80_J$. Likewise, the public network 1202 may illustratively be used to access the application download module 832 of the main server 12 so that copies of fuel dispenser activation modules 602 can be downloaded from the main server 12, via the public network 1202, to any number of the vehicle communication devices $90_1$-$90_L$.

Figure 13:
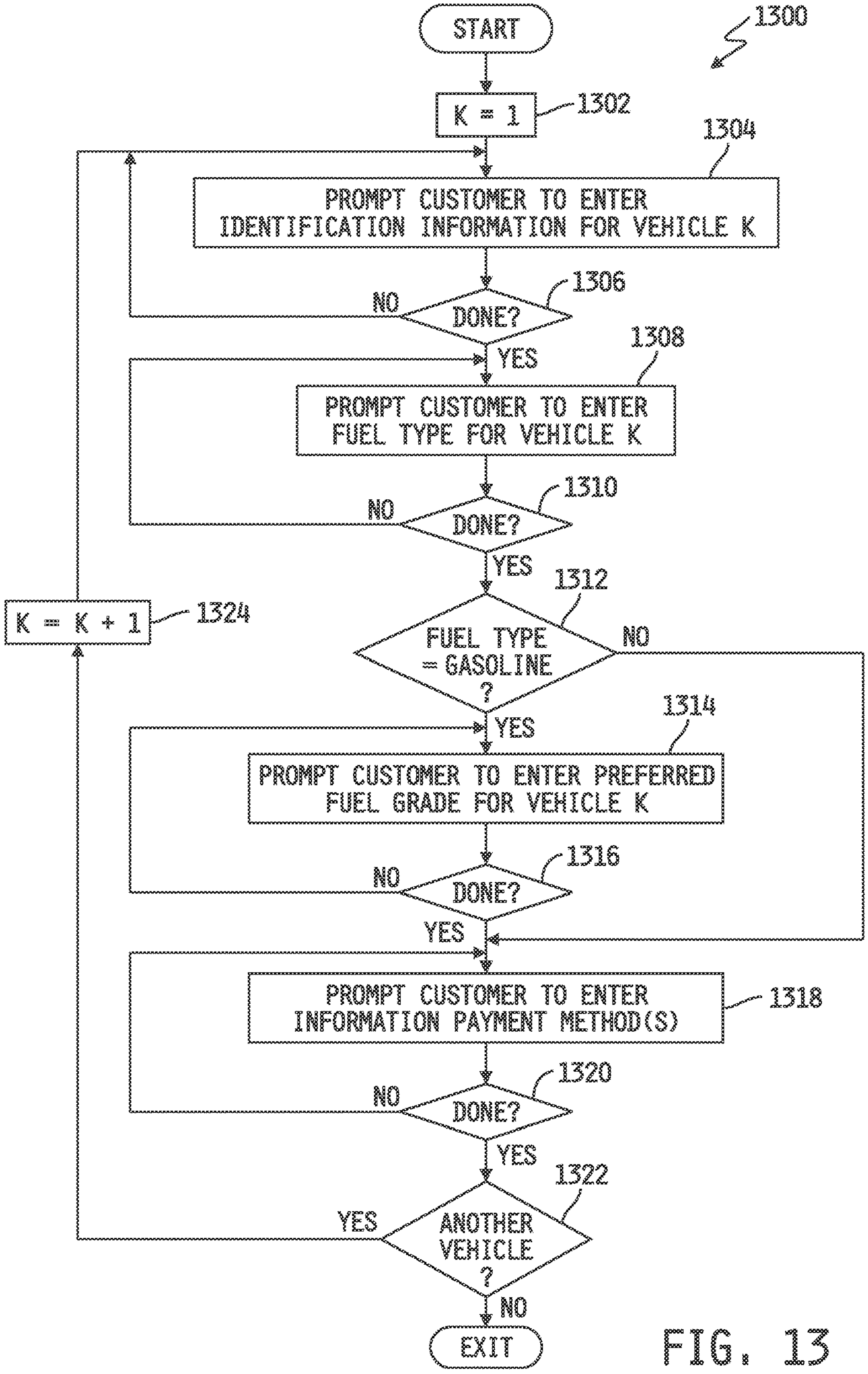
FIG. 13 is a simplified flow diagram of an embodiment of a process for entering purchaser-specific information into storage of the mobile and/or vehicle communication devices using the fuel dispenser activation software application executed by the mobile and/or vehicle communication devices.

Referring now to FIG. 13, a simplified flow diagram is shown of an embodiment of a process 1300, e.g., a set up process, for entering purchaser-specific information into the memory 304 and/or user data area 308 of the mobile communication device 80 using the fuel dispenser activation software application 502 executed by the mobile communication device 80 and/or for entering purchaser-specific information into the memory 404 and/or user data area 408 of the vehicle communication device 90 using the fuel dispenser activation software application 602 executed by the vehicle communication device 90. The process 1300 may be stored in the memory 304 and/or data storage 306 of a mobile communication device 80 in the form of instructions which, when executed by the processor 300, cause the processor 300 to perform the functional operations of the process 1300. Likewise, the process 1300 may be stored in the memory 404 and/or data storage 406 of a vehicle communication device 90 in the form of instructions which, when executed by the processor 400, cause the processor 400 to perform the functional operations of the process 1300.

The process 1300 illustratively begins at step 1302 where a counter, K, is set equal to 1. Thereafter at step 1304, the processor 300, 400 is operable to control the display screen 320, 422 to display a prompt to the customer to enter identification information for a Kth motor vehicle. The identification information may, in some embodiments, be as simple as a vehicle manufacturer's name, e.g., Buick, and in other embodiments may include more data about the motor vehicle, engine type, fuel type, engine specifications, vehicle specifications, etc. When the customer thereafter indicates, via customer input at step 1306, that the customer has completed entry of the vehicle information, the process 1300 advances to step 1308 where the processor 300, 400 is operable to control the display screen 320, 422 to display a prompt to the customer to enter a specified fuel type for the Kth vehicle. The fuel type may be, for example, gasoline or diesel. When the customer thereafter indicates, via customer input at step 13010, that the customer has completed entry of the fuel type, the process 1300 advances to step 1312 where the processor 300, 400 is operable to determine whether the fuel type just entered at step 1308 is gasoline. If not, the process 1300 advances to step 1318, and if so the processor advances to step 1314 where the processor 300, 400 is operable to control the display screen 320, 422 to display a prompt to the customer to enter a preferred grade of fuel for the Kth vehicle. The preferred fuel grade may, in one embodiment, be a gasoline octane rating number, e.g., 87, 89 or 93, etc., and in other embodiments may be a gasoline octane level descriptor, e.g., mid, high, performance, etc. In any case, the processor 300, 400 is thereafter operable at step 1318 to control the display screen 320, 422 to display a prompt to the customer to enter payment information for one or more systems of payment, e.g., of the one or more types described above, to which fuel for the Kth vehicle may be charged. Step 1324 illustratively increments the counter, K, so that the customer can enter and specify fuel type and/or grade, as well as payment information to be used with any number of motor vehicles. The processor 300, 400 is further operable to store all such information entered by the customer in the memory 304, 404 and/or in the data storage 306, 406 for later recall when remotely controlling activation of one of the fuel dispensers.

Figure 14C:
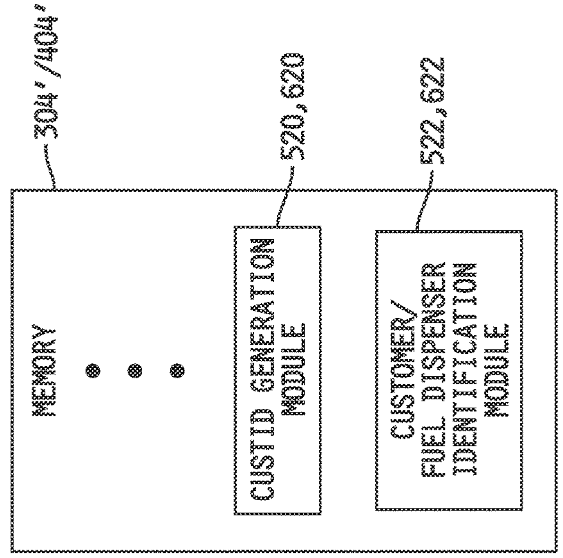
FIG. 14C is a simplified block diagram of another embodiment of one or both of the memory of the mobile communication device shown in FIG. 5 and the memory of the vehicle communication device shown in FIG. 6, illustrating an alternative embodiment of the memory device(s).
Figure 14B:
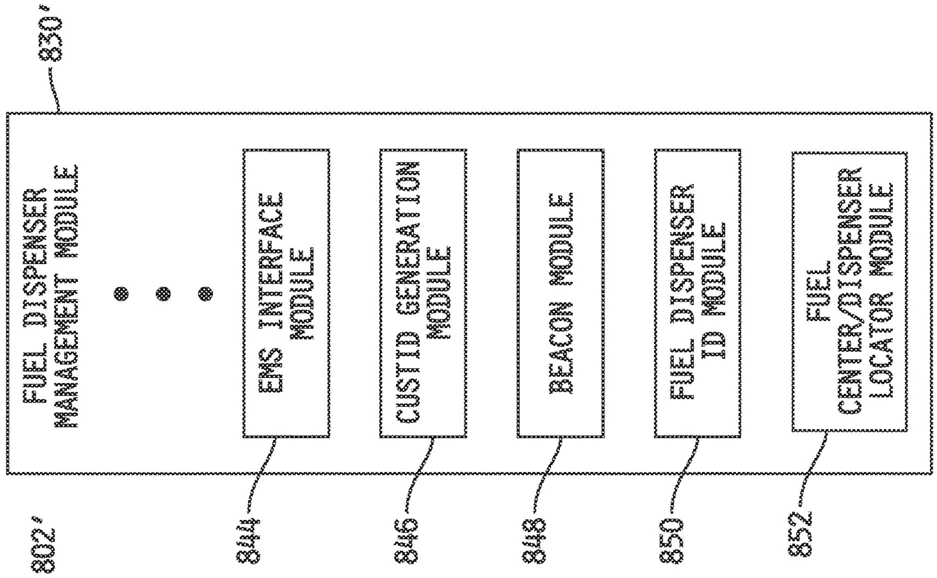
FIG. 14B is a simplified block diagram of the embodiment of the software environment of the main server shown in FIG. 14A illustrating an alternative embodiment of the fuel dispenser management module.
Figure 14A:
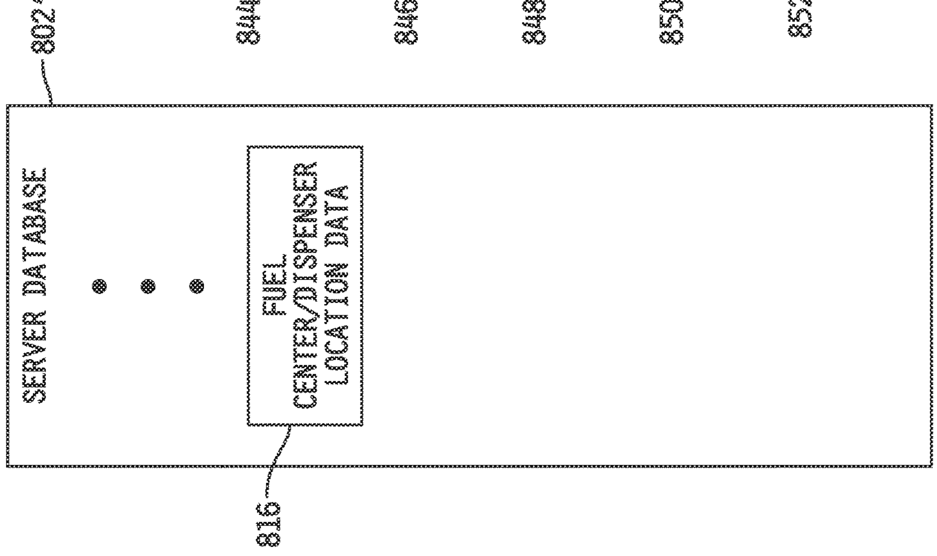
FIG. 14A is a simplified block diagram of another embodiment of a software environment of the main server illustrating an alternative embodiment of the server database.

Referring now generally to FIGS. 14A-22, another illustrative embodiment of is shown of a system and method for wirelessly activating an electromechanical fuel dispenser, for carrying out the subsequent fuel dispensation process through completion and, optionally, for providing wirelessly connected purchasers of fuel with purchaser-specific discount rewards/offers for one or more goods and/or services offered for sale by an enterprise via which the fuel is purchased. In the embodiment illustrated in FIGS. 14A-22, the system 10 is illustratively as illustrated and described with respect to FIGS. 1-8 and 12, although in some embodiments the software environment 800 of the main server 12 and/or the memory of the mobile electronic device, e.g., the memory 304 of the mobile communication device 80 and/or the memory 404 of the vehicle communication device 90, illustratively include one or more alternate or additional modules. Referring to FIG. 14A, for example, a modified embodiment 802' of the server database within the software environment 800 of the main server 12 may in some embodiments include fuel center/dispenser location data 816 having stored therein location data identifying locations of the various fuel centers $\mathbf{52}_1$-$\mathbf{52}_K$ and/or of the various fuel dispensers $\mathbf{18}_1$-$\mathbf{18}_N$, $\mathbf{18}_1$-$\mathbf{18}_M$ relative to one or more known locations and/or structures, or from which the locations of the various fuel centers $\mathbf{52}_1$-$\mathbf{52}_K$ and/or of the various fuel dispensers $\mathbf{18}_1$-$\mathbf{18}_N$, $\mathbf{18}_1$-$\mathbf{18}_M$ can be determined by the processor 20 of the main server 12 and/or by the processor of a mobile electronic device, e.g., the processor 300 of a mobile communication device 80 or the processor 400 of a vehicle communication device 90. Examples of such location data stored in the fuel center/dispenser location data 816, as well as example processing of such data, will be described hereinafter with respect to FIGS. 18-22.

Figure 15:
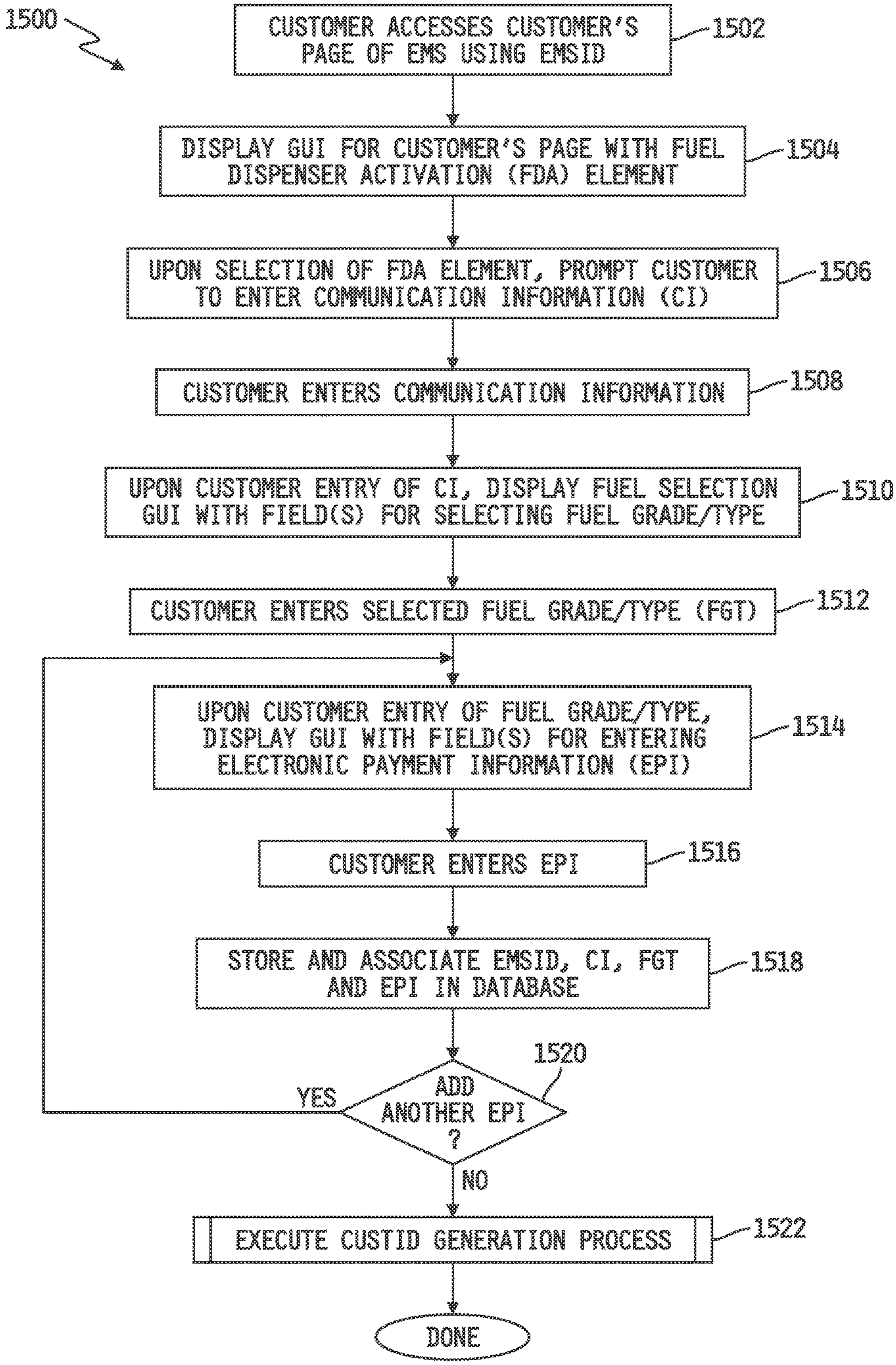
FIG. 15 is a simplified flow diagram of an embodiment of a process for facilitating entry by a customer into the customer's enterprise membership account of a selected fuel grade/type and of electronic payment information for an electronic payment system, either or both of which the customer authorizes the retail enterprise to automatically process in future transactions as payment for the purchase of fuel from the retail enterprise.
Figure 17:
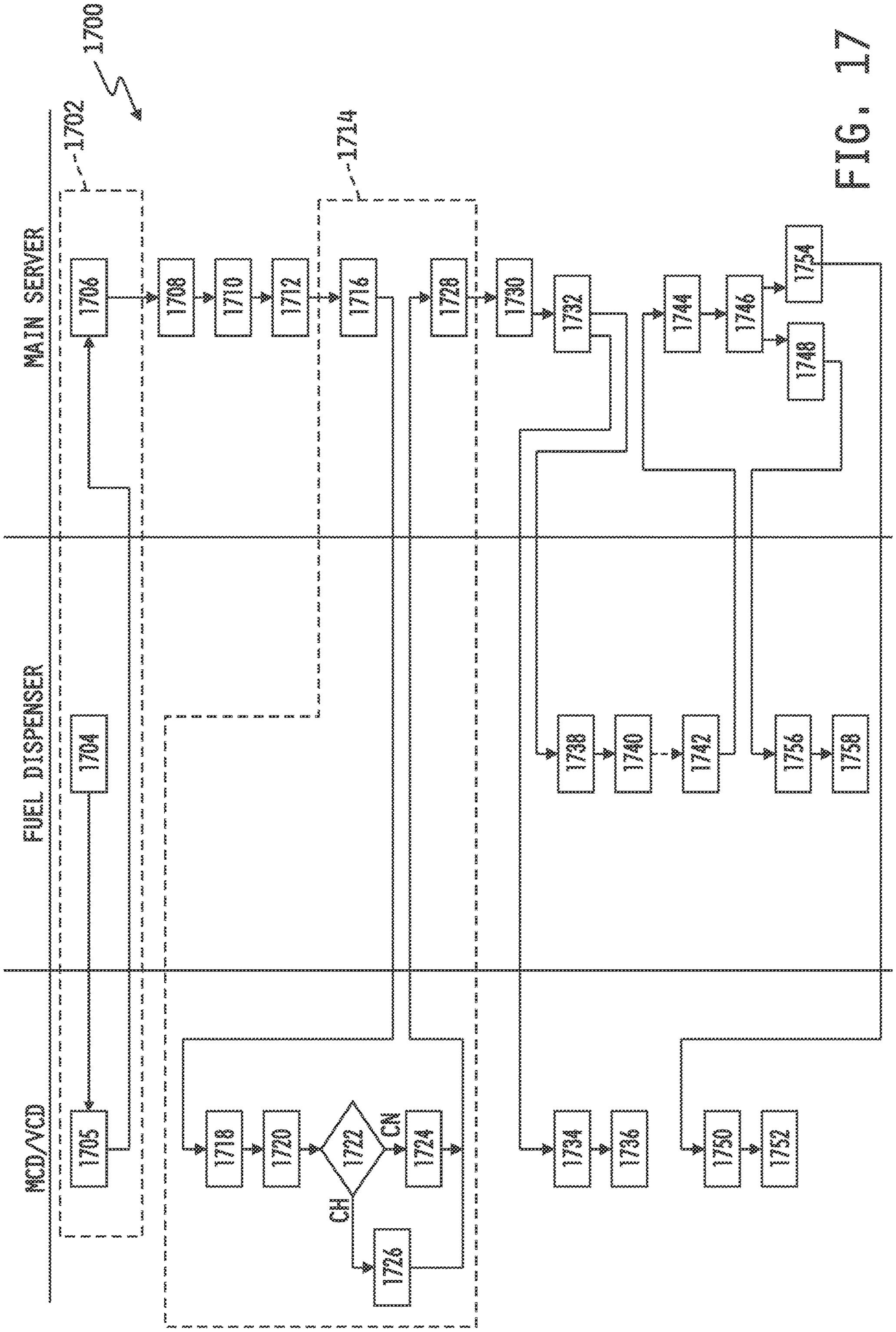
FIG. 17 is a simplified flow diagram of another embodiment of a process for wirelessly activating one of the electromechanical fuel dispensers illustrated in FIG. 1 and for carrying out the subsequent fuel dispensation process through completion.

Referring to FIG. 14B, modified embodiments 830' of the fuel dispenser management module within the software environment 800 of the main server 12 may additionally include one or more of an EMS interface module 844, a CUSTID generation module 846, a beacon module 848, a fuel dispenser ID module 850 and a fuel center/dispenser locator module 852. The EMS interface module 844 is illustratively operable to provide, control and manage a customer interface to the EMS program, e.g., a web-based EMS interface or EMS website to provide for customer entry of fuel grade/type and automatic fuel purchase payment preferences, some or all of which will illustratively be implemented by the processor 20 of the main server 12 via execution of the remote controlled fueling module 842 during subsequent fuel purchases at any of the fuel dispensers $\mathbf{18}_1$-$\mathbf{18}_N$, $\mathbf{18}_1$-$\mathbf{18}_M$. An example embodiment of a process executed by the EMS interface module 844 is illustrated in FIG. 15, and an example embodiment of a process executed by the remote controlled fueling module 84 to implement the customer fuel grade/type and/or payment preferences is illustrated in FIG. 17. Such processes will be described in detail hereinafter.

Figure 16A:
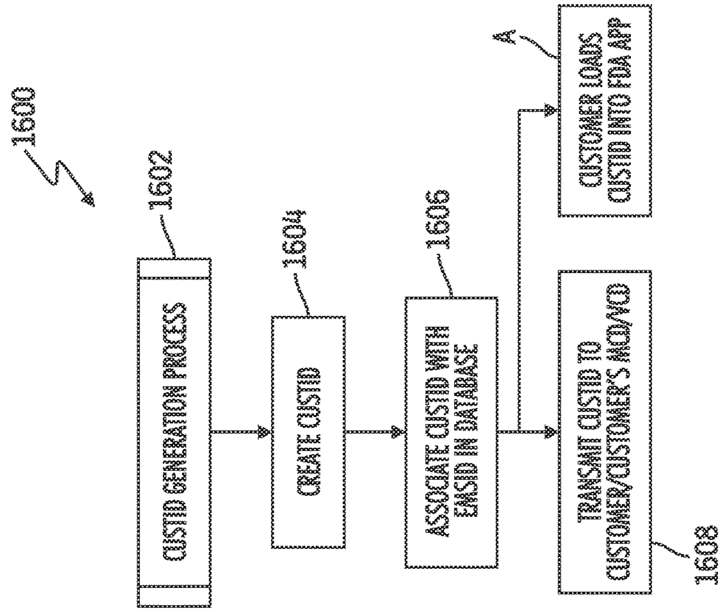
FIG. 16A is a simplified flow diagram of an embodiment of the CUSTID generation process executed as part of the process illustrated in the flow diagram of FIG. 15.
Figure 16B:
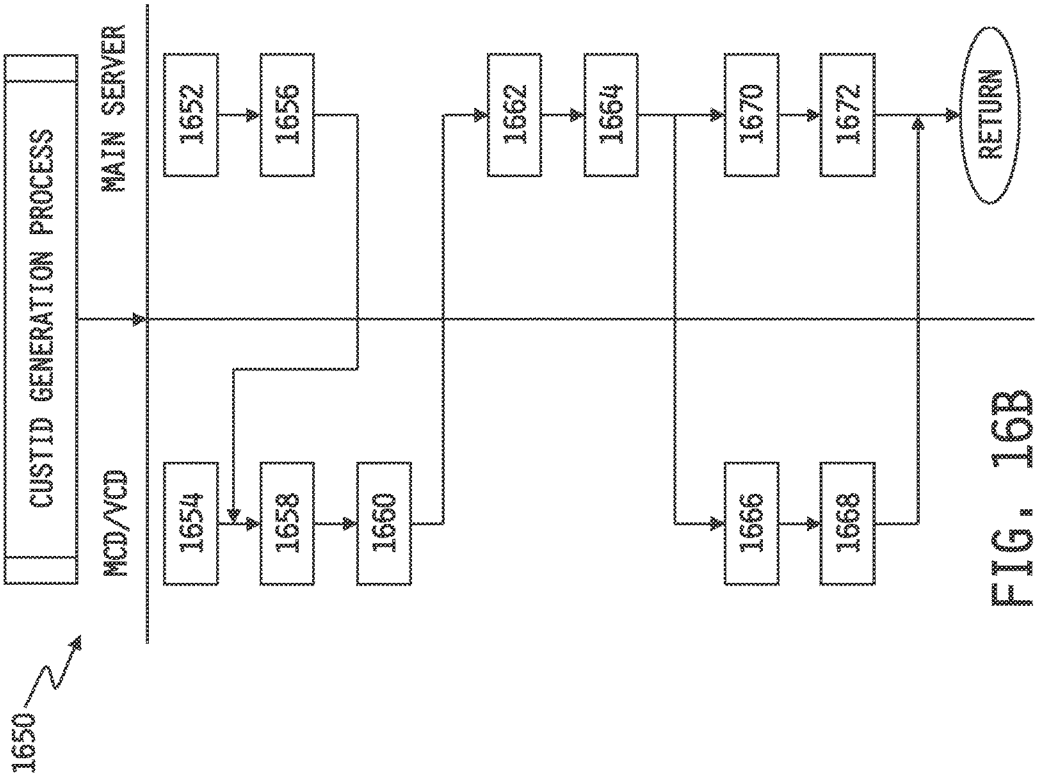
FIG. 16B is a simplified flow diagram of another embodiment of the CUSTID generation process executed as part of the process illustrated in the flow diagram of FIG. 15.

The CUSTID generation module 846 is illustratively operable to generate a customer identification code, CUSTID, to be stored in and used by a customer's mobile electronic device, e.g., mobile communication device 80 and/or vehicle communication device 90, to identify the main server 12 the identity of the customer-member of the EMS program and to securely identify electronic payment information (EPI) previously established by the customer-member for automatic payment for fuel purchases. Referring to FIG. 14C, modified memories 304' of mobile communication devices 80 and/or 404' of vehicle communication devices 90 likewise illustratively include in such embodiments a CUSTID generation module 520, 620 respectively. Example embodiments of processes executed in-part by the CUSTID generation module 846 and in-part by the CUSTID generation module 520, 620 are illustrated in FIGS. 16A and 16B, and such processes will be described in detail hereinafter.

Figure 18:
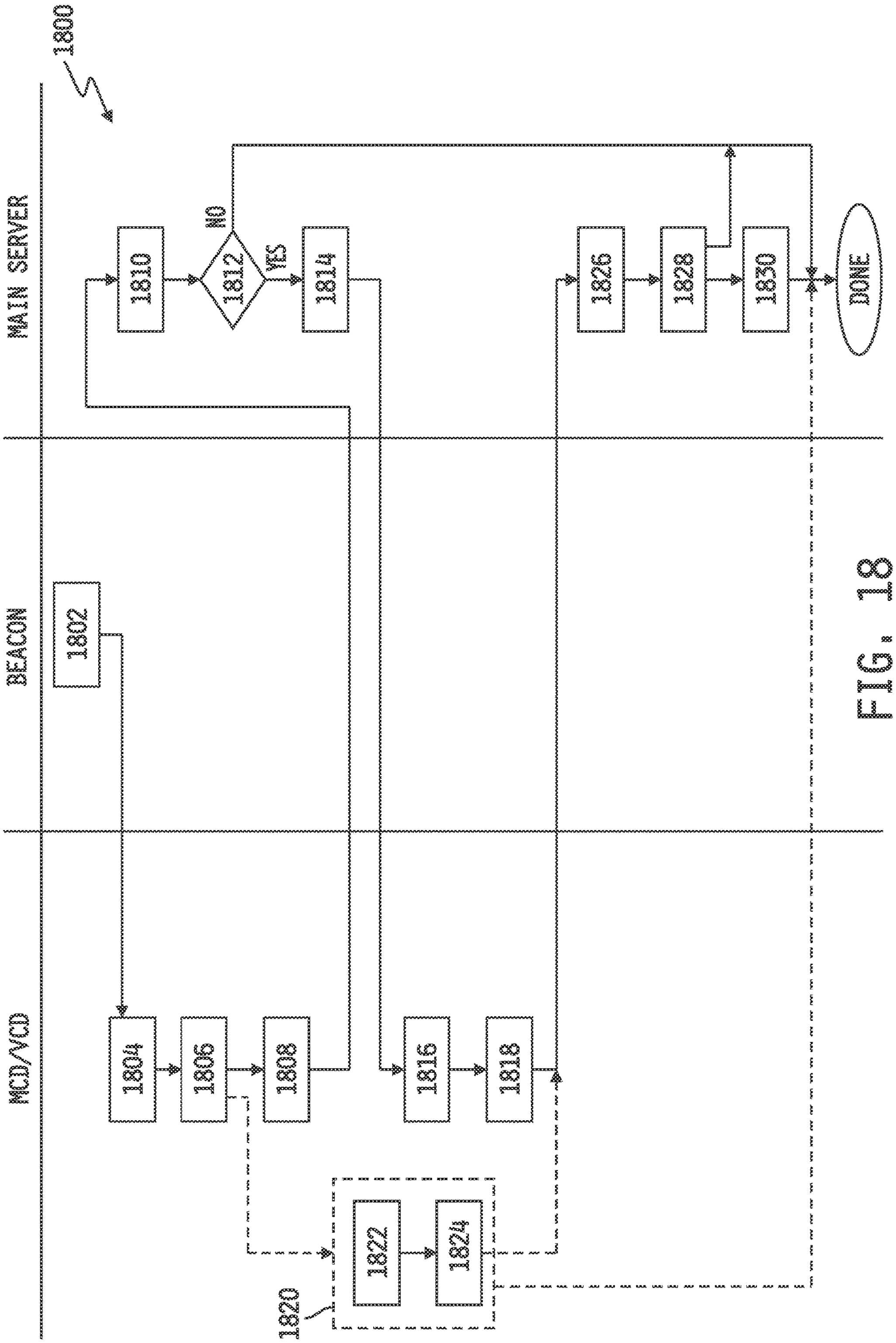
FIG. 18 is a simplified flow diagram of one embodiment of the customer/fuel dispenser identification process illustrated generally at step 1702 of the process of FIG. 17.

The beacon module 848 is illustratively included in embodiments in which wireless signal broadcasting devices, e.g., beacons 224 and/or 710, are used to locate fuel dispensers $\mathbf{18}_1$-$\mathbf{18}_N$, $\mathbf{18}_1$-$\mathbf{18}_M$ at which EMS member-customers are located and from which such customer-members desire to dispense fuel. In such embodiments, the beacon module 848 is illustratively operable to determine the identity of a beacon 224 (and/or 710) associated with the fuel dispenser 18 from which a customer-member of the EMS program wishes to dispense fuel, and to thus identify the associated fuel dispenser 18 for purposes of controllably activating the dispensing section 204 of the identified fuel dispenser 18 for subsequent dispensation of fuel. In such embodiments, the fuel center/dispenser location data 816 illustratively contains information about each beacon 224, 710 in the retail enterprise. In some embodiments, such beacon information includes the unique identification codes (UID) of each beacon 224, 710. In other embodiments, the beacon information may additionally include beacon type information identifying or associating a beacon type, BT, with each beacon 224, 710. In some such embodiments, the beacon information may be stored, e.g., separately, in the database 816 according to beacon type. In some embodiments, the database 816 may include additional information including, for example, but not limited to, positional information corresponding to the coordinates of some or all of the beacons of the retail enterprise and/or of one or more fuel centers $\mathbf{52}_1$-$\mathbf{52}_K$ thereof, relative to one or more sets of base coordinates or positional information corresponding to the coordinates of some or all of the fuel dispensers $\mathbf{18}_1$-$\mathbf{18}_N$, $\mathbf{18}_1$-$\mathbf{18}_M$ of the retail enterprise and/or of one or more fuel centers $\mathbf{52}_1$-$\mathbf{52}_K$ thereof, relative to one or more sets of base coordinates. In such embodiments, the beacon module 848 is illustratively operable to process beacon-related information transmitted to the main server 12 by customers' mobile electronic devices, e.g., 80 and/or 90, and to control transmission of corresponding and related information back to the customers' mobile electronic devices. Referring to FIG. 14C, modified memories 304' of mobile communication devices 80 and/or 404' of vehicle communication devices 90 likewise illustratively include in such embodiments a customer/fuel dispenser identification module 522, 622 respectively. An example embodiment of a process executed in-part by the beacon module 848 and in-part by the customer/fuel dispenser identification module 522, 622 is illustrated in FIG. 18 and will be described in detail hereinafter.

Figure 20:
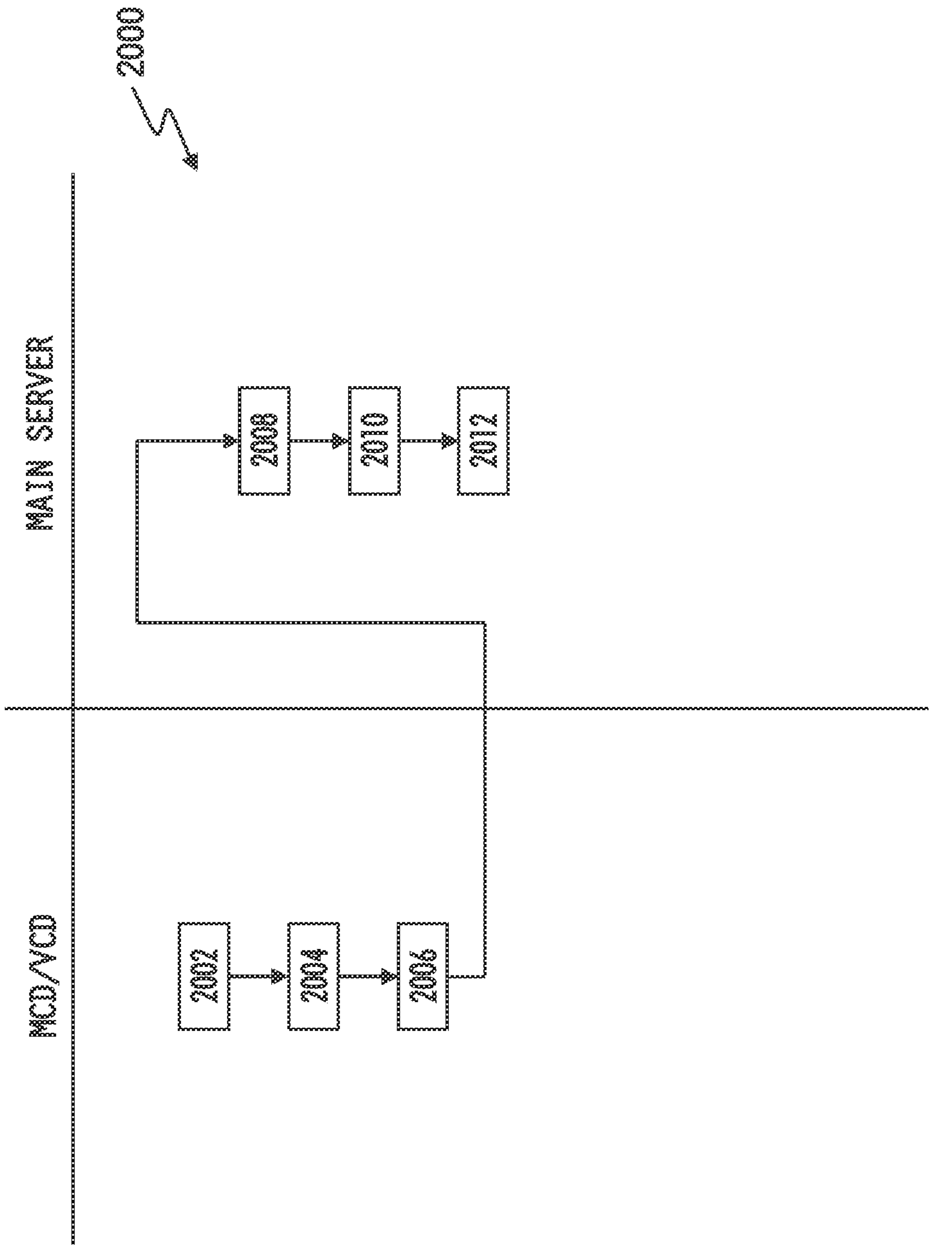
FIG. 20 is a simplified flow diagram of another embodiment of the customer/fuel dispenser identification process illustrated generally at step 1702 of the process of FIG. 17.

The fuel dispenser ID module 850 is illustratively included in embodiments in which the fuel dispenser ID 200 and/or fuel center ID 700 is/are used to locate fuel dispensers $18_1$-$18_N$, $18_1$-$18_M$ at which EMS member-customers are located and from which such customer-members desire to dispense fuel. In such embodiments, the fuel dispenser ID module 850 is illustratively operable to determine the identity of a fuel dispenser 18 from which a customer-member of the EMS program wishes to dispense fuel, and to thus identify the associated fuel dispenser 18 for purposes of controllably activating the dispensing section 204 of the identified fuel dispenser 18 for subsequent dispensation of fuel. In such embodiments, the fuel center/dispenser location data 816 may illustratively contain information associating fuel dispenser IDs 200 and/or fuel center IDs 700 and/or fuel dispenser IDCODEs with corresponding ones of the fuel dispensers $18_1$-$18_N$, $18_1$-$18_M$. In such embodiments, the customer/fuel dispenser identification module 522, 622 illustrated in FIG. 14C likewise contains instructions to facilitate locating and identifying fuel dispensers 18 via the fuel dispenser ID 200 and/or the fuel center ID 700. An example embodiment of a process executed in-part by the fuel dispenser ID module 850 and in-part by the customer/fuel dispenser identification module 522, 622 is illustrated in FIG. 20 and will be described in detail hereinafter.

Figure 21:
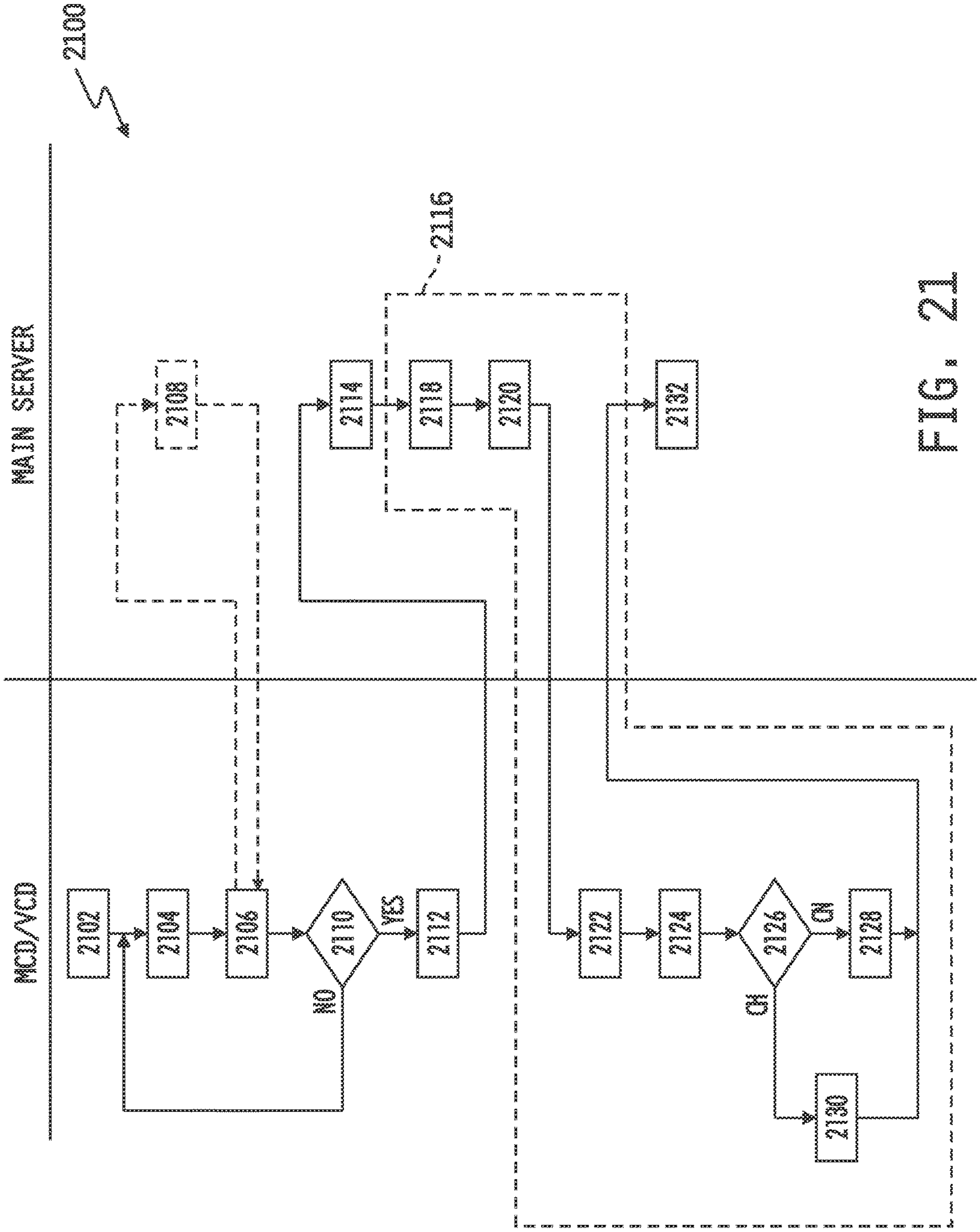
FIG. 21 is a simplified flow diagram of yet another embodiment of the customer/fuel dispenser identification process illustrated generally at step 1702 of the process of FIG. 17.

The fuel center/dispenser module 852 is illustratively included in embodiments in which the GPS position of the mobile electronic device and geofence data relating to the location-based positions of the various fuel centers $52_1$-$52_K$ and/or of the various fuel dispensers $18_1$-$18_N$, $18_1$-$18_M$ are used to locate fuel dispensers $18_1$-$18_N$, $18_1$-$18_M$ at which EMS member-customers are located and from which such customer-members desire to dispense fuel. In such embodiments, the fuel center/dispenser module 852 is illustratively operable to determine the position of a customer-member's mobile electronic device relative to a fuel center 52 and/or a fuel dispenser 18 from which a customer-member of the EMS program wishes to dispense fuel, and to identify the associated fuel dispenser 18 for purposes of controllably activating the dispensing section 204 of the identified fuel dispenser 18 for subsequent dispensation of fuel. In such embodiments, the fuel center/dispenser location data 816 may illustratively contain geofence data in the form of geographic boundaries related to the various fuel centers $52_1$-$52_K$ and/or the various fuel dispensers $18_1$-$18_N$, $18_1$-$18_M$. In such embodiments, the customer/fuel dispenser identification module 522, 622 illustrated in FIG. 14C illustratively contains instructions to provide geographic position data relating to the location of the customer-member's mobile electronic device to the main server. An example embodiment of a process executed in-part by the fuel center/dispenser module 852 and in-part by the customer/fuel dispenser identification module 522, 622 is illustrated in FIG. 21 and will be described in detail hereinafter.

Referring now to FIG. 15, a simplified flow diagram is shown depicting an embodiment of a process 1500 for facilitating entry by a customer into the customer's EMS account, e.g., within the customer account data 804 of the database 802, electronic payment information (EPI) for one or more electronic payment systems (EPS) that the customer authorizes, e.g., by entry of the EPI for one or more specified EPSs into the customer's EMS account, the main server 12 to automatically process in future transactions as payment for the purchase of fuel via an identified one of the fuel dispensers $18_1$-$18_N$, $18_1$-$18_M$. The process 1500 may, in some embodiments such as that illustrated in FIG. 15, additionally or alternative include process steps for facilitating entry by a customer into the customer's EMS account fuel grade and/or type information (FGT) corresponding to a type and/or grade of fuel which the customer authorizes, e.g., by entry of the FGT information into the customer's EMS account, the main server 12 to automatically control the identified fuel dispenser $18_1$-$18_N$, $18_1$-$18_M$ to deliver in future transactions for the purchase of fuel. In embodiments in which the customer enters multiple EPIs into the customer's EMS account data 804, one such EPI, e.g., the first one entered or otherwise designated by the customer, may be referred to herein as a "default EPI," "default electronic payment information" or "default electronic funds transfer instrument" and in embodiments in which the customer enters a single EPI into the customer's EMS account data 804 the single EPI may likewise be referred to herein as a "default EPI," "default electronic payment information" or "default electronic funds transfer instrument." Similarly, in embodiments in which the customer enters a fuel grade or type FGT into the customer's EMS account data 804, the FGT may be referred to herein as a "default FGT" or "default fuel grade or type," or in some instances more specifically as a "default fuel grade" or "default fuel type." Such use of the word "default" will generally indicate a first corresponding parameter selected and applied by the main server 12 in a fuel purchase transaction, and that the customer may in some instances be provided with an opportunity to select an alternate or customer-defined parameter. For example, in some embodiments the default EPI may for some reason fail a payment authorization check carried out or otherwise requested by the main server 12, and in such instances the customer may select an alternate in the customer's EMS account data 804 if the customer has previously entered multiple EPIs therein or the customer may, in some embodiments, manually enter an alternate EPI into the customer's mobile electronic device prior to or as part of the fuel purchase transaction. As another example, in some embodiments the customer may, as part of a fuel purchase transaction, be requested or prompted by the main server 12 to confirm a default EPI and/or FGT, and in such embodiments the customer may confirm the default EPI and/or FGT or may instead select an alternate EPI or FGT. The process 1500 further illustratively includes a process for creating or generating a customer identification code, CUSTID, to associate with the customer and with the authorized EPS for the purpose of identifying and authorizing access by the main server 12 to the authorized EPS in any such future purchase transaction in which the authorized EPS is automatically processed by the main server 12. Example embodiments of the CUSTID generation process are illustrated in FIGS. 16A and 16B, and each will be described in detail hereinafter.

In one embodiment, the process 1500 is stored in the memory 24 (and/or data storage 26) of the main server 12 in the form of instructions executable by the processor 20 of the main server 12, and the process steps of the process 1500 will be described below for purposes of this disclosure as being executed by the processor 20 of the main server 12. It will be understood, however, that in some alternate embodiments, the process 1500 may be alternatively stored, in whole or in part, in the memory 44 (and/or data storage 46) of the one or more of the local servers $16_1$-$16_K$ in the form of instructions executable, in whole or in part, by the processor 40 of one or more of the local servers $16_1$-$16_K$, and in still other embodiments the process 1500 may be stored, in whole or in part, in the memory 64 (and/or data storage

66) of the one or more of the fuel dispensers $\mathbf{18}_1$-$\mathbf{18}_N$, $\mathbf{18}_1$-$\mathbf{18}_M$ in the form of instructions executable, in whole or in part, by the processor 60 of one or more of the one or more of the fuel dispenser $\mathbf{18}_1$-$\mathbf{18}_N$, $\mathbf{18}_1$-$\mathbf{18}_M$. In any such embodiments, the process 1500 may be executed in whole or in part by one or more processors within any one or a combination of the main server 12, any of the one or more local servers $\mathbf{16}_1$-$\mathbf{16}_K$ and any of the one or more of the fuel dispensers $\mathbf{18}_1$-$\mathbf{18}_N$, $\mathbf{18}_1$-$\mathbf{18}_M$ and, wherein information may be shared between the such systems via wired and/or wireless connection.

The process 1500 illustratively operates separately with respect to each enterprise membership service account number, i.e., each EMSID. In this regard, the process 1500 begins at step 1502 where the processor 20 is operable to determine that a customer has accessed that customer's page of the EMS interface, e.g., an access page of one or more dedicated and private pages of the EMS website hosted by the main server 12 and associated or assigned to the customer, using the customer's EMSID. Access by the customer of the customer's page of the EMS interface may be accomplished, for example, using a mobile communication device 80, a vehicle communication device 90 or another web-accessible computing device. In any case, upon detection of such access by the customer of the customer's page of the EMS interface, the process 1500 advances to step 1504 where the processor 20 is operable to generate and include for display on the accessed customer's page of the EMS interface a graphic user interface (GUI) which includes a fuel dispenser activation (FDA) element. The FDA element illustratively acts as a gateway by which the customer can enter fuel purchase preferences into the customer's EMS account data 804. Upon selection by the customer of the FDA element, the processor 20 is operable at step 1506 to generate for display on the accessed customer's page of the EMS interface a prompt for the customer to enter communication information (CI), and thereafter at step 1508 the customer enters into the EMS interface the communication information (CI) requested by the processor 20. Illustratively, the communication information (CI) requested by the processor 20 and entered into the EMS interface is or includes one or more communication code(s), e.g., in the form of one or more sequences of numbers, letters of any alphabet, punctuation symbols and/or other symbols, that identifies a mobile electronic device, e.g., a mobile communication device 80 or a vehicle communication device 90, that will be used by the customer to communicate with the main server 12 during fuel purchase transactions in which the authorized EPI and/or authorized FGT will be automatically processed by the main server 12. In one embodiment, the communication information (CI) may be or include the telephone number of the identified mobile communication device 80. In other embodiments, the communication information (CI) may be or include a serial number, electronic identification code or other communication identifier associated with a vehicle communication device 90. In still other embodiments, the communication information (CI) may be or include, in place of or in addition to a telephone number or communication identifier of the customer's mobile electronic device, one or more other unique mobile electronic device identification codes that identify the specified mobile electronic device for purposes of wireless communication therewith. In embodiments in which the customer's EMS account data 804 already includes or has access to the customer's communication information (CI), steps 1506 and 1508 may be omitted or modified to require the customer to acknowledge and authorize use thereof by the processor 20, for generation of the CUSTID code, and/or modified to allow the customer to authorize use by the processor 20, for generation of CUSTID code, of communication information (CI) other than that identified in the customer's EMS account data 804. In any case, following execution of step 1508, the communication information (CI) obtained and to which the processor 20 has access identifies communication information (CI) for a mobile electronic device associated with the customer via which wireless communications with the main server 12 will be conducted and with which the processor 20 is authorized to communicate during future fuel purchase transactions.

In the embodiment of the process 1500 illustrated in FIG. 15, the processor 20 is operable at step 1510, upon customer entry of the communication information (CI), to generate and include for display on the accessed customer's page of the EMS interface a fuel selection graphic user interface (GUI) which includes one or more fields for entering or selecting a preferred fuel grade and/or type (FGT). Thereafter at step 1512, the customer enters FGT into the one or more fields of the fuel selection GUI or selects FGT from one or more menus or selectable fuel grade and/or type options pre-populated by the main server 12 in the one or more fields of the fuel selection GUI. As one example, which should not be considered limiting in any way, the processor 20 may be operable at step 1510 to generate the fuel selection GUI to include a menu of fuel types and fuel grades, e.g., "Diesel," for diesel fuel and "Premium," "Regular" and "Economy" or octane rating number such as "92," "89" and "87" for gasoline, and the user may select FGT from such a menu. As another example, which should not be considered limiting in any way, the processor 20 may be operable at step 1510 to generate the fuel selection GUI to include a first menu of fuel types, e.g., "Diesel" and "Gasoline," and after a user selects a fuel type from the first menu the processor 20 may be operable to generate a second menu of fuel grades, e.g., "Premium," "Regular" and "Economy" or octane rating number such as "92," "89" and "87" if the user has first selected "Gasoline" as the fuel type. Those skilled in the art will recognize other techniques for allowing the user to specify at steps 1510 and 1512 a fuel type and/or grade, and such other techniques are intended to fall within the scope of this disclosure. Moreover, it will be understood that the processor 20 may be operable at step 1510 to generate more, fewer and/or different fuel types and/or grades for customer selection thereof without detracting from the scope of this disclosure.

Following step 1512, the process 1500 advances to step 1514 where the processor 20 is operable to generate and include for display on the accessed customer's page of the EMS interface or as a new page for display on the accessed customer's page of the EMS interface, an electronic payment system graphic user interface (EPS GUI) with a plurality of fields in which the user can enter electronic payment information (EPI) associated with an EPS selected by the customer. Thereafter at step 1516, the customer enters the EPI of a selected EPS into the plurality of EPS GUI fields. As used herein, the term "electronic payment system" or "EPS" refers generally to any instrument of electronic funds transfer that is identifiable by an account number, card number, access number, code or other identification and that may be used by a customer and accepted by the retail enterprise in the course of a fuel purchase transaction to satisfy payment for fuel purchased by the customer from the retail enterprise via a one of the fuel dispensers $\mathbf{18}_1$-$\mathbf{18}_N$, $\mathbf{18}_1$-$\mathbf{18}_M$. Examples of such instruments of electronic funds transfer include, but are not limited to, credit cards, debit cards, pre-paid credit cards, on-line money transfer accounts, wire transfer accounts, electronic or digital money certificates and/or accounts, ecommerce payment systems, and the like.

As used herein, the term "electronic payment information" or "EPI" refers generally to information uniquely associated with an EPS that identifies the EPS for purposes of transferring funds from the EPS to the retail enterprise. In some embodiments, the EPI may be or include an account or identification number or code that specifically identifies the EPS, e.g., a credit card number. In other embodiments, the EPI may include one or more numbers or codes, e.g., a security code, in addition to the identification number or code. Any such "code" referred to in herein will be understood to be a unique combination, at least for purposes of identifying an EPS account, of one or more numerical digits, one or more letters of an alphabet in any language, one or more punctuation symbols and/or one or more symbols other than punctuation symbols. In still other embodiments, the EPI may include information alternatively to, or in addition to, an account or identification number/code (and, in some embodiments, further alternatively to or in addition to a security number/code), examples of which may include the name of the person to whom the EPS is issued, birthdate of the person to whom the EPS is issued, part or all of the address of the person to whom the EPS is issued, part or all of the billing address of the payer or other funding source of the EPS, contact information, such as one or more telephone or mobile phone numbers, one or more email addresses, etc. of the person to whom the EPS is issued and/or of the payer or other funding source of the EPS, identity of and/or other information about the EPS issuer, the EPS payment processing organization, e.g., Visa®, MasterCard®, etc., or the like. It will be understood that "EPI," as used herein, may be or include one or any combination of any of the foregoing numbers, codes and/or information, and that information about the EPS, in addition to EPI, may be required by the process 1500 to be entered by the customer into the EPS GUI displayed at step 1514. As one specific example, the EPI in one embodiment may be defined completely by a combination of an account or identification number and security code of the EPS, although the process 1500 may additionally require some or all of the information just described to be entered into the displayed EPS GUI in order to completely satisfy step 1516, i.e., in order for the process 1500 to advance from step 1516 to step 1518.

Following step 1516, the process 1500 advances to step 1518 where the processor 20 is illustratively operable to store EMSID, CI, FGT and EPI in the customer account database 804, and further to associate EMSID, CI, FGT and EPI with each other in the database 804. It will be understood that the term "associate" as used in the previous sentence refers to a linking of parameters within the database such that a successful search for one parameter by the processor 20 in the database 804 will provide access to the remaining associated parameters. Such data association may be accomplished using, for example, one or more conventional tables, charts, arrays, linked lists, or other conventional data association techniques. While in the embodiment just described the EPI is stored by the processor 20 in the customer account data 804 of the database 402, the EPI and or one or more of the remaining parameters listed above may be stored, in whole or in part, elsewhere in one or more other databases or memory units within or outside of the system 10.

Following step 1518, the process 1500 illustratively advances to step 1520 where the processor 20 is operable to prompt the customer, e.g., via a suitable graphic user interface or graphic user interface element displayed on the accessed customer's page of the EMS interface, for additional EPI, i.e., to add EPI for another EPS different and separate from that just entered. If the customer elects to do so by selecting the GUI prompt at step 1520, the process 1500 loops back to step 1514 where a customer may enter EPI for another EPS. Illustratively, the first-entered EPI may be the "default EPI" or the process 1500 may further include another one or more steps via which the customer may select as the default EPI one of multiple EPIs entered by the customer. In any case, if/when the customer declines to enter one or more additional EPIs, the process 1500 follows the "NO" branch of step 1520 to step 1522.

At step 1522 the processor 20 is operable to execute the CUSTID generation process in which the processor 20 generates the CUSTID, i.e., a customer identification code which will be used to by the processor 20 to identify the customer and an EPS authorized by the customer for processing of payment for the purchase of fuel at future fuel purchase transactions conducted via one of the fuel dispensers $\mathbf{18_1}$-$\mathbf{18_N}$, $\mathbf{18_1}$-$\mathbf{18_M}$. A number of different embodiments of the CUSTID generation process executed at step 1522 are illustrated by example in FIGS. 16A and 16B. Following step 1522, the process 1500 illustratively ends. It will be understood that the process 1500 may illustratively include more, fewer and/or different steps to include correspondingly more, fewer and/or different features. In one alternative embodiment, for example, steps 1510-1512 may be omitted such that the process 1500 provides only for the entry and identification of EPI for one or more electronic payment systems (EPS) to be processed by the main server 12 in the course of subsequent fuel purchase transactions to satisfy payment for fuel purchased by the customer from the retail enterprise via a one of the fuel dispensers $\mathbf{18_1}$-$\mathbf{18_N}$, $\mathbf{18_1}$-$\mathbf{18_M}$. In other alternative embodiments, steps 1514-1516 may be omitted such that the process 1500 provides only for the entry and identification of FGT to be processed by the main server 12 in the course of subsequent fuel purchase transactions for the purpose of controlling an identified fuel dispenser $\mathbf{18_1}$-$\mathbf{18_N}$, $\mathbf{18_1}$-$\mathbf{18_M}$ for dispensation of fuel corresponding FGT. In still further alternative embodiments, steps may be added to the process 1500 to include one or more additional features, examples of which may include, but are not limited to, automatic or selective application of discount fuel coupons, automatic or selective application to the fuel purchase price of monetary credit in the form of "digital cash" contained in a digital wallet or other account that is part of or otherwise inked to the customer's EMS account, or the like.

Referring now to FIG. 16A, a simplified flow diagram is shown of an embodiment of a process 1600 for executing the CUSTID (customer identification) generation process 1602 identified at step 1522 of the process 1500 illustrated in FIG. 15. In the embodiment illustrated in FIG. 16A, CUSTID is illustratively generated in a form that will be stored in, or accessed by, a mobile electronic device such as a mobile communication device 80 carried by the customer or a vehicle communication device 90 carried by or mounted in a vehicle 76 to be refueled, which will then be automatically transferred from the mobile electronic device to the main server 12 during transactions for the purchase of fuel via one of the fuel dispensers $\mathbf{18_1}$-$\mathbf{18_N}$, $\mathbf{18_1}$-$\mathbf{18_M}$ in which an authorized EPS is to be automatically processed by the main server 12.

In one embodiment, the process 1600 is stored in the memory 24 (and/or data storage 26) of the main server 12 in the form of instructions executable by the processor 20 of the main server 12, and the process steps of the process 1600 will be described below for purposes of this disclosure as being executed by the processor 20 of the main server 12. It will be understood, however, that in some alternate embodiments, the process 1600 may be alternatively stored, in whole or in part, in the memory 44 (and/or data storage 46) of the one or more of the local servers $16_1$-$16_K$ in the form of instructions executable, in whole or in part, by the processor 40 of one or more of the local servers $16_1$-$16_K$, and in other embodiments the process 1600 may be stored, in whole or in part, in the memory 64 (and/or data storage 66) of the one or more of the fuel dispensers $18_1$-$18_N$, $18_1$-$18_M$ in the form of instructions executable, in whole or in part, by the processor 60 of one or more of the one or more of the fuel dispensers $18_1$-$18_N$, $18_1$-$18_M$. In any such embodiments, the process 1600 may be executed in whole or in part by one or more processors within any one or a combination of the main server 12, any of the one or more local servers $16_1$-$16_K$ and any of the one or more of the fuel dispensers $18_1$-$18_N$, $18_1$-$18_M$, wherein information may be shared between the such systems via wired and/or wireless connection.

The embodiment illustrated in FIG. 16A illustratively requires the mobile electronic device, e.g., the mobile communication device 80 or the vehicle communication device 90, to include the CUSTID generation module 520, 620 described hereinabove with respect to FIG. 14C. In the embodiment illustrated in FIG. 16A, the CUSTID generation module 520, 620 is or includes a software application which, when executed by the processor 300, 400 of the mobile electronic device, causes the processor 300, 400 to load the CUSTID code generated by the process 1600 from a memory location within or outside of the customer's mobile electronic device into the customer/fuel dispenser identification module 522, 622 also illustrated in FIG. 14C.

In the embodiment illustrated in FIG. 16A, the CUSTID generation process 1600 begins at step 1604 where the processor 20 is operable to create the CUSTID code. Illustratively, the CUSTID code is created by the processor 20 in the form of a passcode, pin, token or other code as one or more unique sequences of bits. In one embodiment, the one or more unique sequences may be defined by or include one or more digits, one or more letters of any alphabet, one or more punctuation symbols or one or more other symbols, and may be assembled in the form of one or more appended or integrated sequences of bits or in the form of one or more separate sequences of bits. In other embodiments, some or all of any such one or more sequences of bits may be or include one or more sequences of bits that do/does not define any digit, letter, punctuation symbol or other symbol. In some embodiments, the CUSTID code may be generated by the processor 20 randomly or pseudo-randomly. In other embodiments, the CUSTID code may be generated by the processor 20 as a function of one or more variables generally. In some such embodiments, the CUSTID code may be generated by the processor 20 as a function of information relating to the customer, to the customer's EMS account, to the customer's mobile electronic device, or as any combination thereof. Examples of information relating to the customer include, but are not limited to, customer's name, customer's address, customer's email address, or the like, examples of information relating to the customer's EMS account include, but are not limited to, the customer's EMSID, one or more portions of the EPI defined by or relating to the authorized EPS (i.e., an EPS authorized according to a process such as that illustrated at steps 1514-1516 of FIG. 15), one or more portions of EPI relating to one or more additional EPSs identified within the customer's EMS account, or the like, and examples of information relating to the customer's mobile electronic device include, but are not limited to, any portion of the communication information provided at step 1508 of the process 1500 illustrated in FIG. 15 or the like.

In some embodiments the CUSTID code may be generated solely by the processor 20 in the form of a single code or two or more appended or separate codes. In other embodiments, customer may specify, e.g., via a suitable GUI, some or all of the CUSTID code. In some such embodiments in which the customer enters some of all of the CUSTID code, the customer-entered CUSTID code may act as an initial customer code which the processor 20 is operable to process using any conventional processing technique to produce a second CUSTID code which then replaces, is integrated with or is appended to the customer-entered CUSTID code. Those skilled in the art will recognize other techniques for generating a CUSTID code that may or may not be a function of one or more variables, and it will be understood that any such alternate techniques are contemplated by this disclosure.

Following step 1604, the process 1600 advances to step 1606 where the processor 20 is operable to associate the generated CUSTID code with the customer's EMSID, i.e., the EMSID entered by the customer to access the process 1500. In some embodiments, the processor 20 is alternatively or additionally operable at step 1606 to associate the generated CUSTID code with the EPI of the authorized EPS, i.e., the EPI entered by the customer at step 1516 of the process 1500. In some embodiments, the processor 20 is alternatively or additionally operable at step 1606 to associated the generated CUSTID code with FGT and/or CI entered by the customer in the process 1500. In one embodiment, the processor 20 is operable to execute step 1606 by storing the CUSTID code in a database and then linking the stored CUSTID code to stored values of EMSID and/or EPI and/or FGT and/or CI using one or more conventional data association techniques. Illustratively, the generated CUSTID code may be stored by the processor 20, in whole or in part, in the customer account data 804 of the database 802, or elsewhere in one or more other databases or memory units within or outside of the system 10. In such embodiments, the processor 20 is illustratively operable to link the stored CUSTID code to stored values of EMSID and/or EPI and/or FGT and/or CI using one or more conventional linking or pointing mechanisms, examples of which include, but are not limited to, a table, a chart, a linked list or other pointer, or the like. In embodiments in which the CUSTID code includes the customer's EMSID, the processor 20 is illustratively operable at step 1606 to associate the CUSTID code only with the stored value(s) of EPI, FGT and/or CI.

Following step 1606, the process 1600 advances to step 1608 where the processor 20 is operable to transmit the generated CUSTID code to the customer, e.g., via email, or to the customer's mobile electronic device, e.g., via a short message service (sms) or other wireless communication technique or protocol. Alternatively, the processor 20 may make the CUSTID code available to the customer via the customer's EMS account. In any case, outside of the process 1600 controlled by the processor 50, the customer loads the CUSTID code into the CUSTID generation module 520, 620 on the customer's mobile electronic device, or into the customer's mobile electronic device for subsequent transfer by the CUSTID generation module 520, 620 to the customer/fuel dispenser identification module 522, 622, as illustrated in FIG. 6A by the process step A. In one embodiment, the CUSTID generation module 520, 620 includes conventional software which guides the customer in transferring the generated CUSTID code from the customer's email or sms into the customer/fuel dispenser identification module 522, 622, and in other embodiments the CUSTID generation module 520, 620 includes conventional software that automatically transfers the generated CUSTID code into the customer's mobile electronic device from the customer's EMS account or other location. In any case, following completion of step 1608, the process 1600 returns to the process 1500 illustrated in FIG. 15.

Referring now to FIG. 16B, a simplified flow diagram is shown of another embodiment of a process 1650 for executing the CUSTID code generation process identified at step 1522 of the process 1500 illustrated in FIG. 15. Illustratively, the process 1650 may be used in addition to or in place of the CUSTID generation process 1600 illustrated in FIG. 16A. In the embodiment illustrated in FIG. 16B, the CUSTID generation process 1650 is an interactive process that takes place between the processor 20 of the server 12 and the processor 300, 400 of a customer's mobile electronic device (e.g., the customer's mobile communication device 80 or the customer's vehicle communication device 90), and which is therefore executed, in-part, by the processor 20 and, in-part, by the processor 300, 400. In this regard, the process 1650 is illustratively one that is stored, in one embodiment, in-part in the memory 24 (and/or data storage 26) of the main server 12 in the form of instructions executable by the processor 20 of the main server 12 and in-part in the memory 304, 404 or data storage 306, 406 of customer mobile electronic device(s) in the form of instructions executable by the processor 300, 400 of the mobile electronic device(s), and the process steps of the process 1650 will thus be described below for purposes of this disclosure as being executed in part by the processor 20 of the main server 12 and in part by the processor 300, 400 of the mobile electronic device(s). It will be understood, however, that in some alternate embodiments, the part of the process 1650 executed by the processor 20 of the main server 12 may be alternatively stored, in whole or in part, in the memory 44 (and/or data storage 46) of the one or more of the local servers $16_1$-$16_K$ in the form of instructions executable, in whole or in part, by the processor 40 of one or more of the local servers $16_1$-$16_K$, and in other embodiments this part of the process 1650 may be stored, in whole or in part, in the memory 64 (and/or data storage 66) of the one or more of the fuel dispensers $18_1$-$18_N$, $18_1$-$18_M$ in the form of instructions executable, in whole or in part, by the processor 60 of one or more of the one or more of the fuel dispensers. In any such embodiments, the part of the process 1650 indicated in FIG. 16B as being executed by the main server 12 may be executed in whole or in part by one or more processors within any one or a combination of the main server 12, any of the one or more local servers $16_1$-$16_K$ and any of the one or more of the fuel dispensers $18_1$-$18_N$, $18_1$-$18_M$, wherein information may be shared between the such systems via wired and/or wireless connection.

In the embodiment illustrated in FIG. 16B, as with that illustrated in FIG. 16A, the CUSTID code is illustratively generated in a form that will be stored in, or accessed by, the customer's mobile electronic device, e.g., the customer's mobile communication device 80 and/or the customer's vehicle communication device 90. As described hereinabove with respect to FIG. 16A, the CUSTID code stored in or accessed by the customer's mobile electronic device will then be automatically transferred from the mobile electronic device to the main server 12 during transactions for the purchase of fuel from the retail enterprise 11 via one of the fuel dispensers $18_1$-$18_N$, $18_1$-$18_M$ in which an authorized EPS is to be automatically processed by the main server 12.

The process 1650 illustrated in FIG. 16B begins at step 1652 where the processor 20 of the main server 12 is operable to generate and include for display on the accessed customer's page of the EMS interface, or as a new page for display on the accessed customer's page of the EMS interface, a graphic user interface (GUI) prompting the customer to activate the software application contained in the CUSTID generation module 520, 620 on the customer's mobile electronic device. If the customer has not already activated the CUSTID generation software application on the customer's mobile electronic device, the customer does so at step 1654 in response to the prompt at step 1652.

Following step 1652, the processor 20 is operable at step 1656 to generate and display code, e.g., a random, pseudo-random or other code, RC, and to instruct the customer to enter RC into a corresponding screen or field displayed or accessible on the customer's mobile electronic device as part of the CUSTID generation software application. Thereafter at step 1658, the customer is responsive to the instructions at step 1656 to enter the code, RC, into the corresponding field or screen displayed on the customer's mobile electronic device, and the processor 300, 400 of the mobile electronic device is thereafter responsive at step 1660 to such customer entry of the code, RC, to transmit the code, RC, and one or more additional data to the main server 12, which transmission is thereafter received by the processor 20 at step 1662. The steps 1656-1660 are illustratively included in the process 1650 to establish communication between the processor 20 and the processor 300, 400, and to further establish the identity of the mobile electronic device with which the processor 20 is communicating. In this regard, the one or more additional data which may accompany the code, RC, transmitted by the customer's mobile electronic device at step 1660 may be or include any information which establishes the identity of the customer within the EMS program and/or the identity of the mobile electronic device as one that is associated with the customer within the EMS program. Examples of such data may include, but are not limited to, one or more of the customer's EMSID, the customer's email address, the communication code, e.g., cellular telephone number or other communication identifier, of the customer's mobile electronic device with which the processor 20 is communicating, and the like.

Following receipt of the code, RC, (and, in some embodiments, any additional data) from the mobile electronic device at step 1662, the processor 20 is operable at step 1664 to generate a CUSTID code and to transmit the generated CUSTID code to the mobile electronic device. After receipt by the mobile electronic device at step 1666 of the generated CUSTID code transmitted by the processor 20, the processor 300, 400 of the mobile electronic device is operable at step 1668 to store the CUSTID code in the memory 304, 404 or data storage 306, 406, and/or in one or more off-board but otherwise accessible memories, for subsequent recall in a conventional manner. In the meantime, the processor 20 of the main server 12 is operable following step 1664 to locate within the customer's EMS account, at step 1670, the customer's EMSID and/or EPI of the authorized EPS and/or FGT and/or CI, and thereafter at step 1672 to store the generated CUSTID code in memory and associate the generated CUSTID code with the customer's EMSID and/or the EPI and/or the FGT and/or the CI.

In one embodiment, the generated CUSTID code is stored by the processor 20 in the customer account data 804 of the database 802. In alternate embodiments, the CUSTID code may be stored, in whole or in part, elsewhere in one or more other databases or memory units within or outside of the system 10. The association between the CUSTID code and the customer's EMSID and/or the EPI of the authorized EPS and/or the FGT and/or the CI may likewise be stored in the customer account data 804 of the database 802, although such association may in alternate embodiments be stored, in whole or in part, elsewhere in one or more other databases or memory units within or outside of the system 10. The CUSTID code itself may also be stored in the same database as the EPI and/or EMSID and/or FGT and/or CI, or may alternatively be stored, in whole or in part, in one or more other databases or memory units within our outside of the system 10. In any case, the processor 20 is illustratively operable to execute step 1672 using any one or more conventional data association mechanisms, examples of which include, but are not limited to, a table, a chart, a linked list or other pointer, or the like.

It will be understood that the CUSTID code described above with respect to the processes 1600 and 1650 may be or include one or more combined codes or sequences of codes or may alternatively be or include a plurality of separate codes or sequences of codes. In some embodiments, for example, the CUSTID code may be generated and stored as a single sequence of bits or characters, while in other embodiments the CUSTID code may be generated and stored in the form of two or more distinct and separate sequences of bits or characters. In one specific example, which should not be considered to be limiting in any way, the CUSTID code may be generated as a first sequence of bits that is or is a function of the customer's EMSID and a second, separate sequence of bits in the form of a security code that may or may not be a function of information relating to the customer, the customer's EMS account and/or the customer's mobile electronic device. As will be described in greater detail below, the customer's mobile electronic device may wirelessly transmit any such CUSTID code to the main server 12 as a single code as part of a single transmission, as a single code broken up into multiple transmissions, as multiple codes transmitted in a single transmission or as multiple codes each transmitted in separate, multiple transmissions. Moreover, in any such multiple transmissions of the CUSTID code, the customer's mobile electronic device may be operable to execute such multiple transmissions without interruption by or data requests by the processor 20 of the main server 12. In some alternative embodiments, the customer's mobile electronic device and the processor 20 may be operable to accomplish the multiple transmissions with the customer's mobile electronic device executing one or more of the multiple transmissions in response to one or more requests transmitted by the processor 20 to the customer's mobile electronic device. In other alternative embodiments, the customer's mobile electronic device and the processor 20 may be operable to accomplish the multiple transmissions with the customer's mobile electronic device executing one or more of the multiple transmissions in response to one or more acknowledgements transmitted by the processor 20 to the customer's mobile electronic device of one or more data transmission notifications previously transmitted by the customer's mobile electronic device.

Referring now to FIG. 17, a simplified flow diagram is shown depicting another embodiment of a process 1700 for wirelessly activating one of the electromechanical fuel dispensers illustrated in FIG. 1 and for carrying out the subsequent fuel dispensation process through completion. As indicated by the framework of the process 1700 illustrated in FIG. 17, a portion of the process 1700, i.e., the portion to the left of the left-most vertical line and centered under the heading "MDC/VCD," represents one or more software applications executed by a processor (e.g., processor 300 or 400) of a mobile electronic device (e.g., the mobile communication device 80 and/or vehicle communication device 90 respectively). In one embodiment, as will be described in greater detail below, part of this portion of the process 1700 is illustratively contained in the fuel dispenser activation module 502 and part is contained in the customer/fuel dispenser identification module 530, both stored in the memory 304 (and/or data storage 306) of the mobile communication device 80 in the form of instructions executable by the processor 300 of the mobile communication device 80, and the process steps of this portion of the process 1700 will be described below for purposes of this disclosure as being executed by the processor 300 of the mobile communication device 80. It will be understood, however, that in some alternate embodiments, part of this portion of the process 1700 may be alternatively contained in the fuel dispenser activation module 602 and part contained in the customer/fuel dispenser identification module 630, both of which may be stored in the memory 404 (and/or data storage 406) of the vehicle communication device 90 in the form of instructions executable by the processor 400 of the vehicle communication device 90. In still other alternate embodiments, part of this portion of the process 1700 may alternatively still be contained in the fuel dispenser activation module 502, part may be contained in the fuel dispenser activation module 602, part may be contained in the customer/fuel dispenser identification module 530, and/or part may be contained in the customer/fuel dispenser identification module 630, all of which may be stored in the memory 304 (and/or data storage 306) of the mobile communication device 80 in the form of instructions executable, in part, by the processor 300 of the mobile communication device 80 and/or in the memory 404 (and/or data storage 406) of the vehicle communication device 90 in the form of instructions executable, in part, by the processor 400 of the vehicle communication device 90.

Another portion of the process 1700, i.e., the portion between the two vertical lines and centered under the heading "Fuel Dispenser" represents the remote activation module software application 252 that is executable by the processor 60 of each of the plurality of fuel dispensers $\mathbf{18}_1$-$\mathbf{18}_N$, $\mathbf{18}_1$-$\mathbf{18}_M$ and/or the remote activation module software application 722 that is executable by the processor 40 of each of the local servers $\mathbf{16}_1$-$\mathbf{16}_K$. In one embodiment, this portion of the process 1700 is illustratively stored in the memory 64 (and/or data storage 66) of the fuel dispensers $\mathbf{18}_1$-$\mathbf{18}_N$, $\mathbf{18}_1$-$\mathbf{18}_M$ in the form of instructions executable by the processor 60 of the fuel dispensers $\mathbf{18}_1$-$\mathbf{18}_N$, $\mathbf{18}_1$-$\mathbf{18}_M$, and the process steps of this portion of the process 1700 will be described below for purposes of this disclosure as being executed by the processor 60 of the fuel dispensers $\mathbf{18}_1$-$\mathbf{18}_N$, $\mathbf{18}_1$-$\mathbf{18}_M$. It will be understood, however, that in some alternate embodiments, this portion of the process 1700 may be stored in the memory 44 (and/or data storage 46) of the local servers $\mathbf{16}_1$-$\mathbf{16}_K$, in the form of instructions executable by the processor 40 of the local servers $\mathbf{16}_1$-$\mathbf{16}_K$ (or stored in the memory 24 and/or data storage 26 of the main server 12 in the form of instructions executed by the processor 20 of the main server 12, in embodiments that do not include the local servers $\mathbf{16}_1$-$\mathbf{16}_K$). In still other alternate embodiments, this portion of the process 1700 may be stored, in whole or in part, in the memory 64 (and/or data storage 66) of the fuel dispensers $18_1$-$18_N$, $18_1$-$18_M$ in the form of instructions executable, in part, by the processor 60 of the fuel dispensers $18_1$-$18_N$, $18_1$-$18_M$ and in part by the processor 40 of a corresponding one of the local servers $16_1$-$16_K$, or stored, in whole or in part, in the memory 44 (and/or data storage 46) of the local servers $16_1$-$16_K$ in the form of instructions executable, in part, by the processor 40 of the local servers $16_1$-$16_K$ and in part by the processor 60 of a corresponding one of the fuel dispensers $18_1$-$18_N$, $18_1$-$18_M$.

Yet another portion of the process 1700, i.e., the portion to the right of the right-most vertical line and centered under the heading "Main Server," partly represents the remote controlled fueling module software application 842 and partly represents software application(s) in one or more of the modules 846-842 illustrated in FIG. 14B, all executable by the processor 20 of the main server 12. In one embodiment, this portion of the process 1700 is illustratively stored in the memory 24 (and/or data storage 26) of the main server 12 in the form of instructions executable by the processor 20 of the main server 12, and the process steps of this portion of the process 1700 will be described below for purposes of this disclosure as being executed by the processor 20 of the main server. It will be understood, however, that in some alternate embodiments that do not include a main server 12, this portion of the process 1700 may be stored in the memory 44 (and/or data storage 46) of one or more of the local servers $16_1$-$16_K$ in the form of instructions executable by the processor 40 of the one or more local servers $16_1$-$16_K$.

It will further be understood that portions of the process 1700 illustrated as being executed by one processor/device or one processor/server may alternatively be executed by a different processor/device or processor/server in the system 10, some examples of which are described above.

The process 1700 begins at step 1702 in which the customer and fuel dispenser from which the customer desires to dispense fuel are identified by or for the main server 12. In the embodiment illustrated in FIG. 17, step 1702 may include step 1704 associated with the fuel dispensers $18_1$-$18_N$, $18_1$-$18_M$, step 1705 associated with the mobile electronic devices (e.g., mobile communication devices 80 and/or vehicle communication devices 90) and step 1706 associated with the main server 12. In some embodiments, step 1702 includes all of the steps 1704-1706, and in other embodiments step 1702 may include only steps 1705 and 1706. In any case, execution of step 1702 illustratively produces at least an identification of the customer-member of the EMS program that seeks to dispense fuel from one of the fuel dispensers $18_1$-$18_N$, $18_1$-$18_M$, and an identification of the one of the fuel dispensers $18_1$-$18_N$, $18_1$-$18_M$ from which the identified customer-member wishes to dispense fuel. In some embodiments, the identification of the customer-member may be or include an identification of at least the customer's EMSID or communication information (CI), and the processor 20 of the main server 12 may then obtain other customer-related information by searching the database 802 and/or one or more other databases for customer-related information associated therewith, i.e., linked thereto. In other embodiments, the identification of the customer-member may additionally include receipt by the processor 20 of a security code, e.g., in the form of or as part of the CUSTID code, which the processor 20 of the main server 12 then subsequently validates or authenticates in order to gain access to the customer-member's stored EPS/EPI data for the purpose of authorizing, and then subsequently processing, the customer's stored EPI in payment for fuel to be dispensed by the customer-member from the identified fuel dispenser $18_1$-$18_N$, $18_1$-$18_M$.

Referring now to FIG. 18, a simplified flow diagram is shown of one embodiment of a process 1800 for executing the process step 1702 illustrated in FIG. 17 in which the customer and fuel dispenser $18_1$-$18_N$, $18_1$-$18_M$ from which the customer desires to dispense fuel are identified based, at least in part, on detection and processing of wireless signals broadcast by one or more wireless signal broadcasting devices, e.g., beacons, 224 located in, on, at or near each of the fuel dispensers $18_1$-$18_N$, $18_1$-$18_M$. In the embodiment illustrated in FIG. 18, such customer and fuel dispenser identification illustratively occurs automatically, i.e., without intervention or input required by the customer. In the illustrated embodiment, the process 1800 is illustratively executed in part by the processor 20 of the main server 12 and in part by the processor 300, 400 of the customer's mobile electronic device, and in this regard part of the process 1800 is illustratively stored in the memory 24 (and/or data storage 26) of the main server 12 in the form of instructions executable by the processor 20 of the main server 12, and part is illustratively stored in the memory 304 (and/or data storage 306) of the customer's mobile communication device 80 in the form of instructions executable by the processor 300 of the customer's mobile communication device 80 or in the memory 404 (and/or data storage 406) of the customer's vehicle communication device 90 in the form of instructions executable by the processor 400 of the customer's vehicle communication device 90. It will be understood, however, that in some alternate embodiments the part of the process 1800 just described as being stored in the main server 12 and executed by the processor 20 may be alternatively stored, in whole or in part, in the memory 44 (and/or data storage 46) of the one or more of the local servers $16_1$-$16_K$ in the form of instructions executable, in whole or in part, by the processor 40 of one or more of the local servers $16_1$-$16_K$, or stored, in whole or in part, in the memory 64 (and/or data storage 66) of the one or more of the fuel dispensers $18_1$-$18_N$, $18_1$-$18_M$ in the form of instructions executable, in whole or in part, by the processor 60 of one or more of the one or more of the fuel dispensers $18_1$-$18_N$, $18_1$-$18_M$. In any such embodiments, this portion of the process 1800 may be executed in whole or in part by one or more processors within any one or a combination of the main server 12, any of the one or more local servers $16_1$-$16_K$ and any of the one or more of the fuel dispensers $18_1$-$18_N$, $18_1$-$18_M$, wherein information may be shared between the such systems via wired and/or wireless connection.

The process 1800 illustratively begins at step 1802 where each of the beacons 224 associated with, i.e., positioned at, near, in, on or part of, a corresponding one of the various fuel dispensers $18_1$-$18_N$, $18_1$-$18_M$ periodically and continually broadcast one or more unique wireless identification signals, i.e., identification signals that distinguish that particular beacon 224 from beacons 224 associated with other co-located fuel dispensers $18_1$-$18_N$, $18_1$-$18_M$, e.g., other fuel dispensers 18 located at the same fuel center 52, and illustratively also from one or more beacons 710 associated with the fuel center 52. In some embodiments, the unique signals broadcast by each beacon 224 further distinguishes that beacon 224 from other beacons 224 located at other fuel centers $52_1$-$52_K$ controlled by the retail enterprise. In some embodiments, one or more of the beacons 224 may broadcast the unique wireless identification signals non-periodically, and/or may broadcast unique wireless identification signals non-continually but rather only upon detection of a nearby customer electronic device, e.g., via detection by the communication circuitry 68 of the corresponding fuel dispenser 18 of one or more short-range wireless signals produced by the customer electronic device, via proximity detection of the customer and/or vehicle 76 using a suitable proximity sensor included in the sensors 428 of the corresponding fuel dispenser 18, or the like. In any case, at some point while the beacon(s) 224 is/are broadcasting the one or more unique wireless signals, the customer, carrying the customer's the mobile communication device 80 or approaching in a vehicle carrying the vehicle communication device 90, approaches one of the fuel dispensers $\mathbf{18}_1$-$\mathbf{18}_N$, $\mathbf{18}_1$-$\mathbf{18}_M$ for the purpose of commencing a fuel purchase transaction. This scenario is depicted in FIG. 19 which illustrates one such beacon 224, mounted to, in, on or near the fuel dispenser 18, periodically broadcasting unique wireless signals which are represented in FIG. 19 by the semi-circular dashed lines emanating outwardly from the beacon 224.

The fuel dispenser 18 is communicatively coupled to the main server 12 via the private network 14 and, in the illustrated embodiment, via one of the local hub servers 16. In the embodiment illustrated in FIG. 19, the fuel dispenser 18 and the fuel center 52 at which the local hub server 16 is illustratively located are those at which the current fuel purchase transaction is to be conducted. The customer's mobile electronic device 80, 90 and the main server 12 are each illustratively configured to communicate wirelessly with each other via the public network 1202. In some embodiments, one or more of the fuel centers $\mathbf{52}_1$-$\mathbf{52}_K$ may illustratively implement one or more local or wide area networks for the purpose of providing or enhancing communication access by mobile electronic devices 80, 90 to the public network 1202 in and around the vicinity of the fuel centers $\mathbf{52}_1$-$\mathbf{52}_K$. In any case, as the customer's mobile electronic device 80, 90 approaches the fuel dispenser 18 the customer's mobile electronic device 80, 90 enters the broadcast range of the beacon 222 as depicted in FIG. 19. When within the broadcast range of the beacon 224, the mobile electronic device 80, 90 is able to detect the unique identification signals being periodically (or non-periodically) broadcast by the beacon 224. Illustratively, the broadcast range of the beacon is sufficiently large, wide and/or oriented to be detected by customers' mobile electronic devices 80, 90 during the normal approach to the fuel dispenser 18 by vehicle 76 and/or by foot, while is at the same time sufficiently small, narrow and/or oriented so as not to be detected by mobile electronic devices 80, 90 of customers being processed by one or more adjacent fuel dispensers $\mathbf{18}_1$-$\mathbf{18}_N$, $\mathbf{18}_1$-$\mathbf{18}_M$.

Figure 19:
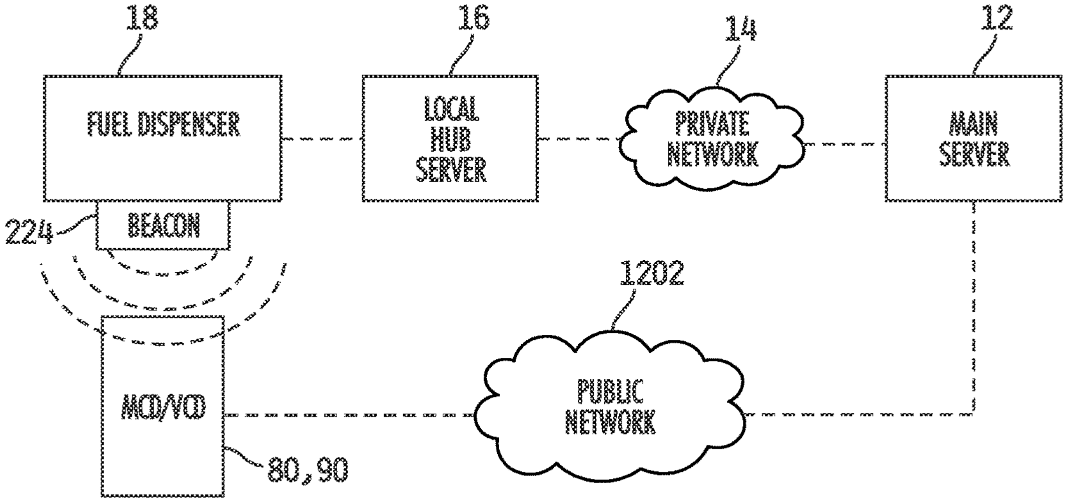
FIG. 19 is a simplified diagram illustrating an embodiment of a communications framework for detecting by either or both of a mobile communication device and a vehicle communication device of wireless signals produced by a beacon associated with a fuel dispenser and for conducting wireless communications relating thereto between the mobile or vehicle communication device and the main server of the retail enterprise.

Referring again to FIG. 18, the customer's mobile electronic device 80, 90 is operable at step 1804 to detect the unique identification signals wirelessly broadcast by the beacon 224 associated with one of the fuel dispensers $\mathbf{18}_1$-$\mathbf{18}_N$, $\mathbf{18}_1$-$\mathbf{18}_M$ when the customer's mobile electronic device 80, 90 is within the broadcast range of the beacon 224 as illustrated by example in FIG. 19. Thereafter at step 1806, the processor 300, 400 of the customer's mobile electronic device 80, 90 is illustratively responsive to such detection of the unique identification signals broadcast by the beacon 224 to wake up and activate the customer/fuel dispenser identification module 530, 630 stored in the memory 304, 404 or data storage 306, 406 of the mobile electronic device 80, 90 (or stored in off-board storage that is accessible to the mobile electronic device 80, 90). For the remainder of the process 1800, the processor 300, 400 of the customer's mobile electronic device 80, 90 is operable to execute the device's 80, 90 portion of the process 1800 according to the software application contained in the customer/fuel dispenser identification module 530, 630, i.e., the processor 300, 400 of the customer's mobile electronic device 80, 90 is operable to execute the instructions contained in the customer/fuel dispenser identification module 530, 630 to execute the remainder of the process 1800.

Following step 1806, the process 1800 advances, in one embodiment of the process 1800, to step 1808 where the processor 300, 400 of the customer's mobile electronic device 80, 90 is operable to transmit one or more wireless signals to the main server 12, e.g., to control the communication circuitry in the device 80, 90 to wirelessly transmit one or more signals to the main server 12 via the public network 1202 as illustrated in FIG. 19. The one or more wireless signals contain(s) the unique identification (UID) of the beacon 224 that wirelessly broadcast the signals detected by the mobile electronic device 80, 90, and also illustratively contain(s) an identification of the customer's mobile electronic device 80, 90. The identification of the customer's mobile electronic device 80, 90 may be, for example, the communication information (CI), e.g., cellular telephone number and/or other communication identifier, which identifies the customer's mobile electronic device 80, 90 to the main server 12 for the purpose of communicating information from the main server 12 back to the customer's mobile electronic device 80, 90. In one embodiment, the processor 300, 400 of the customer's mobile electronic device 80, 90 is operable at step 1808 to process one or more of the unique identification signals wirelessly broadcast, e.g., periodically, by the beacon 224 and detected by the customer's mobile electronic device 80, 90 to determine therefrom the UID of the beacon 224 and to include the UID of the beacon 224 in the one or more wireless signals transmitted by the mobile electronic device 80, 90 to the main server at step 1808. In other embodiments, the processor 30, 400 is operable at step 1808 to process one or more of the unique identification signals wirelessly broadcast, e.g., periodically, by the beacon 224 and detected by the customer's mobile electronic device 80, 90 to include in the UID transmitted by the mobile electronic device 80, 90 to the main server at step 1808 only the raw signal content of one or more of the unique identification signals broadcast by the beacon 224. In such embodiments, the processor 20 of the main server 12 may be operable to thereafter process the raw signal content transmitted thereto by the customer's mobile electronic device 80, 90 to determine therefrom the UID of the beacon 224.

Following step 1808, the main server 12 is operable at step 1810 to receive the one or more wireless signals transmitted by the customer's mobile electronic device 80, 90 at step 1808, and the processor 20 is operable at step 1810 to process the UID contained therein to determine the corresponding one of the fuel dispensers $\mathbf{18}_1$-$\mathbf{18}_N$, $\mathbf{18}_1$-$\mathbf{18}_M$ with which the beacon 224 detected by the customer's mobile electronic device 80, 90 is associated, i.e., at which the beacon 224 is located. As described briefly above with respect to FIG. 14A, the fuel center/dispenser location data 816 in the database 802' of the main server 12 illustratively has stored therein the beacon identity information for each beacon 224 in the retail enterprise as well as additional information from which the processor 20 can determine and identify, for each beacon 224 located at one of the fuel dispensers $\mathbf{18}_1$-$\mathbf{18}_N$, $\mathbf{18}_1$-$\mathbf{18}_M$, the particular fuel dispenser $\mathbf{18}_1$-$\mathbf{18}_N$, $\mathbf{18}_1$-$\mathbf{18}_M$ at which each such beacon 224 is located. In one embodiment, for example, the beacon identity information is or includes the UIDs for each beacon 224 located at one of the fuel dispensers $\mathbf{18}_1$-$\mathbf{18}_N$, $\mathbf{18}_1$-$\mathbf{18}_M$, and each such UID includes or is associated with, e.g., linked to, mapped to, or otherwise identified with, a fuel dispenser identifier (FDID), e.g., in the form of a designation number or code, which identifies the corresponding one of the fuel dispensers $18_1$-$18_N$, $18_1$-$18_M$ at which the beacon 224 is located. In such embodiments, the processor 20 is illustratively operable at step 1810 to process the UID by searching for a matching UID stored in the fuel center/dispenser location data 816 and determining the FDID associated in the database 816 with the matched UID to determine the identity of the corresponding one of the fuel dispenser $18_1$-$18_N$, $18_1$-$18_M$ to which the detected beacon 224 is mounted to, in, on or near.

In other embodiments, the UID of each beacon 224 located at one of the fuel dispensers $18_1$-$18_N$, $18_1$-$18_M$ is associated in the database 816 with a unique beacon location (UBL). In such embodiments, the unique beacon locations, UBL, are stored in the database 816 and associated in the database 816 with, e.g., linked to, mapped to or otherwise identified with, the UID of a corresponding beacon 224. In one embodiment, the unique beacon locations, UBL, may illustratively include, or be mapped to, location coordinates relative to one or more sets of base coordinates of a corresponding one of the fuel centers $52_1$-$52_K$ of the retail enterprise. In such embodiments, the locations of each of the fuel dispensers $18_1$-$18_N$, $18_1$-$18_M$ of the retail enterprise may likewise be stored in the database 816 also in the form of location coordinates relative to the one or more sets of base coordinates of the corresponding fuel centers $52_1$-$52_K$. In such embodiments, the processor 20 is illustratively operable at step 1810 to process the UID by searching for a matching UID stored in the database 816 and comparing the location coordinates associated with the matched UID with those of the fuel dispensers $18_1$-$18_N$, $18_1$-$18_M$ stored in the database 816 to determine the identity of the corresponding one of the fuel dispensers $18_1$-$18_N$, $18_1$-$18_M$ to which the detected beacon 224 is mounted to, in, on or near.

In either of the foregoing embodiments, the UID contained in the wireless signals broadcast by the beacons 224 may further include a beacon type (BT), and the beacon identity information stored in the database 816 may likewise include, or be mapped to, corresponding beacon type information. Illustratively, the beacon identity information of the various beacons 224 stored in the database 816 may, in such embodiments, be stored according to beacon type, e.g., such that the beacon identity information stored in the database 816 is or can be categorized by beacon type. The beacon type may illustratively be or include an indicator of the general location or use of the beacon 224, and example beacon types may include, but should not be limited to, fuel dispenser beacons, fuel center beacons, point-of-sale beacons, brick-and-mortar location entrance beacons, beacons associated with specific departments or product category locations within the retail enterprise, general store location beacons, or the like. In such embodiments, the processor 20 is illustratively operable at step 1810 to process the UID received from the customer's mobile electronic device 80, 90 by first determining the beacon type, BT, of the beacon 224 detected by the customer's mobile electronic device 80, 90, e.g., from the BT included in or appended to the UID received from the customer's mobile electronic device 80, 90, then searching for a matching UID stored in the database 816 only among the stored beacon identity information having beacon types that match BT, and then proceeding as described above with respect to a matched UID. Those skilled in the art will recognize additional or alternative information that may be included in, with and/or appended to the UID, and/or additional or alternative information about the retail location and the infrastructure of its various fuel centers $52_1$-$52_K$ that may be collected and stored or otherwise be made accessible to the main server 12, which the processor 20 of the main server 12 may be configured and operable to process at step 1810 to determine the identity and/or location of fuel dispensers detected by and identified to the main server 12 by the customer's mobile electronic device 80, 90. It will be understood that any such additional or alternate forms of information are contemplated by this disclosure.

Further at step 1810, the processor 20 of the main server is operable to process the communication information included in or with the wireless signal(s) transmitted by the customer's mobile electronic device 80, 90 at step 1808 to determine the identity of the customer's mobile electronic device 80, 90 for purposes of wirelessly transmitting information thereto, e.g., via the public network 1202.

Following step 1810, the processor 20 of the main server 12 is operable at step 1812 to determine whether a matching UID was found, e.g., in the database 816, at step 1810. Generally, if the processor 20 is unable to locate a matching UID at step 1810, this means that the beacon 224 detected by the customer's mobile electronic device 80, 90 is not associated with any of the fuel dispensers $18_1$-$18_N$, $18_1$-$18_M$ of the retail enterprise, i.e., is not a fuel dispenser beacon 224, or that there were one or more errors in receiving, processing and/or transmitting one or more wireless signals by the customer's $18_1$-$18_N$, $18_1$-$18_M$, the main server 12 and/or the network 1202. It will be understood that the process 1800 may be modified to include one or more conventional diagnostic processes for processing and addressing any such one or more errors, including for example re-executing one or more of the steps 1802-1810, and that any such modifications are contemplated by this disclosure. Those skilled in the art will recognize that any such modifications to the process 1800 would be a mechanical step for a skilled software programmer. If the processor 20 determines at step 1812 that the beacon 224 detected by the customer's mobile electronic device 80, 90 is not associated with any of the fuel dispensers $18_1$-$18_N$, $18_1$-$18_M$ of the retail enterprise, the process 1800 follows the NO branch of step 1812 and terminates without returning any information which would allow the process 1700 illustrated in FIG. 17 to execute its remaining steps.

If, at step 1812, the processor 20 of the main server 12 determines that the beacon 224 detected by the customer's mobile electronic device 80, 90 is associated with an identified one of the fuel dispensers $18_1$-$18_N$, $18_1$-$18_M$ of the retail enterprise, the process 1800 advances to step 1814 where the processor 20 of the main server 12 is operable to transmit a CUSTID request signal back to the customer's mobile electronic device 80, 90, i.e., back to a communication recipient address, number or code of the customer's mobile electronic device 80, 90 identified by the processor 20 based on the communication code included in or with the wireless signal(s) transmitted by the customer's mobile electronic device 80, 90 at step 1808. Illustratively, the CUSTID request signal is or contains a request or instruction by the processor 20 to the customer's mobile electronic device 80, 90 to transmit the CUSTID code stored therein or accessible thereto, e.g., created according to the process 1600 and/or 1650 illustrated and described with respect to FIGS. 16A and 16B respectively. At step 1816, the customer's mobile electronic device 80, 90 receives the CUSTID request signal, and thereafter at step 1818 the processor 300, 400 of the customer's mobile electronic device 80, 90 is operable to access the CUSTID code stored therein or otherwise accessible thereto, and to transmit the CUSTID code to the main server 12.

In some embodiments, the process steps 1808-1818 just described may be replaced by step 1820, as shown in dashed outline, to which the process 1800 advances following execution of step 1806 (in which the processor 300, 400 of the mobile electronic device 80, 90 has awoken and activated the customer/fuel dispenser identification module 530, 630 in response to detection of one or more unique identification signals broadcast by the beacon 224). In some such embodiments, the memory 304, 404 and/or data storage 306, 404 of the customer's mobile electronic device 80, 90 illustratively has beacon information stored therein, as part of the customer/fuel dispenser identification module 530, 630, which relates to some or each of the various beacons in or at one or more of the fuel centers $52_1$-$52_K$ of the retail enterprise. In one embodiment in which the UID includes or has appended thereto a beacon type, BT, the beacon information stored in the customer's mobile electronic device 80, 90 illustratively is or includes beacon type information which identifies different beacon types, e.g., fuel dispenser beacons, fuel center beacons, etc. as described above. In such embodiments, the processor 300, 400 is operable at step 1822 to process the unique identification signals broadcast by the beacon 224 to determine the UID of the beacon 224, to then process the UID to determine the beacon type, BT, of the beacon 224, and to then compare BT to the stored beacon information to determine whether the beacon 224 is a fuel dispenser beacon. If so, the processor 300, 400 is operable at step 1824 to access the CUSTID code stored therein or otherwise accessible thereto, and to then transmit the CUSTID code and the UID of the beacon 224 to the main server 12. Otherwise, the process 1800 terminates without returning any information which would allow the process 1700 illustrated in FIG. 17 to execute its remaining steps, as shown by the dashed line extending from step 1820 to DONE in FIG. 18.

In other embodiments that include step 1820, the beacon information stored in the customer's mobile electronic device 80, 90 illustratively is or includes information that links, maps or otherwise associates beacon UIDs of at least the beacons 224 at some or all of the fuel centers $52_1$-$52_K$ of the retail enterprise to identifiers of the fuel dispensers $18_1$-$18_N$, $18_1$-$18_M$ at which they are located, e.g., FDIDs. In such embodiments, the processor 300, 400 is operable at step 1822 to process the unique identification signals broadcast by the beacon 224 to determine the UID of the beacon 224, and to then compare the UID to the stored beacon information to identify the FDID of the particular one of the fuel dispensers $18_1$-$18_N$, $18_1$-$18_M$ at which the beacon 224 is located. If the comparison made by the processor 300, 400 at step 1822 produces a valid FDID, the processor 300, 400 is thereafter operable at step 1824 to access the CUSTID code stored therein or otherwise accessible thereto, and to then transmit the CUSTID code along with the FDID to the main server 12. If the comparison made by the processor 300, 400 at step 1822 does not produce a FDID, or in some embodiments a valid FDID, the process 300, 400 terminates without returning any information which would allow the process 1700 illustrated in FIG. 17 to execute its remaining steps, as shown by the dashed line extending from step 1820 to DONE in FIG. 18.

In still other embodiments that include step 1820, the beacon information acted upon by the processor 300, 400 of the customer's mobile electronic device 80, 90 at step 1822 is not stored in the memory 304, 404 and/or data storage 306, 404, but is rather stored elsewhere or transmitted to or otherwise made accessible to the customer's mobile electronic device 80, 90 by the main server 12 according to a fuel center identification process that is triggered by activation of the software application in the customer/fuel dispenser identification module 530, 630 in response to detection of one or more unique identification signals broadcast by the beacon 224 at step 1804. In such embodiments, the fuel center identification process is illustratively an interactive process between the processor 300, 400 of the customer's mobile electronic device 80, 90 and the processor 20 of the main server in which the processor 300, 400 of the customer's mobile electronic device 80, 90 is operable upon activation of the software application stored in the customer/fuel dispenser identification module 530, 630 to transmit a location identification signal to the main server 12 indicative of a current location of the customer's mobile electronic device 80, 90. In one embodiment, the location signal includes the current or most recent GPS coordinates of the customer's mobile electronic device 80, 90, and the processor 20 of the main server 12 is operable to identify the specific one of the fuel centers $52_1$-$52_K$ of the retail enterprise at which the customer's mobile electronic device 80, 90 is currently located, e.g., by comparing such coordinates to known coordinates of the various fuel centers $52_1$-$52_K$ of the retail enterprise that are stored in the database 816 or other database. In other embodiments, the location signal transmitted by the customer's mobile electronic device 80, 90 may not include any specific information relating to the coordinates of the customer's mobile electronic device 80, 90, but may rather include information relating to the identity of the LAN or WAN implemented in the particular fuel center $52_1$-$52_K$ at which the customer's mobile electronic device 80, 90 is currently located and which is used by the customer's mobile electronic device 80, 90 to access the public network 1202 in order to transmit the signal. In such embodiments, the processor 20 of the main server 12 may be operable to process the location signal to determine the specific one of the fuel centers $52_1$-$52_K$ of the retail enterprise at which the customer's mobile electronic device 80, 90 is currently located, e.g., by comparing the information in or carried by the location signal relating to the LAN or WAN used by the customer's mobile electronic device 80, 90 to access the network 1202 with known LAN or WAN information stored in the database 816 or other database to determine the fuel center $52_1$-$52_K$ at which the transmitting LAN or WAN is located. In any case, following identification of the specific fuel center $52_1$-$52_K$ at which the customer's mobile electronic device 80, 90 is currently located, the processor 20 of the main server 12 is operable in one embodiment to transmit to the customer's mobile electronic device 80, 90 the beacon information relating only to the beacons at the identified fuel center $52_1$-$52_K$. In other embodiments, the processor 20 of the main server 12 is operable to provide access by the processor 300, 400 of the customer's mobile electronic device 80, 90 to such beacon information stored in the database 816 (or other database) so that the processor 300, 400 may thereafter process such beacon information as described above.

In any case, the process 1800 advances from step 1818, in embodiments that include steps 1808-1818, or from step 1824 in embodiments that include step 1820, to step 1826 where the processor 20 of the main server 12 is operable to receive the CUSTID code transmitted by the customer's mobile electronic device 80, 90. In some embodiments that include step 1820, the CUSTID code transmitted by the customer's mobile electronic device 80, 90 may be accompanied by the UID of the beacon 224 and in other such embodiments the CUSTID code may be accompanied by the FDID of the particular one of the fuel dispensers $\mathbf{18_1}$-$\mathbf{18_N}$, $\mathbf{18_1}$-$\mathbf{18_M}$ at which the beacon 224 is located. In the former case, the processor 20 of the main server 12 is further operable at step 1826 to process the UID of the beacon 224 to determine the FDID of the particular one of the fuel dispensers $\mathbf{18_1}$-$\mathbf{18_N}$, $\mathbf{18_1}$-$\mathbf{18_M}$ at which the beacon 224 is located, as described hereinabove with respect to step 1810.

Following step 1826, the processor 20 of the main server 12 is operable at step 1828 to determine whether the CUSTID code transmitted to the main server 12 by the customer's mobile electronic device 80, 90 matches a CUSTID code stored in one or more databases, i.e., whether the CUSTID code matches a corresponding CUSTID code of one of the customer-members of the EMS program. The processor 20 is illustratively operable to execute step 1828 of the process 1800 by searching for the CUSTID code in the EMS customer account data 804 in embodiments in which the CUSTID codes are stored in the EMS customer accounts data 804, or in one or more other databases in which CUSTID codes are stored. If a matching CUSTID code is found at step 1828, the process 1800 advances to step 1830 where the processor 20 is operable to identify, in the database 402 or other database, one or more codes or other information that is associated with, e.g., stored with, mapped to or linked to, the matching CUSTID code in the database 802 or other database which the processor 20 may then use to process a transaction for the purchase of fuel to be dispensed from the identified fuel dispenser 18 according to the fuel purchase preferences established by the corresponding customer member of the EMS program (e.g., according to a process such as the process 1500 illustrated in FIG. 15). In one embodiment, the processor 20 is operable at step 1830 to identify the enterprise membership identification, EMSID, as the code associated with the matching CUSTID code, which thus identifies the EMS account of the customer member associated with the mobile electronic device 80, 90. In other embodiments, the processor 20 may be operable at step 1830 to identify one or more other codes or other information associated in the database 802 or other database with the matching CUSTID code, and in such embodiments the processor 20 may use such one or more other codes or other information to identify the EMS account of the customer member and/or to identify specific information associated with the EMS account, e.g., the authorized EPS, etc. In some embodiments, the CUSTID code or some portion thereof may be or include the code identified at step 1830, and in such embodiments the processor 20 need not search the database 802 or other database to determine the identified code. In any case, following step 1830, the process 1800 is complete and the process step 1702 illustrated in FIG. 17 returns the identity of the customer associated with the CUSTID code transmitted to the main server 12 by the customer's mobile electronic device 80, 90, e.g., the EMSID of the customer associated with the mobile electronic device 80, 90, and also returns the identity of the fuel dispenser $\mathbf{18_1}$-$\mathbf{18_N}$, $\mathbf{18_1}$-$\mathbf{18_M}$ at which the beacon 224 is located which broadcast the wireless signals detected by the customer's mobile electronic device 80, 90 at step 1804 of the process 1800. If, at step 1828, the processor 20 determines that none of the one or more databases in which CUSTID codes are stored has stored therein a CUSTID code that matches the CUSTID code transmitted to the main server 12 by the customer's mobile electronic device 80, 90, the process 1800 terminates without returning any information which would allow the process 1700 illustrated in FIG. 17 to execute its remaining steps, as shown by the arrowed line extending from step 1828 to DONE in FIG. 18.

It will be understood that the CUSTID code described above with respect to the process 1800 may be or include one or more combined or separate codes as briefly described above. It will be further understood that while the process 1800 has been described in the context of transmitting, receiving and searching one or more databases for a CUSTID code, nothing in this disclosure is intended to limit such a CUSTID code to a single sequence of bits or characters. In some embodiments, for example, the CUSTID code may be implemented as a single sequence of bits or characters, while in other embodiments the CUSTID code may be implemented in the form of two or more separate, and in some cases separately transmitted and received, sequences of bits or characters. As one specific example of the latter implementation, which should not be considered limiting in any way, the CUSTID code may include a first CUSTID code in the form of, e.g., the customer's EMSID or coded version thereof, and a second CUSTID code in the form of, e.g., a random or otherwise generated security code, which is separate and distinct from the first CUSTID code and which is transmitted and received separately from the first CUSTID code.

In some embodiments, the customer's mobile electronic device 80, 90 may be operable to transmit such multiple CUSTID codes, or to transmit a single CUSTID code in multiple wireless signal transmissions, without interruption by or data requests by the processor 20 of the main server 12. In some alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more requests transmitted by the processor 20 to the customer's mobile electronic device 80, 90. In other alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more acknowledgements transmitted by the processor 20 to the customer's mobile electronic device 80, 90 of one or more data transmission notifications previously transmitted by the customer's mobile electronic device 80, 90.

In any case, it will be further understood that in embodiments in which the CUSTID code, whether in the form of a single transmitted/received signal or multiple, separate transmitted/received signals, includes two or more codes, the processor 20 will be operable at step 1828 to determine whether the CUSTID code transmitted to the main server 12 by the customer's mobile electronic device 80, 90 matches a CUSTID code stored in one or more databases by comparing each such transmitted/received code with codes stored in the database 802 or other database, and that a determination by the processor 20 that the CUSTID code matches a CUSTID code stored in one or more databases requires a match for each code contained in the CUSTID code. As an example in which the CUSTID code includes an EMSID and a security code, a determination by the processor 20 at step 1828 that the CUSTID code transmitted to the main server 12 by the customer's mobile electronic device 80, 90 matches a CUSTID code stored in one or more databases will require a match between the transmitted EMSID and one of the plurality of EMSIDs stored in one or more databases as well as a match between the transmitted security code and a corresponding security code stored in the one or more databases and associated in the one or more databases with the matching EMSID.

Referring now to FIG. 20, a simplified flow diagram is shown of another embodiment of a process 2000 for executing the process step 1702 illustrated in FIG. 17 in which the customer and fuel dispenser $\mathbf{18}_1$-$\mathbf{18}_N$, $\mathbf{18}_1$-$\mathbf{18}_M$ from which the customer desires to dispense fuel are identified via wireless signals transmitted to the main server 12 by the customer's mobile electronic device 80, 90. In some embodiments of the process 2000, such as that illustrated in FIG. 20, such customer and fuel dispenser identification illustratively requires the customer to provide, e.g., to manually enter, information that identifies the fuel dispenser $\mathbf{18}_1$-$\mathbf{18}_N$, $\mathbf{18}_1$-$\mathbf{18}_M$ from which the customer desires to dispense fuel. In the illustrated embodiment, the process 2000 is illustratively executed in part by the processor 20 of the main server 12 and in part by the processor 300, 400 of the customer's mobile electronic device, and in this regard part of the process 2000 is illustratively stored in the memory 24 (and/or data storage 26) of the main server 12 in the form of instructions executable by the processor 20 of the main server 12, and part is illustratively stored in the memory 304 (and/or data storage 306) of the customer's mobile communication device 80 in the form of instructions executable by the processor 300 of the customer's mobile communication device 80 or in the memory 404 (and/or data storage 406) of the customer's vehicle communication device 90 in the form of instructions executable by the processor 400 of the customer's vehicle communication device 90. It will be understood, however, that in some alternate embodiments the part of the process 2000 just described as being stored in the main server 12 and executed by the processor 20 may be alternatively stored, in whole or in part, in the memory 44 (and/or data storage 46) of the one or more of the local servers $\mathbf{16}_1$-$\mathbf{16}_K$ in the form of instructions executable, in whole or in part, by the processor 40 of one or more of the local servers $\mathbf{16}_1$-$\mathbf{16}_K$, or stored, in whole or in part, in the memory 64 (and/or data storage 66) of the one or more of the fuel dispensers $\mathbf{18}_1$-$\mathbf{18}_N$, $\mathbf{18}_1$-$\mathbf{18}_M$ in the form of instructions executable, in whole or in part, by the processor 60 of one or more of the one or more of the fuel dispensers $\mathbf{18}_1$-$\mathbf{18}_N$, $\mathbf{18}_1$-$\mathbf{18}_M$. In any such embodiments, this portion of the process 2000 may be executed in whole or in part by one or more processors within any one or a combination of the main server 12, any of the one or more local servers $\mathbf{16}_1$-$\mathbf{16}_K$ and any of the one or more of the fuel dispensers $\mathbf{18}_1$-$\mathbf{18}_N$, $\mathbf{18}_1$-$\mathbf{18}_M$, wherein information may be shared between the such systems via wired and/or wireless connection.

The process 2000 is illustratively stored in the form of a software application in the customer/fuel dispenser identification module 522, 622, and illustratively begins at step 2002 when the customer launches, i.e., activates, the fuel dispenser activation application stored in the fuel dispenser activation module 502, 602 (see FIGS. 5 and 6). In some embodiments of the fuel dispenser activation application, the processor 300, 400 of the customer's mobile electronic device 80, 90 illustratively accesses the process 2000 contained in the customer/fuel dispenser identification module 522, 622 upon launch (step 2002), and in such embodiments the processor 300, 400 is operable (following step 2002) at step 2004 to control the display 320, 422 of the of the customer's mobile electronic device 80, 90 to display a graphic user interface (GUI) which includes at least one fuel dispenser identification field and prompts the customer to enter an identification code (IC) which uniquely identifies the fuel dispenser $\mathbf{18}_1$-$\mathbf{18}_N$, $\mathbf{18}_1$-$\mathbf{18}_M$ from which the customer desires to dispense fuel. In some embodiments, IC may be or include the fuel dispenser ID 200 illustrated and described with respect to FIG. 2, and in such embodiments the fuel dispenser ID 200 included and displayed on each of the fuel dispensers $\mathbf{18}_1$-$\mathbf{18}_N$, $\mathbf{18}_1$-$\mathbf{18}_M$ is different from the fuel dispenser ID 200 displayed on any other fuel dispenser $\mathbf{18}_1$-$\mathbf{18}_N$, $\mathbf{18}_1$-$\mathbf{18}_M$ and therefore uniquely identifies each one of the fuel dispensers $\mathbf{18}_1$-$\mathbf{18}_N$, $\mathbf{18}_1$-$\mathbf{18}_M$. Alternatively or additionally, the identification code, IC, may be or include the IDCODE generated by the module 64 as described hereinabove with respect to FIG. 2, wherein the IDCODE displayed on the display monitor 214 of each fuel dispenser $\mathbf{18}_1$-$\mathbf{18}_N$, $\mathbf{18}_1$-$\mathbf{18}_M$ uniquely identifies that fuel dispenser $\mathbf{18}_1$-$\mathbf{18}_N$, $\mathbf{18}_1$-$\mathbf{18}_M$. Alternatively or additionally still, the identification code, IC, may be or include the fuel center ID 700 displayed at or on each of the fuel center $\mathbf{52}_1$-$\mathbf{52}_K$, and in such embodiments the fuel center ID 700 included and displayed on each of the fuel centers $\mathbf{52}_1$-$\mathbf{52}_K$ is different from the fuel center ID 700 displayed on any other fuel center $\mathbf{52}_1$-$\mathbf{52}_K$ and therefore uniquely identifies each one of the fuel centers $\mathbf{52}_1$-$\mathbf{52}_K$. Those skilled in the art will recognize other techniques for displaying one or more fuel dispenser identifiers in view of a customer approaching a fuel dispenser $\mathbf{18}_1$-$\mathbf{18}_N$, $\mathbf{18}_1$-$\mathbf{18}_M$, and any such other techniques are contemplated by this disclosure. In any case, in response to customer entry of the identification code, IC, which uniquely identifies the fuel pump $\mathbf{18}_1$-$\mathbf{18}_N$, $\mathbf{18}_1$-$\mathbf{18}_M$ from which the customer desires to dispense fuel, the processor 300, 400 is operable, following step 2004, at step 2006 to control the communication circuitry 310, 410 to wirelessly transmit information to the main server, wherein such information illustratively includes the CUSTID code described hereinabove and the identification code, IC, of the fuel dispenser $\mathbf{18}_1$-$\mathbf{18}_N$, $\mathbf{18}_1$-$\mathbf{18}_M$ from which the customer desires to dispense fuel to the main server 12.

As described hereinabove with respect to FIGS. 16A, 16B and 18, the CUSTID code may include one or more sequences of codes and/or include multiple, separate codes. Moreover, the CUSTID code may be wirelessly transmitted by the customer's mobile electronic device 80, 90 in the form of a single transmission of a single signal code or a single transmission of multiple, separate codes, or in the form of two or more separate transmissions of one or more separate codes. In embodiments in which the CUSTID code is transmitted in the form of multiple, separate transmissions, the customer's mobile electronic device 80, 90 may be operable to transmit such multiple CUSTID codes, or to transmit a single CUSTID code in multiple wireless signal transmissions, without interruption by or data requests by the processor 20 of the main server 12. In some alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more requests transmitted by the processor 20 to the customer's mobile electronic device 80, 90. In other alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more acknowledgements transmitted by the processor 20 to the customer's mobile electronic device 80, 90 of one or more data transmission notifications previously transmitted by the customer's mobile electronic device 80, 90.

In the process 2000, the processor 20 of the main server 12 is illustratively operable to execute the software application stored in the fuel dispenser ID module 850, and at step 2008 the processor 20 is operable to receive the information transmitted thereto by the customer's mobile electronic device 80, 90. Thereafter at step 2010, the processor 20 of the main server 12 is operable to determine whether the CUSTID code transmitted to the main server 12 by the customer's mobile electronic device 80, 90 matches a CUSTID code stored in one or more databases, i.e., whether the CUSTID code matches a corresponding CUSTID code of one of the customer-members of the EMS program. Illustratively, the processor 20 is operable to execute step 2010 as described above with respect to steps 1828-1830 of the process 1800 illustrated in FIG. 18.

Following execution of step 2010, the process 2000 advances to step 2012 where the processor 20 of the main server 12 is operable to determine whether the identification code, IC, transmitted to the main server 12 by the customer's mobile electronic device 80, 90 matches a fuel dispenser identification code stored in the fuel center/dispenser location database 816 or other database. As briefly described above with respect to FIG. 14B, the fuel dispenser ID module 850 is illustratively included in embodiments in which the fuel dispenser ID 200 and/or the fuel dispenser identifier IDCODE and/or fuel center ID 700 is/are used to locate fuel dispensers 18$_1$-18$_N$, 18$_1$-18$_M$ at which EMS member-customers are located and from which such customer-members desire to dispense fuel. In such embodiments, the fuel center/dispenser location database 816 illustratively contains information associating identification codes, IC, e.g., in the form of one or any combination of the fuel dispenser IDs 200 and/or IDCODEs and/or fuel center IDs 700, with corresponding ones of the fuel dispensers 18$_1$-18$_N$, 18$_1$-18$_M$. In one embodiment, for example, the identification code, IC, of each fuel dispenser 18$_1$-18$_N$, 18$_1$-18$_M$ is associated with, e.g., linked to, mapped to, or otherwise identified with, a fuel dispenser identifier (FDID), e.g., in the form of a designation number, address or code, which identifies the corresponding one of the fuel dispensers 18$_1$-18$_N$, 18$_1$-18$_M$ to the main server 12 so that the processor 20 of the main server 12 can control operation of thereof in accordance with the customer's pre-established fueling preferences, e.g., via the process 1500 illustrated in FIG. 15. In such embodiments, the processor 20 is illustratively operable at step 1810 to process IC by searching for a matching IC stored in the fuel center/dispenser location data 816 and determining the FDID associated in the database 816 with the matched IC to determine the identity of the corresponding one of the fuel dispenser 18$_1$-18$_N$, 18$_1$-18$_M$ from which the customer identified by CUSTID code desires to dispense fuel.

In other embodiments, the identification codes, IC, may be stored in the database 816 and associated in the database 816 with, e.g., linked to, mapped to or otherwise identified with, location coordinates, relative to one or more sets of base coordinates, corresponding to the locations of each of the fuel dispensers 181-18N, 181-18M of the retail enterprise. In such embodiments, the processor 20 is illustratively operable at step 1810 to process IC by searching for a matching IC stored in the database 816 and comparing the location coordinates associated with the matched IC with those of the fuel dispensers 18$_1$-18$_N$, 18$_1$-18$_M$ stored in the database 816 to determine the identity of the corresponding one of the fuel dispenser 18$_1$-18$_N$, 18$_1$-18$_M$ from which the customer identified by CUSTID code desires to dispense fuel.

In any case, following step 2012, the process 2000 is complete and the process step 1702 illustrated in FIG. 17 returns the identity of the customer associated with the CUSTID code transmitted to the main server 12 by the customer's mobile electronic device 80, 90, e.g., the EMSID of the customer associated with the mobile electronic device 80, 90, and also returns the identity of the fuel dispenser 18$_1$-18$_N$, 18$_1$-18$_M$ from which the identified customer wishes to dispense fuel. If, at step 2010, the processor 20 determines that none of the one or more databases in which CUSTID codes are stored has stored therein a CUSTID code that matches the CUSTID code transmitted to the main server 12 by the customer's mobile electronic device 80, 90, the process 2000 may illustratively terminate without returning any information which would allow the process 1700 illustrated in FIG. 17 to execute its remaining steps, as described above with respect to step 1828 of the process 1800 of FIG. 18.

In some alternative embodiments of the process 2000, the customer and fuel dispenser identification process just described may be modified such that more or all of the process 200 occurs automatically, i.e., without intervention or input required by the customer. In such embodiments, each fuel dispenser 18$_1$-18$_N$, 18$_1$-18$_M$ may further illustratively be operable to periodically or non-periodically broadcast or otherwise transmit, e.g., via the wireless communication circuitry 230 and/or other wireless signal broadcasting device such as a beacon 224, the identification code, IC, corresponding thereto. In such embodiments, the customer's mobile electronic device 80, 90 may be responsive to such wirelessly broadcast signals to wake up and activate the fuel dispenser activation application stored in the fuel dispenser activation module 502, 602 as described above with respect to FIG. 18 and to wireless transmit the CUSTID code and IC to the main server 12 as described above with respect to the process 2000 illustrated in FIG. 20. Alternatively, the modified process may include step 2002 as described above such that the customer manually launches the fuel dispenser activation application prior to or after arriving at the fuel center 52$_1$-52$_K$. In such alternative embodiments, the fuel dispenser activation application may be responsive to such manual activation thereof to monitor for wireless signals broadcast by a proximate fuel dispenser 18, or to wirelessly transmit one or more signals receivable by the wireless communication circuitry 230 of the fuel dispenser 18 that identifies the presence of the customer mobile electronic device 80, 90 proximate to the fuel dispenser 18, to which the processor 60 of the fuel dispenser 18 may be responsive to control the wireless communication circuitry 230 and/or one or more beacons 224 to wirelessly broadcast the identification code, IC. In such embodiments, the processor 300, 400 of the customer's mobile electronic device 80, 90 and the processor 20 of the main server 12 may thereafter be operable as described with respect to steps 2006-2012 above or may alternatively be operable as described with respect to steps 1806-1830 of the process 1800 illustrated in FIG. 18.

Referring now to FIG. 21, a simplified flow diagram is shown of another embodiment of a process 2100 for executing the process step 1702 illustrated in FIG. 17 in which the customer and fuel dispenser 18$_1$-18$_N$, 18$_1$-18$_M$ from which the customer desires to dispense fuel are identified via GPS information transmitted to the main server 12 by the customer's mobile electronic device 80, 90. In some embodiments of the process 2100, such as that illustrated in FIG. 21, such customer and fuel dispenser identification illustratively occurs automatically, i.e., without intervention or input required by the customer. In the illustrated embodiment, the process 2100 is illustratively executed in part by the processor 20 of the main server 12 and in part by the processor 300, 400 of the customer's mobile electronic device, and in this regard part of the process 2100 is illustratively stored in the memory 24 (and/or data storage 26) of the main server 12 in the form of instructions executable by the processor 20 of the main server 12, and part is illustratively stored in the memory 304 (and/or data storage 306) of the customer's mobile communication device 80 in the form of instructions executable by the processor 300 of the customer's mobile communication device 80 or in the memory 404 (and/or data storage 406) of the customer's vehicle communication device 90 in the form of instructions executable by the processor 400 of the customer's vehicle communication device 90. It will be understood, however, that in some alternate embodiments the part of the process 2100 just described as being stored in the main server 12 and executed by the processor 20 may be alternatively stored, in whole or in part, in the memory 44 (and/or data storage 46) of the one or more of the local servers $\mathbf{16}_1$-$\mathbf{16}_K$ in the form of instructions executable, in whole or in part, by the processor 40 of one or more of the local servers $\mathbf{16}_1$-$\mathbf{16}_K$, or stored, in whole or in part, in the memory 64 (and/or data storage 66) of the one or more of the fuel dispensers $\mathbf{18}_1$-$\mathbf{18}_N$, $\mathbf{18}_1$-$\mathbf{18}_M$ in the form of instructions executable, in whole or in part, by the processor 60 of one or more of the one or more of the fuel dispensers $\mathbf{18}_1$-$\mathbf{18}_N$, $\mathbf{18}_1$-$\mathbf{18}_M$. In any such embodiments, this portion of the process 2100 may be executed in whole or in part by one or more processors within any one or a combination of the main server 12, any of the one or more local servers $\mathbf{16}_1$-$\mathbf{16}_K$ and any of the one or more of the fuel dispensers $\mathbf{18}_1$-$\mathbf{18}_N$, $\mathbf{18}_1$-$\mathbf{18}_M$, wherein information may be shared between the such systems via wired and/or wireless connection.

The process 2100 is illustratively stored in the form of a software application in the customer/fuel dispenser identification module 522, 622, and illustratively begins at step 2102 when the fuel dispenser activation application stored in the fuel dispenser activation module 502, 602 (see FIGS. 5 and 6) is activated, e.g., either manually by the customer or automatically in response to a detected signal as described above with respect to the process 2000 of FIG. 20. In some embodiments of the fuel dispenser activation application, the processor 300, 400 of the customer's mobile electronic device 80, 90 illustratively accesses the process 2100 contained in the customer/fuel dispenser identification module 522, 622 upon launch (step 2102), and in such embodiments the processor 300, 400 is operable (following step 2102) at step 2104 to update the current geographical location of the customer's mobile electronic device 80, 90 by receiving from the on-board GPS receiver 324, 426 updated geographical location data in the form of geographical coordinates, e.g., at least latitudinal and longitudinal coordinates. For purposes of this document, such geographical coordinates defining the geographical location or position of the customer's mobile electronic device 80, 90 may be referred to as "GPS coordinates."

In one embodiment, the processor 300, 400 is operable at 2106, following step 2104, to compare the updated GPS coordinates to so-called "geofence" data relating to the geographical locations of the fuel center $\mathbf{52}_1$-$\mathbf{52}_K$. In some embodiments, the customer/fuel dispenser identification module 522, 622 and/or fuel dispenser activation module 502, 602 may have access to, either stored in the on-board memory 304, 404 or data storage 306, 406, or stored in the database 816 or other database and accessible via the public network 1202, "geofence" data identifying the various fuel centers $\mathbf{52}_1$-$\mathbf{52}_K$ and/or identifying one or more of the fuel dispensers 18 located at the various fuel centers $\mathbf{52}_1$-$\mathbf{52}_K$. In such embodiments, the processor 300, 400 is illustratively operable at step 2110 to process the GPS coordinates and the geofence data to determine the location of the customer's mobile electronic device 80, 90 relative to one or more geofences defined by the geofence data. In alternative embodiments, the processor 300, 400 may be operable at step 2106 to instead wirelessly transmit the updated GPS coordinates to the main server 12, and the processor 20 of the main server 12 may be operable to execute such comparisons and then wirelessly transmit the results of such comparisons back to the customer's mobile electronic device 80, 90, as shown by the dashed-line process step 2108.

Figure 22:
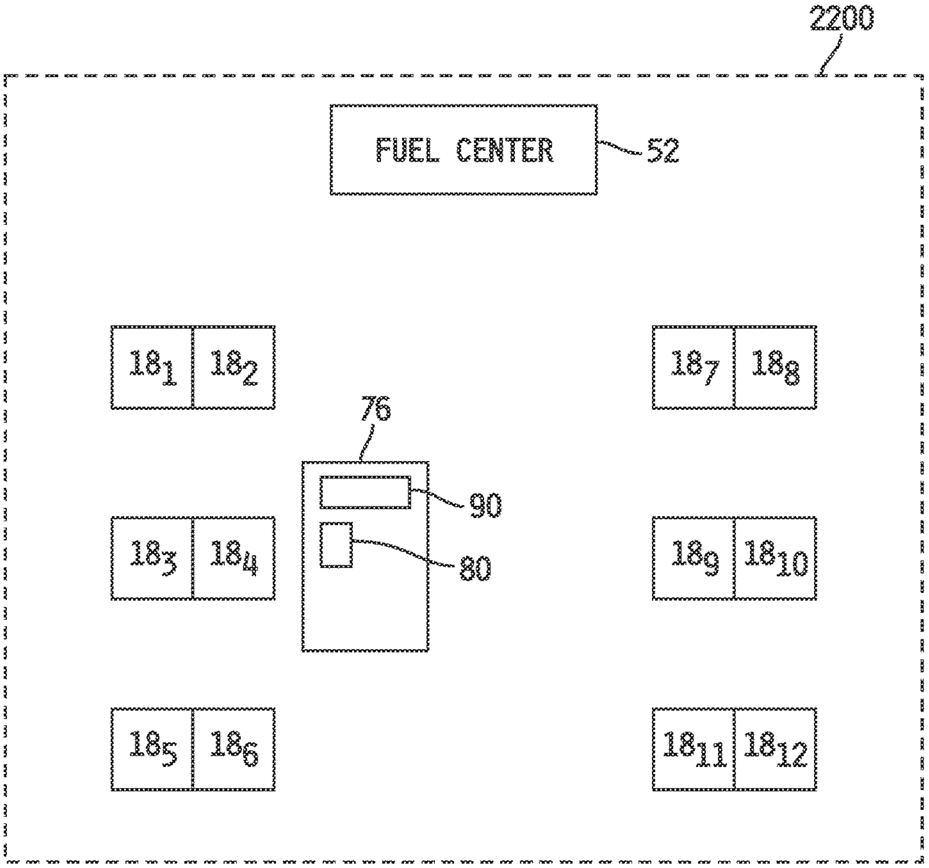
FIG. 22 is a simplified diagram graphically illustrating an operational example of the customer/fuel dispenser identification process of FIG. 21.

For purposes of this disclosure, "geofence" data generally is or includes open or closed-boundary geographical data which defines one or more specific geographical points, areas or regions, and a "geofence" is any single such boundary which defines a specific geographical point, area or region. In this regard, the geofence data stored on-board the customer's mobile electronic device 80, 90 or in the fuel center dispenser location database 816 or other database illustratively defines a number of different geofences each defining a closed or open border about, or at least partially about, a different one of the fuel centers $\mathbf{52}_1$-$\mathbf{52}_K$. In FIG. 22, for example, one such closed-boundary geofence 2200 is shown extending about an example fuel center 52 at which twelve fuel dispensers $\mathbf{18}_1$-$\mathbf{18}_{12}$ are located and positioned as shown. In this example, the geofence 2200 is illustratively stored in the form of a set of geofence coordinates that include a number of ordered sets of different geographical coordinates, e.g., latitudinal and longitudinal coordinate pairs, which together define the boundary of the geofence 2200 illustrated in FIG. 22. In this embodiment, the geofence data stored on-board the customer's mobile electronic device 80, 90 or in the fuel center dispenser location database 816 or other database illustratively includes a set of geofence coordinates for each of the fuel centers $\mathbf{52}_1$-$\mathbf{52}_K$. In some embodiments, the geofence data may further include one or more sets of geofence coordinates each of which define an open or closed boundary about a corresponding one the fuel dispensers, e.g., one of the fuel dispensers $\mathbf{18}_1$-$\mathbf{18}_{12}$ in FIG. 22.

In any case, referring again to FIG. 21, the processor 300, 400 (or the processor 20 in embodiments which include step 2108 in place of step 2106), is illustratively operable to execute step 2110 by comparing the updated GPS coordinates received at step 2104 with all or one or more subsets of the geofence data stored on-board the customer's mobile electronic device 80, 90 or in the database 816 or other database to determine whether the customer's mobile electronic device 80, 90 is located within any of the geofences defined by the geofence data. In the example illustrated in FIG. 22, the result of such comparison would reveal that the customer's mobile electronic device 80, 90 is located within the geofence 2200. If the processor 300, 400 (alternatively the processor 20) determines at step 2110 that the customer's mobile electronic device 80, 90 is not located within any geofence included in the geofence data, the process 2100 loops back to step 2104 to acquire updated GPS coordinates. If, on the other hand, the processor 300, 400 (alternatively the processor 20) determines at step 2110 that the customer's mobile electronic device 80, 90 is located within a geofence included in the geofence data, the process 2100 advances to step 2112 where the processor 300, 400 is operable to control the wireless communication circuit 312, 410 to wirelessly transmit the CUSTID code and the updated GPS coordinates to the main server 12, and the processor 20 of the main server is thereafter operable at step 2114 to receive the transmitted CUSTID code and updated GPS coordinates. In embodiments in which the processor 20 of the main server 12 is operable to execute such comparisons and determinations, step 2112 illustratively includes transmission only of the CUSTID code if not previously transmitted by the processor 300, 400, and otherwise steps 2112 and 2114 may be omitted as the processor 20 will have already received the CUSTID code and the updated GPS coordinates.

In embodiments in which the geofence detected at step 2110 corresponds to a geofence defined about, or at least partially about, one of the fuel dispensers $\mathbf{18}_1$-$\mathbf{18}_N$, $\mathbf{18}_1$-$\mathbf{18}_M$, the identified geofence along with the updated GPS position of the customer's mobile electronic device 80, 90, is sufficient for the processor 20 of the main server 12 to determine the fuel dispenser ID, FDID, of the corresponding one of the fuel dispenser $\mathbf{18}_1$-$\mathbf{18}_N$, $\mathbf{18}_1$-$\mathbf{18}_M$. Likewise, in embodiments in which the geofence detected at step 2110 corresponds to a geofence defined about, or at least partially about, one of the fuel centers $\mathbf{52}_1$-$\mathbf{52}_K$ and in which the geographical coordinates of each fuel dispenser $\mathbf{18}_1$-$\mathbf{18}_N$ or $\mathbf{18}_1$-$\mathbf{18}_M$ located at the identified one of the fuel centers $\mathbf{52}_1$-$\mathbf{52}_K$ are accessible to the processor 20, such information, along with the updated GPS position of the customer's mobile electronic device 80, 90, is sufficient for the processor 20 of the main server 12 to determine the fuel dispenser ID, FDID, of the corresponding one of the fuel dispenser $\mathbf{18}_1$-$\mathbf{18}_N$, $\mathbf{18}_1$-$\mathbf{18}_M$. In such embodiments, step 2116 of the process 2100 may illustratively include only step 2118 as will be discussed below.

In other embodiments in which the geofence detected at step 2110 corresponds to a geofence defined bout, or at least partially about, one of the fuel centers $\mathbf{52}_1$-$\mathbf{52}_K$, but in which the geographic positions of the fuel dispensers $\mathbf{18}_1$-$\mathbf{18}_N$, $\mathbf{18}_1$-$\mathbf{18}_M$ are not specifically known, the processor 20 can only estimate an identity of the one of the fuel dispensers $\mathbf{18}_1$-$\mathbf{18}_N$, $\mathbf{18}_1$-$\mathbf{18}_M$ most proximate to the customer's mobile electronic device 80, 90 and from which the customer desires to dispense fuel. In such embodiments of the process 2100, step 2116 may illustratively include steps 2118-2130 as shown by dashed-line representation in FIG. 21. In such embodiments, identification of the fuel dispenser 18 illustratively may require intervention or input by the customer.

Step 2116, in embodiments which step 2116 includes steps 2118-2130, illustratively includes a number of steps to be executed in-part by the processor 20 of the main server 12 and in-part by the processor 300, 400 of the mobile electronic device 80, 90. For example, the process step 2116 illustratively includes step 2118 at which the processor 20 of the main server 12 is operable to estimate the identity of the one of the fuel dispensers $\mathbf{18}_1$-$\mathbf{18}_N$ or $\mathbf{18}_1$-$\mathbf{18}_M$ most proximate to the customer's mobile electronic device 80, 90 and from which the customer desires to dispense fuel. As briefly described above with respect to FIG. 14B, the fuel center/dispenser locator module 852 is illustratively included in embodiments in which the GPS position of the customer's mobile electronic device 80, 90 and geofence data are used to locate fuel dispensers $\mathbf{18}_1$-$\mathbf{18}_N$, $\mathbf{18}_1$-$\mathbf{18}_M$ at which EMS member-customers are located and from which such customer-members desire to dispense fuel. In some such embodiments, the fuel center/dispenser location database 816 illustratively contains information associating geofence data for the various fuel centers $\mathbf{52}_1$-$\mathbf{52}_K$ with identities of such fuel centers $\mathbf{52}_1$-$\mathbf{52}_K$ and further illustratively contains information uniquely identifying each fuel dispenser 18 located at each such fuel center 52. In one embodiment, for example, the set of geofence coordinates of each fuel center $\mathbf{52}_1$-$\mathbf{52}_K$, or some subset thereof, is associated with, e.g., linked to, mapped to, or otherwise identified with, a fuel center identifier (FCID), e.g., in the form of a designation number or code, which identifies the corresponding one of the fuel centers $\mathbf{52}_1$-$\mathbf{52}_K$ to the main server 12. In such embodiments, the processor 20 is illustratively operable at step 2118 to estimate the identity of the one of the fuel dispensers $\mathbf{18}_1$-$\mathbf{18}_N$, $\mathbf{18}_1$-$\mathbf{18}_M$ most proximate to the customer's mobile electronic device 80, 90 and from which the customer desires to dispense fuel by first comparing the updated GPS coordinates to the geofence data for the various fuel centers $\mathbf{52}_1$-$\mathbf{52}_K$ to determine a fuel center identifier FCID of a fuel center 52 having a set of geofence coordinates that define a geofence within which the customer's mobile electronic device 80, 90 is currently located, and to then determine the one or subset of the fuel dispensers $\mathbf{18}_1$-$\mathbf{18}_N$, $\mathbf{18}_1$-$\mathbf{18}_M$ which is/are located at the identified fuel center 52. In the example illustrated in FIG. 22, such a determination would yield the identities of each of the fuel dispensers $\mathbf{18}_1$-$\mathbf{18}_{12}$. Illustratively, the processor 20 is further operable at step 2118 to estimate the identity of the one of the fuel dispensers $\mathbf{18}_1$-$\mathbf{18}_N$, $\mathbf{18}_1$-$\mathbf{18}_M$ most proximate to the customer's mobile electronic device 80, 90 and from which the customer desires to dispense fuel by selecting one of the fuel dispensers located at the identified fuel center 52 based one or more factors which may include, but which are not limited to, the GPS position of the customer's mobile electronic device 80, 90 relative to the identified geofence, the operational state of each of the fuel dispensers located at the identified fuel center 52, and/or other factors. In the example illustrated in FIG. 22, such a determination may, for example, yield fuel dispenser $\mathbf{18}_4$ as the estimated identity of the one of the fuel dispensers $\mathbf{18}_1$-$\mathbf{18}_N$, $\mathbf{18}_1$-$\mathbf{18}_M$ most proximate to the customer's mobile electronic device 80, 90 and from which the customer desires to dispense fuel.

Following step 2118, the process 2100 advances to step 2120 where the processor 20 is operable to wirelessly transmit to the customer's mobile electronic device 80, 90 an identifier, e.g., the ID 200, IDCODE or other identifier, of the one of the fuel dispensers 18 located at the identified fuel center 52 identified by the processor 20 as the one of the fuel dispensers most proximate to the customer's mobile electronic device 80, 90 and from which the customer desires to dispense fuel. Thereafter at step 2122, the processor 300, 400 receives the identifier and at step 2124 the processor 300, 400 controls the display 320, 422 of the mobile electronic device 80, 90 to display the identifier and prompt the customer to confirm, CN, at step 2128 or change, CH, at step 2130 the identifier based on the identity, e.g., ID 200, IDCODE or the like, of the fuel dispenser from which the customer wishes to dispense fuel. In the example illustrated in FIG. 22 and described with respect to step 2126 above, the identity estimate made by the processor 20 of fuel dispenser $\mathbf{18}_4$ is correct, and in this example the customer would enter or select CN to confirm fuel dispenser $\mathbf{18}_4$ as the fuel dispenser from which the customer wishes to dispense fuel. In any case, the processor 300, 400 is operable at step 2128 or 2130 to wirelessly transmit the confirmed or changed identifier to the main server 12, and the process 2100 advances to step 2132.

In embodiments of the process 2100 in which step 2116 includes steps 2118-2130, the processor 20 is in possession of the fuel dispenser identity, FDID, of the fuel dispenser from which the customer wishes to dispense fuel, e.g., in the form of a code such as the fuel dispenser ID 200 or IDCODE, following execution of step 2128 or 2130. In other embodiments of the process 2100, the geographical coordinates of each fuel dispenser $18_1$-$18_N$, $18_1$-$18_M$ are illustratively associated with, e.g., linked to, mapped to, or otherwise identified in the fuel center/dispenser location database 816 with, a fuel dispenser identifier (FDID), e.g., in the form of a designation number, address or code, which identifies the corresponding one of the fuel dispensers $18_1$-$18_N$, $18_1$-$18_M$ to the main server 12 so that the processor 20 of the main server 12 can control operation of thereof in accordance with the customer's pre-established fueling preferences, e.g., via the process 1500 illustrated in FIG. 15. In such embodiments, step 2116 includes only step 2118 at which the processor 20 of the main server 12 is operable to determine the identity of the fuel dispenser from which the customer wishes to dispense fuel by comparing the updated GPS coordinates to the geofence data for the various fuel dispensers $18_1$-$18_N$, $18_1$-$18_M$ to determine a fuel dispenser identifier FDID of a fuel dispenser 18 having a set of geofence coordinates that define a geofence within which the customer's mobile electronic device 80, 90 is currently located or relative to which the customer's mobile electronic device 80, 90 is located within a predefined error tolerance. In such embodiments, the process advances from step 2118 to step 2132.

At step 2132, the processor 20 is operable to determine whether the CUSTID code transmitted to the main server 12 by the customer's mobile electronic device 80, 90 matches a CUSTID code stored in one or more databases, i.e., whether the CUSTID code matches a corresponding CUSTID code of one of the customer-members of the EMS program. Illustratively, the processor 20 is operable to execute step 2132 as described above with respect to steps 1828-1830 of the process 1800 illustrated in FIG. 18 and as described above with respect to step 2010 of the process 20 illustrated in FIG. 20.

Again, as described hereinabove with respect to FIGS. 16A, 16B and 18, the CUSTID code may include one or more sequences of codes and/or include multiple, separate codes. Moreover, the CUSTID code may be wirelessly transmitted by the customer's mobile electronic device 80, 90 in the form of a single transmission of a single signal code or a single transmission of multiple, separate codes, or in the form of two or more separate transmissions of one or more separate codes. In embodiments in which the CUSTID code is transmitted in the form of multiple, separate transmissions, the customer's mobile electronic device 80, 90 may be operable to transmit such multiple CUSTID codes, or to transmit a single CUSTID code in multiple wireless signal transmissions, without interruption by or data requests by the processor 20 of the main server 12. In some alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more requests transmitted by the processor 20 to the customer's mobile electronic device 80, 90. In other alternative embodiments, the customer's mobile electronic device 80, 90 may be operable to transmit such multiple CUSTID codes, or to transmit a single CUSTID code in multiple wireless signal transmissions, by executing one or more of the multiple signal transmissions in response to one or more acknowledgements transmitted by the processor 20 to the customer's mobile electronic device 80, 90 of one or more data transmission notifications previously transmitted by the customer's mobile electronic device 80, 90.

In any case, following step 2132, the process 2100 is complete and the process step 1702 illustrated in FIG. 17 returns the identity of the customer associated with the CUSTID code transmitted to the main server 12 by the customer's mobile electronic device 80, 90, e.g., the EMSID of the customer associated with the mobile electronic device 80, 90, and also returns the identity of the fuel dispenser $18_1$-$18_N$, $18_1$-$18_M$ from which the identified customer wishes to dispense fuel. If, at step 2132, the processor 20 determines that none of the one or more databases in which CUSTID codes are stored has stored therein a CUSTID code that matches the CUSTID code transmitted to the main server 12 by the customer's mobile electronic device 80, 90, the process 2100 may illustratively terminate without returning any information which would allow the process 1700 illustrated in FIG. 17 to execute its remaining steps, as described above with respect to step 1828 of the process 1800 of FIG. 18.

Referring again to FIG. 17, the process 1700 advances from step 1702, with the customer identity and with the identity of the one of the fuel dispensers $18_1$-$18_N$, $18_1$-$18_M$ from which the identified customer wishes to dispense fuel, to step 1708. At step 1708, the processor 20 is operable to access the electronic payment information (EPI) associated with the customer identity, e.g., EMSID, CI, CUSTID or the like. As the customer identification code, CUSTID, has been verified or authenticated as part of the process 1702, such verification or authentication need not be repeated at step 1708. In some alternative embodiments, such verification or authentication may be carried out alternatively to or in addition to that carried out at step 1702. In any case, the processor 20 is illustratively operable at step 1708 to access the EPI associated with the customer identity by accessing the default EPI stored in the customer account data 402 or other database and identified as such during or following execution of the customer fuel purchase preferences process, e.g., the process 1500 illustrated in FIG. 15. Thereafter at step 1710, the processor 20 is operable to process the default EPI to determine whether the default EPI is an acceptable electronic funds transfer instrument. In some embodiments, the processor 20 is operable to execute step 1710 in its entirety, and in other embodiments the processor 20 is operable to securely transmit the EPI to a third-party server or system for processing thereof. In either case, the process executed at step 1710 illustratively includes a conventional electronic funds transfer authorization process by which the customer's default EPI is approved, pre-approved or otherwise authorized for the purpose of enabling one of the fuel dispensers $18_1$-$18_N$, $18_1$-$18_M$ to dispense fuel after which payment for the dispensed fuel will be charged against, drawn from or otherwise processed using the same electronic funds transfer instrument. In some embodiments, the process 1700 may illustratively include one or more steps which, if the default EPI is not authorized at step 1710, allows the customer to identify and submit an alternate electronic funds transfer instrument, e.g., by selecting an alternate EPI previously entered into the customer's account data 804, by entering EPI information for the alternate electronic funds transfer instrument into the customer's mobile electronic device 80, 90 and wirelessly transmitting the same to the processor 20, or the like.

The process 1700 advances from step 1710 to step 1712 where the processor 20 is operable to determine the grade and/or type of fuel to be dispensed from the identified fuel dispenser 18. In one embodiment, the processor 20 is operable execute step 1712 by accessing the fuel grade/type information (FGT) associated in the customer account data 802 or other database with the identified customer, e.g., associated with the identified EMSID, CI, CUSTID and/or EPI. In some embodiments, the process 1700 may advance directly from step 1712 to step 1730 to transmit control signals to the identified fuel dispenser 18 to activate the fuel dispenser 18 for subsequent dispensation of the selected fuel grade/type FGT. In other embodiments, the process 1700 may illustratively include a step 1714 which provides the customer with an opportunity to confirm the default fuel grade/type (i.e., that entered by the customer during the customer fuel purchase preference process, e.g., the process 1500 of FIG. 15) or select a different fuel grade/type which the processor 20 will then subsequently control the identified fuel dispenser 18 to dispense. In such embodiments, the step 1714 may illustratively include step 1716 at which the processor 20 is operable to wirelessly transmit to the identified customer's mobile electronic device 80, 90 the default fuel grade/type FGT. Thereafter at step 1718, the processor 300, 400 of the identified customer's mobile electronic device 80, 90 receives the wirelessly transmitted FGT and at steps 1720 and 1722 the processor 300, 400 illustratively controls the display 320, 422 to display the default FGT along with a prompt to confirm, CN, or change, CH, FGT. If, at step 1722, the customer elects to confirm the default FGT, the customer does so by selecting CN using the keypad 322, 424 or touchscreen 320, 422, and if the customer instead elects to change the default FGT, the customer does so by selecting CH using the keypad 322, 424 or touchscreen 424 and then selecting an alternate fuel type and/or grade from a displayed menu of fuel type and/or grade choices or by entering an alternate fuel type and/or grade into a displayed fuel type/grade field. Thereafter at steps and 1726, the processor 300, 400 is operable to wirelessly transmit the fuel grade/type confirmation or change to the main server 12, which the processor 20 of the main server 12 receives at step 1728.

In still other alternate embodiments, the process 1700 may omit steps 1712-1728 and instead include one or more alternate steps in which no default FGT exists and the customer is instead prompted to select fuel type and/or grade, e.g., from a menu of fuel types and/or grades. Examples of some such 918-932 are illustrated in FIG. 9A and described hereinabove. It will be understood that in any of the foregoing embodiments in which fuel type and/or grade is automatically or manually selected, the process 1700 may be modified to further include one or more steps for determining whether to offer, and offering, fuel grade upgrades such as illustrated and described with respect to steps 918-926B of FIG. 9A. It will be further understood that in any of the foregoing embodiments, the customer fuel purchase preference process, e.g., the process 1500 illustrated in FIG. 15, may be modified to further include one or more steps which allow the customer to identify and define fuel purchase preferences for more than one vehicle, such as described above with respect to the process 1300 illustrated in FIG. 13, and the process 1700 may likewise be modified to further include one or more steps which allow the customer to identify the customer's vehicle, e.g., from a menu of previously identified vehicle choices, for the purposes of the current or pending fuel purchase, and examples of such steps include steps 912-920 of the process 900 illustrated in FIG. 9A.

Referring again to FIG. 17, the process 1700 advances from either of steps 1712 and 1714 to step 1730 where the processor 20 of the main server 12 is operable to process the FGT information to determine the corresponding fuel type and/or grade to be dispensed by the identified fuel dispenser 18. Illustratively, the products/service and pricing data 812 includes data relating to various fuel types and/or grades available to be dispensed from the fuel dispensers $18_1$-$18_N$, $18_1$-$18_M$, and the processor 20 is operable to execute step 1730 by comparing FGT to such data to determine a fuel identification code corresponding to, i.e., associated in the database 812 with, FGT. Thereafter at step 1732, the processor 20 is operable to transmit one or more control signals to the identified fuel dispenser 18 and to wirelessly transmit one or at least one message to the mobile electronic device 80, 90 associated with the identified customer. The one or more control signals transmitted by the processor 20 at step 1732 illustratively define one or more commands to activate the control section 204 of the identified fuel dispenser 18 for subsequent dispensation of a fuel type and/or grade identified by the fuel identification code determined at step 1730. The at least one message illustratively includes a message and/or graphic informing the customer that the identified fuel dispenser 18 is activated and ready to dispense fuel of the fuel type and/or grade FGT.

The identified fuel dispenser 18 receives the one or more control signals at step 1738, and thereafter at step 1740 the processor 60 of the identified fuel dispenser is responsive to the one or more control signals to activate the control section 204 thereof for subsequent dispensation of the fuel type and/or grade specified by the fuel identification code carried by the one or more commands transmitted by the processor 20 of the main server 12. The processor 300, 400 of the mobile electronic device associated with the identified customer receives the at least one message at step 1734, and thereafter at step 1736 the processor 300, 400 is responsive to the at least one message to control the display 320, 422 to display the at least one message.

Upon execution of step 1740, the identified fuel dispenser 18 is activated and ready to dispense fuel with the fuel type and/or grade FGT selected. In some embodiments, the one or more commands transmitted by the processor 20 at step 1732 may include a command to disable one or more of the fuel type/grade selectors 220, 222, and the processor 60 may be responsive to such one or more commands to disable one or more of the fuel type/grade selectors 220, 222 consistently with the command, as illustrated and described above with respect to step 908 of the process 900, although in other embodiments the processor 20 may not transmit any such fuel type/grade disable commands and the customer may thus have the option to change selection of the fuel type and/or grade following execution of step 1740 via a graphic user interface (GUI) displayed on the display 320, 422 of the mobile electronic device 80, 90 associated with the identified customer or via conventional manual manipulation of the fuel selector 222 and/or fuel grade selectors 220.

When fuel dispensation is complete, the process 1700 illustratively advances to step 1742 where the processor 60 of the identified fuel dispenser 18 is operable to transmit one or more fueling complete signals to the main server 12 indicating that fuel delivery or dispensation for the current fuel transaction is complete. Illustratively, the sensors 206 may include a sensor which produces a signal when the fuel dispenser nozzle 74 is replaced or returned to its support receptacle on the identified fuel dispenser 18, and the processor 60 may be responsive to detection of such a signal to transmit the one or more fueling complete signals. Further illustratively, in response to detection of the sensor signal the processor 60 or the processor 20 may disable the control section 204 of the identified fuel dispenser 18 so that no more fuel can be dispensed as part of the current fuel purchase transaction. In any case, the one or more fueling complete signals transmitted by the identified fuel dispenser 18 are received by the main server 12 at step 1744, and thereafter at step 1746 the processor 20 of the main server 12 is operable to determine a total purchase cost for the dispensed fuel and process payment for the fuel purchase, e.g., using the authorized or pre-authorized EPI. The processor 20 may further be operable at step 1746 to store a virtual or digital receipt of the fuel purchase transaction in the identified customer-member's purchase history contained in the purchase history database 808.

Following step 1746, the processor 20 is operable at steps 1748 and 1754 to transmit one or more transaction complete commands and messages respectively to the identified fuel dispenser 18 and to the mobile electronic device 80, 90 associated with the identified customer-member. At step 1750, the processor 300, 400 of the mobile electronic device 80, 90 receives the one or more transaction complete messages, and thereafter at step 1752 the processor 300, 400 is operable to control the display 320, 422 to display the one or more transaction complete messages. At step 1756, the processor 60 of the identified fuel dispenser 18 receives the one or more transaction complete commands, and thereafter at step 1758 the processor 60 is responsive the one or more transaction complete commands to deactivate the control section 204 if it is not already deactivated. In embodiments in which the processor 20 or the processor 60 disabled one or more of the fuel selectors 220, 222, the processor 60 is further responsive to the one or more transaction complete commands to enable all fuel selectors 220, 222.

Following identification of the identified customer at step 1702 and at any time during or after dispensation of fuel by the identified fuel dispenser 18, the process 1700 may illustratively be modified to include one or more steps by which the processor 20 of the main server 12 may determine whether to offer one or more virtual discount coupons for one or more goods and/or services to the identified customer, if so, what goods and/or services to offer, and to provide such one or more offers to the identified customer. Examples of some such steps 922-926B, 942, are illustrated and described with respect to FIG. 9A.

Examples of such goods and/or services may include any good and/or service offered by the retail enterprise at a brick-and-mortar location and/or fuel center and/or other good/service store or outlet, including but not limited to food, beverages, clothing, tools, electronics, sporting goods, outdoor items, garden-related items, pharmacy items, fuel, convenience items, car wash, photo services, bakery services, or the like. Whether to offer any such virtual discount coupons may be determined randomly, may be based on the purchase histories of customer-members in the purchase history database 808, may be determined to be offered as an incentive to attract new customer-members or re-attract inactive customer members of the EMS program, or the like. The processor 20 may transmit any such virtual discount coupon directly to the mobile electronic device 80, 90 associated with the identified customer, to the identified fuel dispenser 18 and/or to the identified customer's EMS page. The transmitted virtual coupon(s) may be displayed by the processor 300, 400 on the display 320, 422 of the mobile electronic device associated with the identified customer and/or displayed by the processor 60 on the display 214 of the identified fuel dispenser 18, where the customer may select or "clip" any such displayed virtual discount coupon using a keypad 322, 424 or touchscreen 320, 422 of the mobile electronic device 80, 90 or keypad 216 or touchscreen 214 of the identified fuel dispenser 18. Any such clipped virtual coupon may then be transferred by the processor 20 to the customer-member's rewards repository 814. In some alternative embodiments, the processor 20 may "auto-clip" one or more virtual discount coupons by transmitting any such virtual discount coupon directly to the customer's rewards repository 814 after or during display thereof.

The process 1700 may be modified to include any one or more of the features illustrated and described with respect to the process 900 of FIGS. 9A-9B, the process 1050 illustrated of FIG. 10 and/or the process 1100 illustrated in FIG. 11 that have not been specifically described herein with respect to the process 1700 illustrated in FIG. 17. Examples of some such features have been identified in the foregoing description of the process 1700, although it will be understood that any one or combination of features illustrated and described with respect to the process 900 of FIGS. 9A-9B, the process 1050 illustrated of FIG. 10 and/or the process 1100 illustrated in FIG. 11 that have or have not been described and/or identified in the description of the process 1700 may be included therein in some alternative embodiments. Another example of such a feature may be or include any of the odometer reading capture steps 1010-1024 illustrated in FIG. 9B. Those skilled in the art will recognize that any such modifications to the process 1700 would be a mechanical step for a skilled software programmer.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, it will be understood that while the various illustrated wireless signal broadcasting devices 224, 710 have been illustrated and described herein as being implemented in the form of radio-frequency beacons, this disclosure contemplates alternate embodiments in which one or more of the wireless signal broadcasting devices 224, 710 may be or include other electronic devices configured and operable to broadcast or otherwise emit or transmit wireless identification signals detectable by any of the mobile communication devices illustrated and described herein. Examples of such other electronic devices may include, but are not limited to, transponders, radio-frequency identification (RFID) devices, near-field communication (NFC) devices, far-field communication devices, telemetry devices, automated identification and data capture (AIDC) devices, and the like.

What is claimed is:

1. A method of remotely activating any of a plurality of electromechanically controlled fuel dispensers, the method comprising:

with a processor, associating in a first database each of a plurality of fuel dispenser identification codes with a different one of the plurality of fuel dispensers, with the processor, associating in the first or a second database each of a plurality of customer identification codes with a different one of a corresponding plurality of electronic payment identifiers, each of the plurality of electronic payment identifiers specifying an associated electronic payment system pre-selected for automatic processing of payment for the purchase of fuel during subsequent fuel purchase transactions using any of the plurality of fuel dispensers, wirelessly receiving by the processor one or more signals wirelessly transmitted by a mobile electronic device, the wirelessly received one or more signals containing a first identification code and a second identification code, the first identification code uniquely associated with at least one of the mobile electronic device and a user of the mobile electronic device and the second identification code uniquely associated with a selected one of the plurality of fuel dispensers from which the user of the mobile electronic device desires to dispense fuel, in response to the wirelessly received one or more signals, determining with the processor the one of the plurality of customer identification codes in the first or second database that matches the wirelessly received first identification code, and identifying with the processor the selected one of the plurality of fuel dispensers from which the user of the mobile electronic device desires to dispense fuel by determining with the processor the one of the plurality of fuel dispensers associated in the first database with a fuel dispenser identification code that matches the wirelessly received second identification code, determining with the processor the one of the plurality of electronic payment identifiers associated in the first or second database with the determined one of the plurality of customer identification codes, and automatically upon determining that the electronic payment system associated in the first or second database with the determined one of the electronic payment identifiers is authorized for payment against fuel to be dispensed by the determined one of the plurality of fuel dispensers, controlling with the processor the determined one of the plurality of fuel dispensers from a normally inactive state in which it is prevented from dispensing fuel to an active state in which it is enabled to dispense fuel.

2. The method of claim 1, wherein each of the plurality of fuel dispensers is configured to dispense any of a plurality of different grades or types of fuel, and wherein the method further comprises associating, with the processor, in the first or second database a fuel preference identifier with each of the plurality of customer identification codes, each fuel preference identifier identifying a pre-selected one of the plurality of different grades or types of fuel to be dispensed by any of the plurality of fuel dispensers during subsequent fuel purchase transactions associated with a corresponding one of the plurality of customer identification codes, and wherein controlling the determined one of the plurality of fuel dispensers from the inactive state to the active state comprises automatically enabling the determined one of the plurality of fuel dispensers to dispense the one of the plurality of different grades or types of fuel identified by the fuel preference identifier associated in the first or second database with the determined one of the plurality of customer identification codes.

3. The method of claim 1, wherein each of the plurality of fuel dispensers is configured to dispense any of a plurality of different grades or types of fuel, and wherein the method further comprises:

associating, with the processor, in the first or second database the determined one of the plurality of customer identification codes with two or more motor vehicle identifiers each identifying a different motor vehicle, associating, with the processor, in the first or second database at least one of the two or more motor vehicle identifiers with a first pre-selected one of the plurality of different grades or types of fuel for dispensing by any of the plurality of fuel dispensers into at least one motor vehicle identified by the at least one of the two or more motor vehicle identifiers during subsequent fuel purchase transactions, associating, with the processor, in the first or second database at least another of the two or more motor vehicle identifiers with a second pre-selected one of the plurality of different grades or types of fuel, different from the first one of the plurality of different grades or types of fuel, for dispensing by any of the plurality of fuel dispensers into the at least one motor vehicle identified by the at least another of the two or more motor vehicle identifiers during subsequent fuel purchase transactions, and wirelessly receiving by the processor at least one signal wirelessly transmitted by the mobile electronic device, the wirelessly received at least one signal containing a selection of one of the two or more motor vehicle identifiers specified through user interaction with the mobile electronic device, and wherein controlling the determined one of the plurality of fuel dispensers from the inactive state to the active state comprises enabling the determined one of the plurality of fuel dispensers to dispense the first one of the plurality of different grades or types of fuel if the selected one of the two or more vehicle identifiers is the at least one of the two or more motor vehicle identifiers, and enabling the determined one of the plurality of fuel dispensers to dispense the second one of the plurality of different grades or types of fuel if the selected one of the two or more vehicle identifiers is the at least another of the two or more motor vehicle identifiers.

4. The method of claim 1, wherein each of the plurality of fuel dispensers is configured to dispense any of a plurality of different grades or types of fuel, and wherein the method further comprises wirelessly receiving by the processor at least one signal wirelessly transmitted by the mobile electronic device, the wirelessly received at least one signal containing a fuel code, specified through user interaction with the mobile electronic device, identifying one of the plurality of different grades or types of fuel, and wherein controlling the determined one of the plurality of fuel dispensers from the inactive state to the active state comprises enabling the determined one of the plurality of fuel dispensers to dispense the one of the plurality of different grades or types of fuel identified by the received fuel code.

5. The method of claim 1, wherein each of the plurality of customer identification codes comprises, or is associated in the first or second database with, a unique security code, and wherein the wirelessly received one or more signals contains a transmitted security code, and wherein the processor determines the one of the plurality of electronic payment identifiers only if the unique security code comprising, or associated in the first or second database with, the determined one of the plurality of customer identification codes matches the transmitted security code.

6. The method of claim 1, wherein each of the plurality of fuel dispensers is part of a retail enterprise, and wherein the determined one of the plurality of customer identification codes comprises, or is associated in the first or second database with, one of a plurality of enterprise membership service identification codes each uniquely identifying a corresponding one of a plurality of customers as a customer member of an enterprise membership service program associated with the retail enterprise, and wherein the first or second database has stored therein a purchase history containing a record of purchases previously made from the retail enterprise by each of the plurality of customer members of the enterprise membership service program, and wherein the method further comprises:

associating, with the processor, in the first or the second database each of the plurality of customer identification codes with a different one of a plurality of mobile communication devices, generating or retrieving from the first or the second database by the processor at least one discount coupon for a product or service from the retail enterprise based on the purchase history of the one of the plurality of customer members of the enterprise membership service program having an enterprise membership service identification code comprising, or associated in the first or second database with, determined one of the plurality of customer identification codes, wirelessly transmitting, with the processor, the at least one discount coupon or notification of the at least one discount coupon to the one of the plurality of mobile communication devices associated in the first or second database with the determined one of the plurality of customer identification codes, and following completion of dispensation of fuel by the enabled one of the plurality of fuel dispensers, effecting with the processor payment for purchase of the dispensed fuel against the previously authorized electronic payment system.

7. The method of claim 1, wherein the second identification code comprises a fuel dispenser identifier affixed to or displayed on or near the one of the plurality of fuel dispensers from which the user of the mobile electronic device desires to dispense fuel, and wherein the fuel dispenser identifier is manually entered into the mobile electronic device through user interaction therewith, and wherein the wirelessly received one or more signals are wirelessly transmitted by the mobile electronic device in response to further user interaction with the mobile electronic device after the fuel identifier is manually entered therein.

8. The method of claim 1, wherein the second identification code is contained in one or more signals wirelessly transmitted by a wireless signal broadcasting device co-located at or near the one of the plurality of fuel dispensers from which the user of the mobile electronic device desires to dispense fuel, wherein the one or more signals wirelessly transmitted by the wireless signal broadcasting device being configured to have a broadcast range large enough to be detectable by the mobile electronic device when the mobile electronic device is at or near the one of the plurality of fuel dispensers from which the user of the mobile electronic device desires to dispense fuel yet small enough so as not to be detectable by mobile electronic devices at or near any of the remaining plurality of fuel dispensers, and wherein the wirelessly received one or more signals are wirelessly transmitted by the mobile electronic device in response to detection by the mobile electronic device of the one or more signals wirelessly transmitted by the wireless signal broadcasting device.

9. The method of claim 1, wherein the second identification code comprises global positioning system (GPS) coordinates at or near the one of the plurality of fuel dispensers from which the user of the mobile electronic device desires to dispense fuel, and wherein the mobile electronic device includes a GPS receiver, the mobile electronic device configured to determine GPS coordinates of the mobile communication device based on GPS signals received by the GPS receiver, and wherein the wirelessly received one or more signals are wirelessly transmitted by the mobile electronic device in response to detection by the mobile electronic device of GPS coordinates thereof being within a geofence defined about a perimeter of at least the one of the plurality of fuel dispensers from which the user of the mobile electronic device desires to dispense fuel.

10. A method of remotely activating any of a plurality of electromechanically controlled fuel dispensers, the method comprising:

with a processor, associating in a first database each of a plurality of fuel dispenser identification codes with a different one of the plurality of fuel dispensers, with the processor, associating in the first or a second database each of a plurality of customer identification codes with a different one of a corresponding plurality of electronic payment identifiers, each of the plurality of electronic payment identifiers specifying an associated electronic payment system pre-selected for automatic processing of payment for the purchase of fuel during subsequent fuel purchase transactions using any of the plurality of fuel dispensers, wirelessly receiving by the processor one or more signals wirelessly transmitted by a mobile electronic device, the wirelessly received one or more signals containing a first identification code and a second identification code, the first identification code uniquely associated with at least one of the mobile electronic device and a user of the mobile electronic device and the second identification code uniquely associated with a selected one of the plurality of fuel dispensers from which a user of the mobile electronic device desires to dispense fuel, wherein the one or more wirelessly received signals are transmitted by the mobile electronic device in response to one of user interaction with the mobile electronic device after the second identification code is manually entered into the mobile electronic device, detection by the mobile electronic device of one or more signals containing the second identification code and wirelessly transmitted by a wireless signal broadcasting device co-located at or near the one of the plurality of fuel dispensers from which the user of the mobile electronic device desires to dispense fuel, and detection by the mobile electronic device of the second identification code in the form of global positioning system (GPS) coordinates of the mobile electronic device detected by the mobile electronic device, based on GPS signals received by a GPS receiver carried by the mobile electronic device, as being within a geofence defined about a perimeter of at least the one of the plurality of fuel dispensers from which the user of the mobile electronic device desires to dispense fuel, in response to the wirelessly received one or more signals, determining with the processor the one of the plurality of customer identification codes in the first or second database that matches the wirelessly received first identification code, and identifying with the processor the selected one of the plurality of fuel dispensers from which the user of the mobile electronic device desires to dispense fuel by determining with the processor the one of the plurality of fuel dispensers associated in the first database with a fuel dispenser identification code that matches the wirelessly received second identification code, determining with the processor the one of the plurality of electronic payment identifiers associated in the first or second database with the determined one of the plurality of customer identification codes, and upon determining that the electronic payment system associated in the first or second database with the determined one of the electronic payment identifiers is authorized for payment against fuel to be dispensed by the determined one of the plurality of fuel dispensers, controlling the determined one of the plurality of fuel dispensers from a normally inactive state in which it is prevented from dispensing fuel to an active state in which it is enabled to dispense fuel.

11. The method of claim 10, wherein each of the plurality of fuel dispensers is configured to dispense any of a plurality of different grades or types of fuel, and wherein the method further comprises associating, with the processor, in the first or second database a fuel preference identifier with each of the plurality of customer identification codes, each fuel preference identifier identifying a pre-selected one of the plurality of different grades or types of fuel to be dispensed by any of the plurality of fuel dispensers during subsequent fuel purchase transactions associated with a corresponding one of the plurality of customer identification codes and wherein controlling the determined one of the plurality of fuel dispensers from the inactive state to the active state comprises automatically enabling the determined one of the plurality of fuel dispensers to dispense the one of the plurality of different grades or types of fuel identified by the fuel preference identifier associated in the first or second database with the determined one of the plurality of customer identification codes.

12. The method of claim 10, wherein each of the plurality of fuel dispensers is configured to dispense any of a plurality of different grades or types of fuel, and wherein the method further comprises wirelessly receiving by the processor at least one signal wirelessly transmitted by the mobile electronic device, the wirelessly received at least one signal containing a fuel code, specified through user interaction with the mobile electronic device, identifying one of the plurality of different grades or types of fuel, and wherein controlling the determined one of the plurality of fuel dispensers from the inactive state to the active state comprises enabling the determined one of the plurality of fuel dispensers to dispense the one of the plurality of different grades or types of fuel identified by the received fuel code.

13. A system for remotely activating any of a plurality of electromechanically controlled fuel dispensers, the system comprising:

at least one database having stored therein a plurality of fuel dispenser identification codes each associated with a different one of the plurality of fuel dispensers, and a plurality of customer identification codes each associated with a different one of a corresponding plurality of electronic payment identifiers, each of the plurality of electronic payment identifiers specifying an associated electronic payment system pre-selected for automatic processing of payment for the purchase of fuel during subsequent fuel purchase transactions using any of the plurality of fuel dispensers, a processor communicatively coupled to each of the plurality of fuel dispensers, and a memory having instructions stored therein which, when executed by the processor, cause the processor to wirelessly receive one or more signals wirelessly transmitted by a mobile electronic device, the wirelessly received one or more signals containing a first identification code and a second identification code, the first identification code uniquely associated with at least one of the mobile electronic device and a user of the mobile electronic device and the second identification code uniquely associated with a selected one of the plurality of fuel dispensers from which the user of the mobile electronic device desires to dispense fuel, determine, in response to the wirelessly received one or more signals, the one of the plurality of customer identification codes in the at least one database that matches the wirelessly received first identification code, identify, in response to the wirelessly received one or more signals, the selected one of the plurality of fuel dispensers from which the user of the mobile electronic device desires to dispense fuel by determining the one of the plurality of fuel dispensers associated in the at least one database with a fuel dispenser identification code that matches the wirelessly received second identification code, determine the one of the plurality of electronic payment identifiers associated in the at least one database with the determined one of the plurality of customer identification codes, and upon determining that the electronic payment system associated in the at least one database with the determined one of the plurality of electronic payment identifiers is authorized for payment against fuel to be dispensed by the determined one of the plurality of fuel dispensers, automatically controlling the determined one of the plurality of fuel dispensers from a normally inactive state in which it is prevented from dispensing fuel to an active state in which it is enabled to dispense fuel.

14. The system of claim 13, wherein the memory further has instructions stored therein which, when executed by the processor, cause the processor to process the electronic payment system associated in the at least one database with the determined one of the electronic payment identifiers for payment authorization, automatically control the determined one of the plurality of fuel dispensers from the inactive state to the active state upon authorization of the electronic payment system associated in the at least one database with the determined one of the plurality of electronic payment identifiers for payment for the purchase of fuel to be dispensed from the determined one of the plurality of fuel dispensers, and following completion of dispensation of fuel by the enabled one of the plurality of fuel dispensers, effect payment for purchase of fuel dispensed from the enabled one of the plurality of fuel dispensers against the previously authorized electronic payment system.

15. The system of claim 13, wherein each of the plurality of fuel dispensers is configured to selectively dispense any of a plurality of different grades or types of fuel, and wherein each of the plurality of customer codes is associated in the at least one database with a corresponding fuel preference identifier, each fuel preference identifier identifying a pre-selected one of the plurality of different grades or types of fuel to be dispensed by any of the plurality of fuel dispensers during subsequent fuel purchase transactions associated with a corresponding one of the plurality of customer identification codes and wherein the instructions stored in the memory further include instructions which, when executed by the processor, cause the processor to automatically control the determined one of the plurality of fuel dispensers from the inactive state to the active state by automatically enabling the determined one of the plurality of fuel dispensers to dispense the one of the plurality of different grades or types of fuel identified by the fuel preference identifier associated in the at least one database with the determined one of the plurality of customer identification codes.

16. The system of claim 13, wherein each of the plurality of fuel dispensers is configured to selectively dispense any of a plurality of different grades or types of fuel, and wherein the determined one of the plurality of customer identification codes is associated in the at least one database with two or more motor vehicle identifiers each identifying a different motor vehicle, and wherein at least one of the two or more motor vehicle identifiers is associated in the at least one database with a first pre-selected one of the plurality of different grades or types of fuel for dispensing by any of the plurality of fuel dispensers into the at least one motor vehicle identified by the at least one of the two or more motor vehicle identifiers during subsequent fuel purchase transactions, and wherein at least another of the two or more motor vehicle identifiers is associated in the at least one database with a second preselected one of the plurality of different grades or types of fuel, different from the first one of the plurality of different grades or types of fuel, for dispensing by any of the plurality of fuel dispensers into the at least at least one motor vehicle identified by the another of the two or more motor vehicle identifiers during subsequent fuel purchase transactions, and wherein the instructions stored in the memory further include instructions which, when executed by the processor, cause the processor to wirelessly receive at least one signal wirelessly transmitted by the mobile electronic device, the wirelessly received at least one signal containing a selection of one of the two or more motor vehicle identifiers specified through user interaction with the mobile electronic device, and automatically control the determined one of the plurality of fuel dispensers from the inactive state to the active state by automatically enabling the determined one of the plurality of fuel dispensers to dispense the first one of the plurality of different grades or types of fuel if the selected one of the two or more vehicle identifiers is the at least one of the two or more motor vehicle identifiers, and dispense the second one of the plurality of different grades or types of fuel if the selected one of the two or more vehicle identifiers is the at least another of the two or more motor vehicle identifiers.

17. The system of claim 13, wherein each of the plurality of fuel dispensers is configured to selectively dispense any of a plurality of different grades or types of fuel, and wherein the instructions stored in the memory further include instructions which, when executed by the processor, cause the processor to wirelessly receive at least one signal wirelessly transmitted by the mobile electronic device, the wirelessly received at least one signal containing a fuel code, specified through user interaction with the mobile electronic device, identifying one of the plurality of different grades or types of fuel, and automatically control the determined one of the plurality of fuel dispensers from the inactive state to the active state by automatically enabling the determined one of the plurality of fuel dispensers to dispense the one of the plurality of different grades or types of fuel identified by the received fuel code.

18. The system of claim 13, wherein each of the plurality of customer codes comprises, or is associated in the at least one database with, a unique security code, and wherein the wirelessly received one or more signals contains a transmitted security code, and wherein the instructions stored in the memory further include instructions which, when executed by the processor, cause the processor to determine the one of the plurality of electronic payment identifiers only if the unique security code comprising, or associated in the at least one database with, the determined one of the plurality of customer identification codes matches the transmitted security code.

19. The system of claim 13, wherein each of the plurality of fuel dispensers is part of a retail enterprise, and wherein each of the plurality of customer identification codes is associated in the at least one database with a different one of a plurality of mobile communication devices, and wherein the determined one of the plurality of customer identification codes comprises, or is associated in the at least one database with, one of a plurality of enterprise membership service identification codes each uniquely identifying a corresponding one of a plurality of customers as a customer member of an enterprise membership service program associated with the retail enterprise, and wherein the at least one database has stored therein a purchase history containing a record of purchases previously made from the retail enterprise by each of the plurality of customer members of the enterprise membership service program, and wherein the instructions stored in the memory further include instructions which, when executed by the processor, cause the processor to:

generate or retrieve from the at least one database at least one discount coupon for a product or service from the retail enterprise based on the purchase history of the one of the plurality of customer members of the enterprise membership service program having an enterprise membership service identification code associated in the at least one database with or comprising the determined one of the plurality of customer identification codes, and wirelessly transmit the at least one discount coupon or notification of the at least one discount coupon to the one of the plurality of mobile communication devices associated in the at least one database with the determined one of the plurality of customer identification codes.

20. The system of claim 13, wherein the wirelessly received one or more signals are transmitted by the mobile electronic device in response to one of user interaction with the mobile electronic device after the second identification code is manually entered into the mobile electronic device, detection by the mobile electronic device of one or more signals containing the second identification code and wirelessly transmitted by a wireless signal broadcasting device co-located at or near the one of the plurality of fuel dispensers from which the user of the mobile electronic device desires to dispense fuel, and detection by the mobile electronic device of the second identification code in the form of global positioning system (GPS) coordinates of the mobile electronic device detected by the mobile electronic device, based on GPS signals received by a GPS receiver carried by the mobile electronic device, as being within a geofence defined about a perimeter of at least the one of the plurality of fuel dispensers from which the user of the mobile electronic device desires to dispense fuel.

* * * * *